(12) United States Patent
Crandell et al.

(10) Patent No.: US 8,027,442 B2
(45) Date of Patent: Sep. 27, 2011

(54) APPARATUS, SYSTEMS AND METHODS FOR MANAGING INCOMING AND OUTGOING COMMUNICATION

(76) Inventors: Jeffrey L. Crandell, Hermosa Beach, CA (US); Brian K. Wharton, Redondo Beach, CA (US)

( * ) Notice: Subject to any disclaimer, the term of this patent is extended or adjusted under 35 U.S.C. 154(b) by 1201 days.

(21) Appl. No.: 11/787,168

(22) Filed: Apr. 13, 2007

(65) Prior Publication Data

US 2007/0248220 A1 Oct. 25, 2007

Related U.S. Application Data

(63) Continuation of application No. 10/482,527, filed as application No. PCT/US02/19304 on Jun. 18, 2002, now abandoned.

(60) Provisional application No. 60/299,118, filed on Jun. 18, 2001.

(51) Int. Cl.
*H04M 1/56* (2006.01)

(52) U.S. Cl. ......... 379/142.06; 379/207.13; 379/207.14; 379/210.02; 379/211.01

(58) Field of Classification Search ............. 379/142.06, 379/210.02, 207.13–207.15
See application file for complete search history.

(56) References Cited

U.S. PATENT DOCUMENTS

| | | | | |
|---|---|---|---|---|
| 5,905,774 A | * | 5/1999 | Tatchell et al. | 379/88.04 |
| 6,005,870 A | * | 12/1999 | Leung et al. | 370/466 |

\* cited by examiner

*Primary Examiner* — Simon Sing
(74) *Attorney, Agent, or Firm* — Rader, Fishman & Grauer PLLC

(57) ABSTRACT

An apparatus, system and method for managing incoming and outgoing communications for various communications methods are disclosed to provide control over inbound communications including definition of if, when, and who may communicate with a recipient, A concealed identification communication may involve no exchange of actual addresses, phone numbers, or other addressing IDs The capability to initiate immediate, delayed, scheduled, or recurring outbound communications is also discussed.

17 Claims, 63 Drawing Sheets

APPARATUS, SYSTEMS AND METHODS FOR MANAGING INCOMING AND OUTGOING COMMUNICATION

CROSS-REFERENCE TO RELATED APPLICATIONS

This application is a continuation of U.S. patent application Ser. No. 10/482,527, which is a national stage of international application PCT/US02/19304. PCT/US02/19304 claims priority to U.S. Provisional Patent Application Ser. No. 60/299,118 entitled "Apparatus, Systems and Methods for Managing Incoming and Outgoing Communication", filed Jun. 18, 2001, the disclosures of which are incorporated by reference in their entireties.

FIELD OF THE INVENTION

The field of the present invention is electronic and standard communication methods and more particularly, managing incoming and outgoing communication.

BACKGROUND OF THE INVENTION

Personal and business communication methods range from hardcopy written and printed items, voice communication systems, and a variety of electronic methods. Common among existing communication methods is the lack of tools for users to manage their inbound and outbound communications. Existing communication methods also share in common privacy problems related to the distribution by a communications recipient of the personal addresses, telephone numbers, system IDs, etc. of communications participants.

Ultimately, all communications consist of a communication sender and one or more recipients. Each communication method provides for addressing, initiating transmission, transmission, and delivery of, a communication. Some communication methods also provide for denial of delivery, verification of delivery, and the ability to respond to a communication.

There are various methods of two-way and one-way communication methods. A sequence of sending and receiving communications between two or more parties can be accomplished using the various communication methods with differing levels of effectiveness and ease of use, depending on the method used. For example, a two-way conversation via telephone happens more quickly than via electronic mail or pager.

One communication method is the existing wired telephone system. The existing wired telephone system consists of interconnected networks operated and maintained by commercial and government entities throughout the world. Standard telephones are very simple communication devices and the supporting telecommunication networks offer very few services. Beyond the ability to connect calls, common features available as standard or options include: three way calling, call waiting, caller id, call blocking, call forwarding, and return call (sometimes referred to as *69). In the industrialized nations of the world telephone communication is a standard communication method.

Cellular telephones provide another method of communication. Cellular telephone use has grown dramatically in recent years. The early analog cell phones and accompanying networks offered limited quality and features, and usage costs were dramatically higher than standard wired phones. Cellular telephones and their networks offer convenience and features beyond traditional phones, often including electronic phone books, call logging, email and SMS (Short Message Service) capability, application capabilities via WAP (Wireless Area Protocol), and Internet access via small format web browsers. Most cellular systems offer these extended capabilities along with the wired telephone system features as discussed above.

Originally a business tool, voice messaging is another communication method that has grown beyond the business environment and into most homes in North America and many other parts of the world. Voice messaging or voice mail can be implemented with stand alone "answering machine" devices typically used in homes, can be implemented with a commercial phone system, or can be offered as part of a telephone carrier service package. These systems store audio messages which may later be retrieved by the target recipient or recipients. Some enhanced systems provide functionality to forward messages to others, reply to a message, or deliver the message to an external system such as email.

Instant messaging (IM) is a relatively new communication method that leverages the Internet infrastructure to communicate primarily by text. The most popular instant messaging systems include: AOL Instant messenger, MSN Messenger, Yahoo! Messenger, and ICQ. These systems represent many millions of instant messaging users throughout the world. The technology derives its name from the basic capability in which a user can send another (a recipient) a simple text message which instantly appears on the recipient's IM interface. The messages are usually displayed in a scrolling interface where the last message sent by any party is displayed at the bottom and previous messages are displayed above. Each message begins with an indicator of who sent the message, typically an alias name chosen by the user to represent themselves in the IM application. Other features of IM now include the ability to format text in a variety of sizes, fonts, and colors, the ability to block individual IM users from sending messages to an individual recipient, the ability to transfer files, and the ability to use a computer microphone and speaker to accomplish voice communications from the IM interface.

Electronic mail (email) is a common computer-based communication method. Email enables users to exchange text messages, enhanced HTML formatted messages, and files. Email applications have grown in complexity to offer contact management capabilities, scheduling, and rules for handling inbound and outbound messages.

Multi-party conference calling is a popular business communication method that enables more than two participating phone connections to interact via voice. Conference calls are offered by telecommunication service providers or provided as a feature of commercial telephone systems. Typically, conference callers dial a specific telephone number to join a call, and must enter a valid ID code to authorize connection to a particular call. Service providers sometimes offer options to have the call monitored by an operator who will announce callers as they enter and deal with any questions regarding the service or sound quality issues. Depending on the service, conference calls can be made spontaneously or may require lead time to schedule at a specific date and time.

A predecessor to the conference call, a party line call offers an open line for either a fixed number or unlimited number of callers to participate in a group call. A party line is a fixed telephone number, usually without any access restrictions which is available 24 hours a day. Party lines may or may not be monitored by a managing party and at times have one or more "leaders" who serve as experts or guide the content of the call.

Numeric and alphanumeric paging devices provide other common communication methods. Many pagers in use offer one-way communication in that they receive but cannot send messages. New paging devices offer two-way communications via fixed choice responses, or via a data input device such as a keyboard. Most pager systems can also receive messages originated from a web page, software application, or email.

Interactive television (ITV) is an emerging new communication technology combining traditional broadcasting with interactive capabilities similar to computers. Large media, cable, and technology companies such as AOL/Time Warner, AT&T, Cox, Comcast, General Instruments, and Microsoft have invested hundreds of millions of dollars in developing pilot and limited deployment systems. The functionality offered varies by provider but common features include: ability to browse the web and send email, ability to purchase pay-per-view content, and ability to interact with programming and advertising content.

Similar to ITV, satellite systems, and particularly the generation of DSS based systems, are broadcast technology offerings which are evolving to two-way interaction. Current DSS systems offer limited two way communications using a modem built into the control unit which can call the satellite provider to request pay-per-view programming.

Short messaging service (SMS) is an emerging communication technology generally related to digital cellular telephones. It can also be implemented in non-cellular devices. SMS can deliver short text-only messages between compatible devices. It has become popular with some cellular users, particularly in Europe. SMS users utilize a cellular telephone number as the address to which to send the communication. SMS systems are usually equipped with an email gateway in order to interact with email users on the Internet.

The oldest form of distance communication is the delivery of written documents and packages via postal mail and delivery services. Common to all civilized areas of the world, this communication method is the most pervasive.

Video conferencing was an evolution of the conference call and is a communication method that has grown in business use over the years, particularly as an alternative to travel. Standards for video conferencing exist to ensure compatibility between hardware and software manufacturers. Many systems are based on proprietary hardware while others use computers and common input and output devices. The basic functionality of these systems is to simultaneously transmit video and audio between two or more conference locations. The bandwidth required for video conferencing usually demands ISDN or higher speed connections. Conference locations exist in companies, government agencies, hotels, office suites, and business services companies such as Kinko's.

Similar to video conferencing, video telephones provide a way for users to place video and voice calls to another party. The video telephone uses standard telephone line connections and can only connect two users. These units also provide standard telephone capabilities.

Other types of Internet-enabled video and audio devices such as web cameras allow either audio, video, or both to be simultaneously transmitted from one user to one or more compatible receiving devices or standard computers with compatible decoding, display and audio systems. Some units of this type may be directly connected to a telephone or other network connection for operation, although most require a computer connected to the public Internet or private network to function.

New types of multimedia communication applications have been developed to leverage the capabilities of the public Internet. These applications allow teams of disparate individuals to collaborate using combinations of video, audio, still images, document sharing, live scanning of documents, white boarding, and other dynamic image, video, and audio capabilities. These applications vary in features and compatibility. This growing segment of communication applications provides complex levels of communication not available before.

The facsimile was a significant leap for business communication, second only to the telephone itself. Although use of the facsimile has declined as email has grown in popularity, the fax is still a widely used method to transfer documents.

Existing communication methods lack of tools for users to manage their inbound and outbound communications, and to manage privacy of personal addresses, telephone numbers, system IDs, etc.

For example, in the case of telephone calls, a call recipient has no way of controlling parties that can call them. The recipient has no way to control when they are willing to receive calls. And the recipient has no way to route calls to a particular phone number based on the identification of the party that is calling and the current date and time.

Existing communication management methods provide, for example, ways to block a caller. Caller blocking is based on the source phone number from which a call is made to a recipient phone number. However, call blocking is limited in that the calling party need only change the phone from which they call to get through the call blocking. A more comprehensive communications management approach is needed.

Existing communication methods offer only limited means of initiating a communication session. In typical existing communications systems, the calling party is required to obtain a unique "address" of a called device. For example, in the case of a telephone call, the calling party must obtain a telephone number of the call recipient in order to initiate a call. Initiating a communication session in existing communication systems requires the initiator, either human or automated system, to know the communication address of one or all parties. This arrangement risks privacy of those communicating, limits the ability to manage transmission and reception between two or more parties, and requires a third party initiator, either a person or automated system, to know the communication addresses of each participant in the communication.

SUMMARY OF THE INVENTION

The present invention provides apparatus, systems and methods for managing incoming and outgoing communications for various communications methods. A wide variety of human delivery-based, telecommunications-based, and electronic-based communications are supported in various embodiments of the invention. The invention provides control over inbound communications including definition of if, when, and who may communicate with a recipient The invention also supports concealed identification communication in that no actual addresses, phone numbers, or other addressing IDs are required to be exchanged by the communication initiator and recipient. The invention also provides the capability to initiate immediate, delayed, scheduled, or recurring outbound communications.

The invention provides a computer-based machine with the capability to manage various communication methods.

The invention provides apparatus, systems and methods for managing incoming telephone calls to an individual such that the call recipient can control if they will take calls, when they will take calls, and who they will allow to call them.

The invention provides apparatus, systems and methods for initiating rules enforced and concealed phone number telephone calls using an Internet URL, web form, or other Internet input mechanism.

The invention provides a method for telephone calls to occur without communicating parties revealing their telephone numbers.

The invention provides apparatus, systems and methods to manage telephone calls originating with an individual such that calls are automatically connected after a designated, timed delay.

The invention provides apparatus, systems and methods to manage telephone calls originating with an individual such that calls are automatically connected at a specific date and time.

The invention provides apparatus, systems and methods to manage telephone calls originating with an individual such that calls are automatically connected on a recurring schedule.

The invention provides apparatus, systems and methods of assigning one or many non-telephone system identification numbers which can be used in conjunction with the Internet and/or the traditional telecommunication system to initiate a telephone call between parties.

The invention provides apparatus, systems and methods to establish and automatically enforce rules and conditions for if, who, and when a party may leave a voice message for another.

The invention provides apparatus, systems and methods for connecting a party to another's voice messaging service using the established telecommunication system without revealing the receiving party's messaging system phone number and/or mailbox id.

The invention provides apparatus, systems and methods to establish and automatically enforce rules and conditions for if, who, and when a party may send an instant message to another.

The invention provides apparatus, systems and methods to establish and automatically enforce rules and condition for if who, and when a party may send an email message to another.

The invention provides apparatus, systems and methods for initiating managed communications via a variety of computer and Internet applications and objects.

The invention provides apparatus, systems and methods for establishing conference calls via an automated connection mechanism which will connect all parties instantly or at the established time and date and at their pre-determined phone numbers.

The invention provides apparatus, systems and methods for establishing party line connections utilizing an Internet URL, web form, or other Internet input method.

The invention provides apparatus, systems and methods for utilizing WAP or Web-enabled cellular telephone or an IP telephone to initiate telephone connections bypassing telephone carriers' phone numbering system while concealing the caller and call recipient telephone numbers.

The invention provides apparatus, systems and methods for establishing and automatically enforcing rules and conditions for if, who, and when a party may leave a text or numeric page for another.

The invention provides apparatus, systems and methods for connecting a party to another's paging service using the established telecommunication system without revealing the caller's or the paging system phone number or PIN.

The invention provides apparatus, systems and methods for offering callers and call recipients options as to who will pay for a telephone call either by dictating rules prior to the call or offering the option at the time of the call. Call recipients have the ability to define rules as to which persons they will require to pay for calls, and which persons the recipient is willing to pay. Callers are offered an ability to pay for a call when required by the recipient and optionally may pay for a call even if not required by the recipient.

The invention provides apparatus, systems and methods for placing telephone calls using an interactive television device and service.

The invention provides apparatus, systems and methods for placing telephone calls using DSS or other satellite systems.

The invention provides apparatus, systems and methods for establishing and automatically enforcing rules and conditions for if, who, and when a party may send a Short Message Service (SMS) message for another.

The invention provides apparatus, systems and methods for originating, sending, and receiving an SMS message without revealing the message recipient or the caller's number or other communication address.

The invention provides apparatus, systems and methods for establishing and automatically enforcing rules and conditions for if, who, and when a party may send a letter or package to another.

The invention provides apparatus, systems and methods for sending a letter or package to a party using established postal and delivery services without revealing the sender's or the recipient's address.

The invention provides apparatus, systems and methods for establishing and automatically enforcing rules and conditions for if, who, and when a party may connect a video conference, video phone call, or Internet-based video or audio, or multimedia communication with another.

The invention provides apparatus, systems and methods for originating and connecting a video conference, video phone call, or Internet-based video or audio, or multimedia communication without revealing the message recipient or the caller's number or other communication address.

The invention provides apparatus, systems and methods for establishing and automatically enforcing rules and conditions for if, who, and when a party may send a facsimile to another.

The invention provides apparatus, systems and methods for originating, sending, and receiving a facsimile without revealing the message recipient or the caller's fax phone number.

The invention provides apparatus, systems and methods for initiating communications sessions between two or more users, communications devices, or software applications, or combinations thereof, by a user, device, or software application participating in the communication or an independent third party user, device, or software application without the initiating party, device, or software application having knowledge of the communicating parties' communication addresses.

The invention provides apparatus, systems and methods for using keywords in a software application to initiate telephone calls.

The invention provides systems and methods for applications supporting keywords to relate phone call initiation codes generated by the invention to keywords.

The invention provides systems and methods for applications supporting keywords to relate communication initiation codes generated by the invention to keywords.

The invention provides systems and methods for applications supporting keywords to relate electronic document address codes generated by the invention to keywords.

The invention provides apparatus, systems and methods for a web browser and software applications supporting keywords to initiate a telephone call in response to input by a user of a designated identifier, such as a keyword, wherein the designated identifier is one of a plurality of designated identifiers registered with the system.

The invention provides apparatus, systems and methods for a search engine to initiate a telephone call in response to input by a user of a designated identifier, such as a keyword, wherein the designated identifier is one of a plurality of designated identifiers registered with the system.

The invention provides apparatus, systems and methods for relating Domain Name Service (DNS) host entries to system codes and phone numbers in the system.

The invention provides apparatus, systems and methods for relating Domain Name Service (DNS) host entries to system codes and communication addresses in the system.

The invention provides apparatus, systems and methods for relating Domain Name Service (DNS) host entries to system codes and electronic document addresses in the system.

The invention provides apparatus, systems and methods for initiating telephone calls in response to a user input into a web browser input box of a host name or a complete URL of a host name.

The invention provides apparatus, systems and methods for initiating various communication types in response to a user input into a web browser box of a host name or complete URL of a host name.

The invention provides apparatus, systems and methods for automated downloading of electronic documents in response to a user input into a web browser box of a host name or a complete URL of a host name.

The invention provides systems and methods for search engines supporting result set keywords to relate phone call initiation codes generated by the invention to keywords.

The invention provides systems and methods for search engines supporting result set keywords to relate communication initiation codes generated by the invention to keywords.

The invention provides systems and methods for search engines supporting result set keywords to relate electronic document address codes generated by the invention to keywords.

The invention provides systems and methods for search engines to evaluate search result sets for the presence of defined words or characters, also referenced herein as "result set keywords", and to insert phone call initiation links or buttons into the search results displayed to the user.

The invention provides systems and methods for search engines to evaluate search result sets for the presence of result set keywords and to insert communication initiation links or buttons into the search results displayed to the user.

The invention provides systems and methods for search engines to evaluate search result sets for the presence of result set keywords and to insert electronic document download links or buttons into the search results displayed to the user.

The invention provides apparatus, systems, and methods for search engines to index web pages encoded with special meta tags in a way that allows for automatic extraction of phone number, communication address, and/or electronic document address, for which the invention generates a system code embedded URL that will in turn be added as a link or button to the search results displayed to the user.

The invention provides apparatus, systems, and methods for search engines to index web pages encoded with special meta tags in a way that allows for automatic extraction of invention generated URLs for phone number, communication address, and/or electronic document address, that will be added as a link or button to the search results displayed to the user.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

The present invention provides management capabilities to a wide variety of communication methods and their supporting devices, including but not limited to the various communication methods described above. It will be understood by someone with ordinary skill in the art, however, that the present invention may be embodied in various forms and be implemented with other existing and future communication methods without departing from the spirit of the invention. Accordingly, the types of communications methods described above with which the present invention can be use is not a limitation of the invention, but are representative and illustrative.

Detailed descriptions of an exemplary embodiment are provided herein. It is to be understood, however, that the present invention may be embodied in various forms. Therefore, specific details disclosed herein are not to be interpreted as limiting, but rather as a basis for teaching one skilled in the art to employ the present invention in virtually any appropriately detailed system, structure or manner.

In the exemplary embodiment of the present invention, a number of stored procedures are provided to perform functions, some of which are described in summary in the section below herein entitled "EXEMPLARY EMBODIMENT STORED PROCEDURE SUMMARY".

In the exemplary embodiment, an Application Programming Interface (API) is provided with which service providers of applications, search engines, and the like can invoke certain functions of the exemplary system of the exemplary embodiment of the present invention. A number of API instruction components in the exemplary API are summarized in the section below herein entitled "EXEMPLARY EMBODIMENT APPLICATION PROGRAMMING INTERFACE".

In the exemplary embodiment of the present invention, a computer and software applications of the exemplary embodiment of the present invention will be implemented with, among other things, a Windows 2000™ (Microsoft product) server operating system being run on an Intel™ Pentium™ processor. Table 1 depicts further systems tools with which the exemplary embodiment of the present invention would be implemented.

TABLE 1

Computer Technologies for an
Exemplary Embodiment of the Present Invention

Windows 2000 Advanced Server
Microsoft IIS
Active Server Pages
COM
aspHTTP - commercial product used for HTTP form posting
aspEncrypt - commercial product we use for encrypting data
aspEmail - commercial product used for sending email via SMTP
ADO
Microsoft SQL Server 2000

It will be understood by someone with ordinary skill in the art that the present invention can be implemented using modifications to other operating systems and processors without departing from the spirit of the present invention. The invention provides for scalability and distributability; the invention can be implemented on one server, or across as many servers as necessary to satisfy performance requirements.

Figure 1:
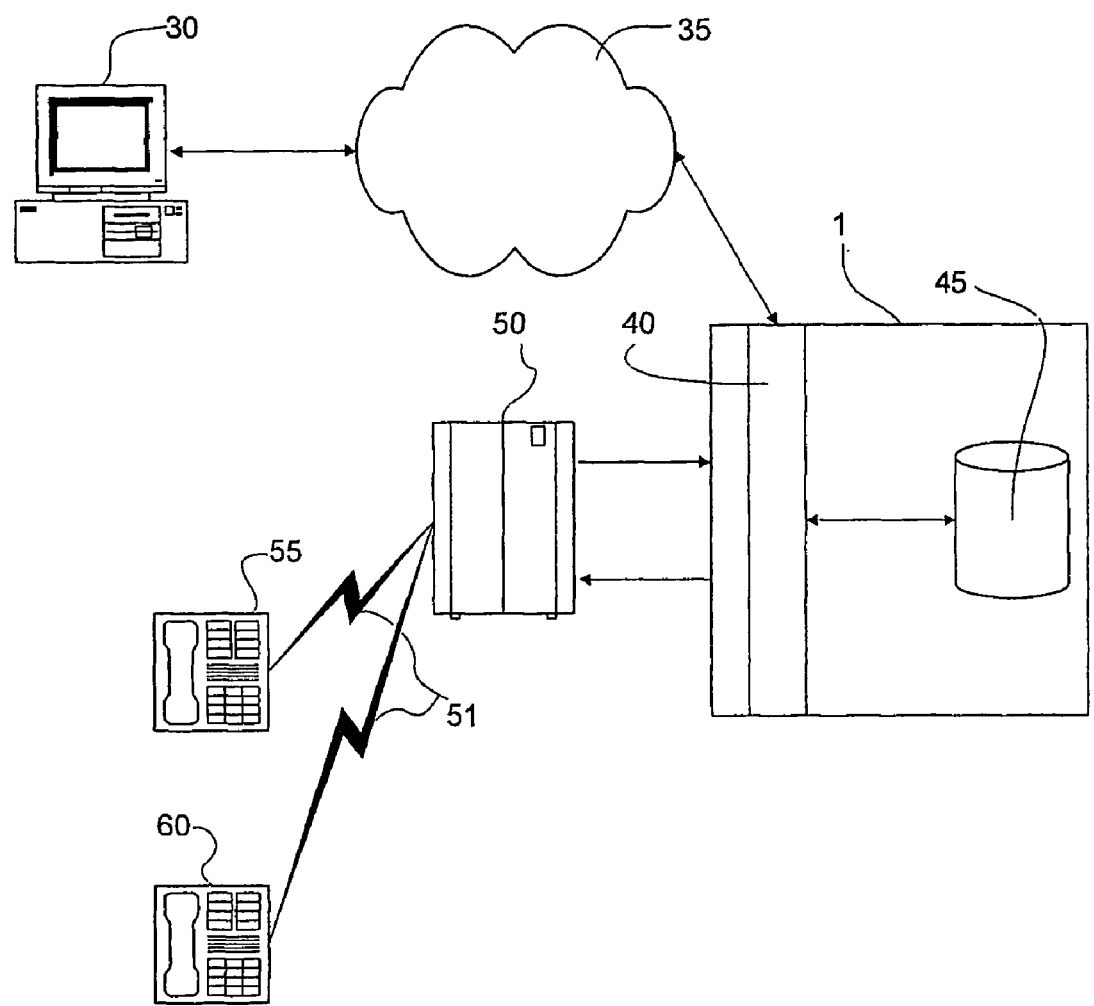
FIG. 1 is a graphic representation of a computer for managing communication connected to both a traditional telephone network and the Internet in an exemplary embodiment of the invention.

FIG. 1 is a graphic representation of a computer 1 for managing communication that is connected to both a traditional telephone network and the Internet in an exemplary embodiment of the invention. The computer 1 is of the traditional type including ROM, RAM, a processor, etc. The computer 1 is shown connected to a public telephone system switch 50, which is in turn connected to the worldwide public telephone network 51. The computer 1 is also connected to a global communications network, which is depicted as the Internet 35. As will be further disclosed below, the computer 1 contains the hardware, application software, and database with which to operate features of the invention.

A telephone system user who is initiating a call, or the "caller", has a telephone, e.g., 55, connected to the public telephone network 51 or is using an analog or digital cellular phone, and has a computer of the traditional type 30 connected to the Internet 35 (also referred to herein as the "public Internet").

Another telephone system user who will receive the call, or the "call recipient", has a telephone, e.g., 60, connected to the public telephone network 51 or is using an analog or digital cellular phone.

The caller initiates the phone call using their computer 30, accessing an application presented over the public Internet, such application hosted by the computer 1 of the present invention. Upon initiating a phone call, the caller's connection request is validated by the application software logic 40. The application software logic 40 evaluates the call request for validity of syntax and structure, then searches the rules database 45 for records associated with the call recipient's call management settings.

If there are no such call management settings for the call recipient, the system can respond based on system, group, or per user default setting to either allow or disallow the call. This provides the flexibility to by default connect all calls that do not associate to a rule, or to by default deny all calls that do not associate to a rule.

If the database 45 does contain call management settings for the call recipient, the application logic 40 will evaluate the rules to determine if the caller is authorized to connect with the call recipient at the current time and date. If the caller is authorized by the recipient to connect a recipient phone number, and is furthermore authorized to do so for the current time and date, the application logic 40 will connect the call utilizing the public telephone switch 50. The computer 1 passes the caller and call recipient phone numbers as stored in the database 45 to the telephone switch 50 using an application programming interface ("API") appropriate to the service provider or telephone switch manufacturer. The exemplary embodiment of the invention utilizes an API provided by a telephone service provider as an interface to its switching infrastructure 50. The API captures both caller and recipient telephone numbers along with other variables useful for call setup and tracking. The telephone service provider then connects both parties telephones 55 and 60 to a phone call by dialing both numbers and connecting the call upon the parties' answer.

Figure 58:
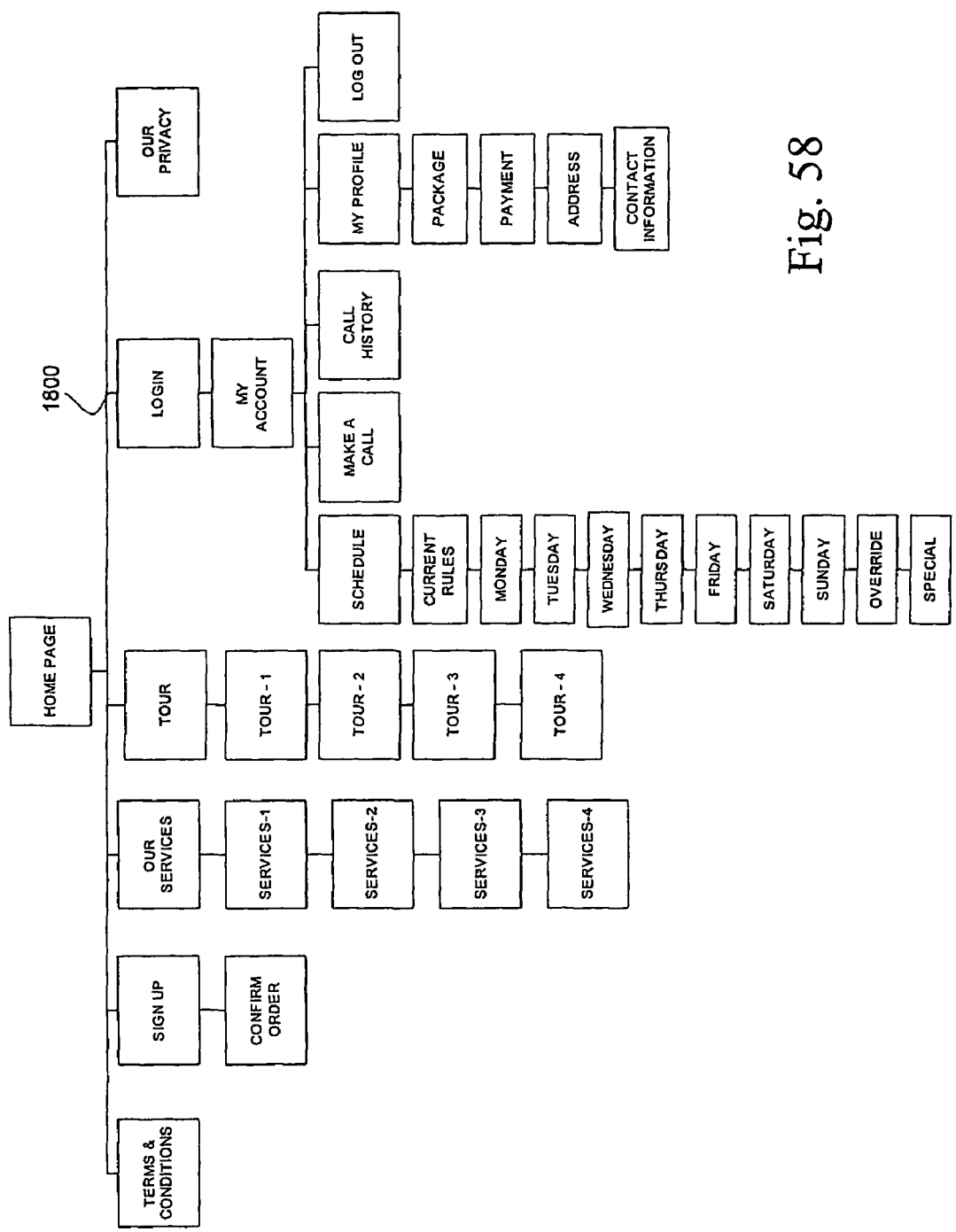
FIG. 58 is a block diagram depicting the hierarchy of computer screens that comprise the user application interface of an exemplary embodiment of the present invention.

In the exemplary embodiment, users utilize an application interface in order to manage their voice communications. This interface is provided to the user via commercially and freely available standard web browsers, using JavaScript enhanced HTML web pages, delivered via HTTP over the public Internet. Application system administration, which is used by the service provider to maintain the system and manage its users, is also delivered via web browser and includes activeX components and Java applets. The user application interface is represented in a system map diagram FIG. 58. FIG. 58 maps the exemplary user web site application, including marketing information pages, service agreements, and membership registration which are not pertinent to the invention but are nonetheless a part of the system. The active part of the web application consists of the pages or screens below the "LOGIN" section in the diagram 1800. These screens provide the capabilities for users to employ the invention according to its design.

Figure 33:
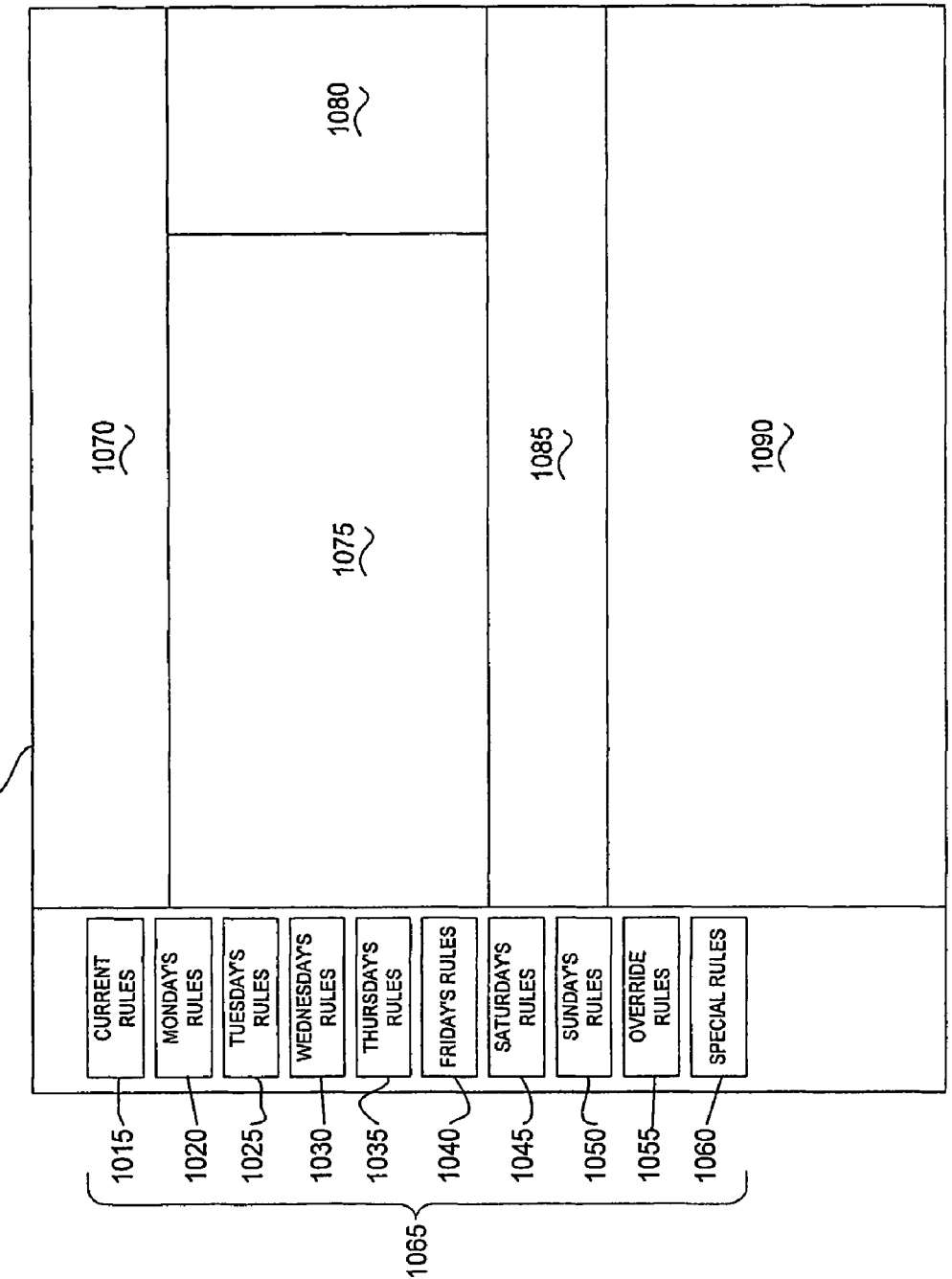
FIG. 33 is a graphic representation depicting a computer screen that serves as a status and quick override of inbound call management rules in an exemplary embodiment of the invention.

FIG. 33 is a graphic representation depicting a computer screen that serves as a status and quick override of inbound call management rules in an exemplary embodiment of the invention. As depicted in FIG. 33, the main frame of the screen 1010, presented within a web browser, contains all of the elements "within screen", as do all screens within the application.

As depicted in FIG. 33, a screen heading area 1070 contains the screen heading, including a label, such as "Incoming Call Management Status", and contains text explaining the purpose of the screen.

Continuing with FIG. 33, the rules area 1075 contains the current time and date and provides the user with interactive fields with which to quickly override any current rule including: disabling the taking of incoming voice calls; enabling the taking of incoming voice calls to a specified phone number; modifying the paying party setting to be the caller or call recipient (according to method discussed in FIG. 20); and ability to cancel a currently active quick override.

The statistics area 1080 displays simple call statistics of the current day, including: number of calls processed on current day; last call processed time; caller type of member or non-member for last inbound call; and users phone number the call was sent to.

The link area 1085 contains an Internet URL which can be distributed by the user in order that others may call the user without revealing the user phone number and within the constraints set by the user via call management rules. This link area 1085 also contains a function allowing the user to anonymously email the URL to another person.

The current activity area 1090 displays all currently active inbound call management rules for the day. The current activity area 1090 includes a line item for each rule containing the time range the rule is in effect, the phone number inbound calls will be sent to, and an indicator of whether the caller or call recipient will be required to pay for the call connect charges. For each displayed rule, The current activity area 1090 also provides the ability to delete the rule or to modify the rule by clicking the appropriate button.

The navigation area 1065 contains the navigation for the entire inbound call management rules section. The navigation area comprises buttons and links within the web applications which are activated by clicking on the buttons. For example, as depicted in FIG. 33, the button 1015 labeled "CURRENT RULES" links to the current screen 1010. The buttons 1020, 1025, 1030, 1035, 1040, 1045, and 1050 respectively are linked to individual screens for each day of the week. These pages establish rules for a perpetual scheduled rule set which is activated by utilizing the URL as presented to the user call recipient in 1085. Button 1055 labeled "OVERRIDE RULES" links to a screen providing a flexible way to schedule overrides to perpetual or expiration based rules. A "SPECIAL RULES" button 1060 takes the user to a screen where expiration based rules can be user-defined.

Figure 34:
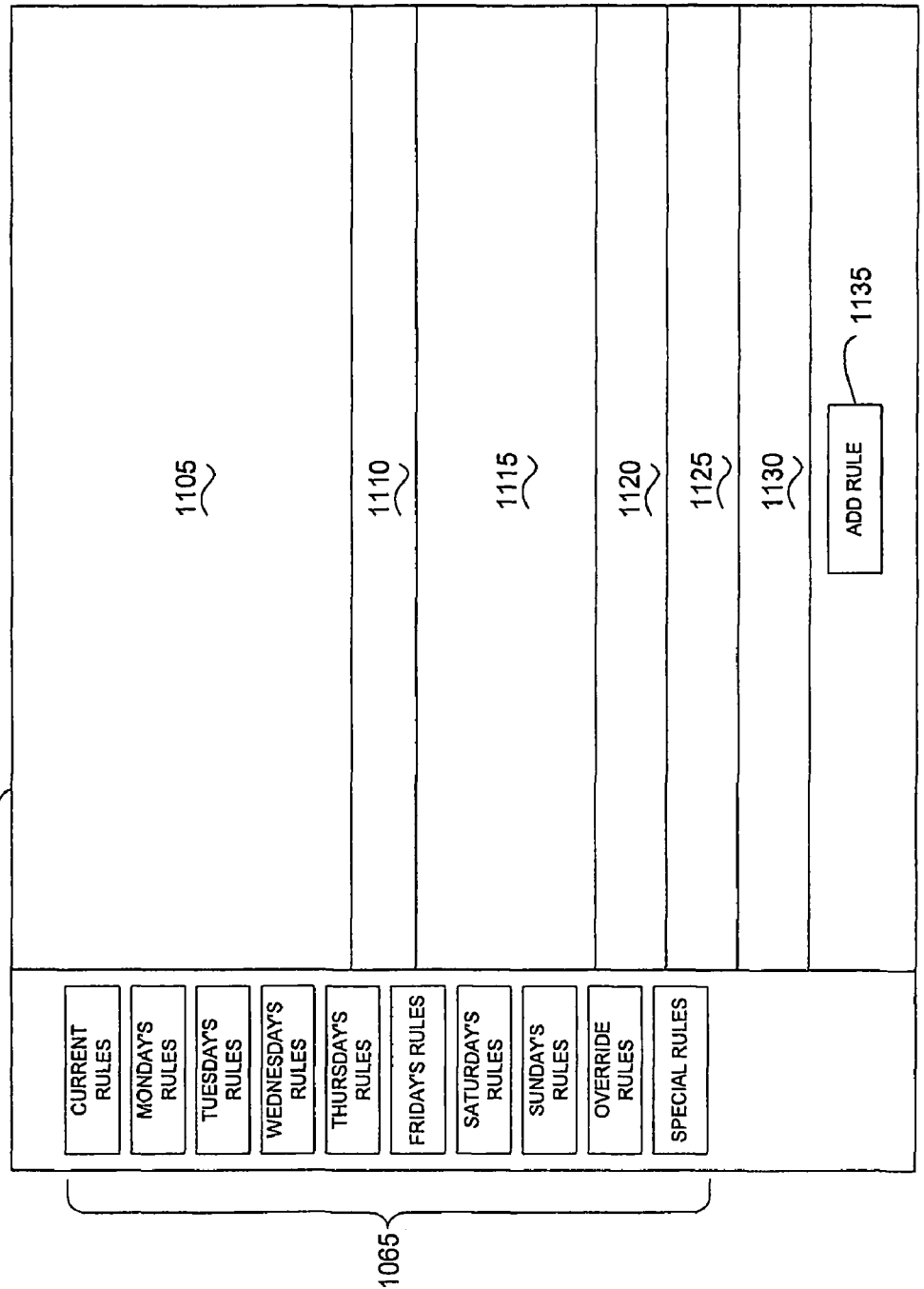
FIG. 34 is a graphic representation depicting a computer screen that provides users the ability to add an inbound call management rule for a specific day of the week in an exemplary embodiment of the invention.

FIG. 34 is a graphic representation of a computer screen that serves as a mechanism to define perpetual call management rules for a specific day of the week in the exemplary embodiment of the invention. The buttons labeled as the seven days of the week Monday through Sunday in 1065 each link as described above to a relevant screen. In the exemplary embodiment, the screens are identical in functionality and only differ in their labeling and the fact that each will contain a display of rules active only on that day of the week. The main frame of the screen 1095, presented within a web browser, contains all of the elements within the screen. As a result of a user utilizing this screen, they will have defined time ranges in which they are willing to receive calls on the specified day of week and associated phone numbers in which to forward calls when calls come within the applicable time ranges.

The area 1105 contains a label for the page containing the day of week designation along with instructions on use of the screen.

The area 1110 contains a user text input box along with a prompt for the user to enter a "Rule Note" which will be associated with a new rule the user creates for this day of week.

The area 1115 provides input boxes for defining a time of day range for the rule being defined. There is also a check box for quickly designating that the user wishes to take calls for the complete 24-hour period.

The area 1120 contains user input boxes to capture the phone number where incoming calls are to be forwarded if they are within the valid time range and day of week.

The area 1125 provides a shortcut mechanism for the user to copy the rule being created to all weekdays (Monday through Friday) or all 7 days of the week, or otherwise leaving the default selection of applying the rule to just the current day.

The area 1130 contains a selection for the user to determine if they, the call recipient, will pay for the connection charges associated with the call or if the caller will be required to pay upon initiating a call to them.

The button labeled "ADD RULE" 1135 submits the user input from the screen to the application logic to evaluate the validity of the input and to record the new rule into the database if the input is valid. If the input is not valid, the screen will return a message in area 1105 indicating the data errors and prompting the user to correct the problem and resubmit the screen using 1135.

Figure 35:
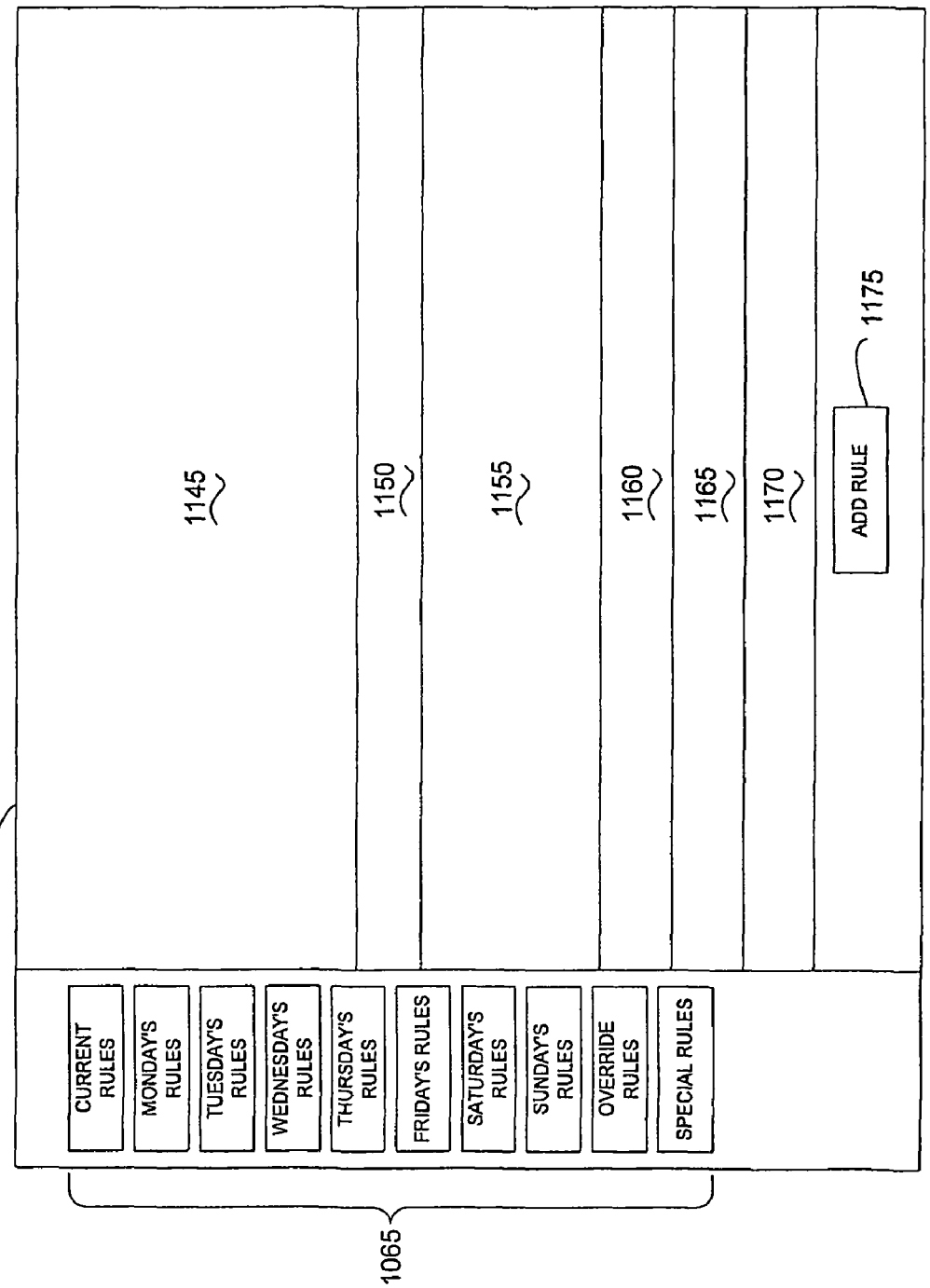
FIG. 35 is a graphic representation depicting a computer screen that provides users the ability to override inbound call management rules for a specific time and date range in an exemplary embodiment of the invention.

FIG. 35 is a graphic representation of a computer screen that serves as a mechanism to override call management rules for a specific date and time range in the exemplary embodiment of the present invention. The screen is important as a quick method to override existing call rules as the user's business or personal plans temporarily change the way they would prefer to handle incoming phone calls. This capability is presented to the user as an "Override Rule". The navigation buttons in area 1065 are consistent with all pages within the inbound call management section.

Area 1145 contains a label for the page "Override Rules" along with instructions on use of the screen.

The area 1150 contains a user text input box along with a prompt for to enter a "Rule Note" which will be associated with the new override rule the user creates.

The area 1155 provides input boxes for defining a date range and time of day range for the override rule being defined.

The area 1160 contains user input boxes to capture the phone number where incoming calls are to be forwarded during the override period. The phone number entered here is used instead of numbers entered with the user's call management rules. The area also has a yes or no selection to indicate if the user is going to be accepting calls during the period defined by the override rule. If the user selects "Yes", then validated calls are forwarded to the number the user provides, if "No" is selected inbound calls are rejected during the override period.

The area 1165 contains a selection box to indicate if "Special Rules" are to be overridden. "Special Rules" as implemented into the system are rules that have specific date ranges for being active and therefore do not apply on a permanent schedule as do the perpetual rules. Checking this box will override both the perpetual and fixed date range rules.

The area 1170 contains a selection for the user to determine if they, the call recipient, will pay for the connection charges associated with the call or if the caller will be required to pay upon initiating a call to them.

The button labeled "ADD RULE" 1175 submits the user input from the screen to the application logic to evaluate the validity of the input and to record the new rule into the database if the input is valid. If the input is not valid, the screen will return a message in area 1145 indicating the data errors and prompting the user to correct the problem and resubmit the screen using 1175.

Figure 36:
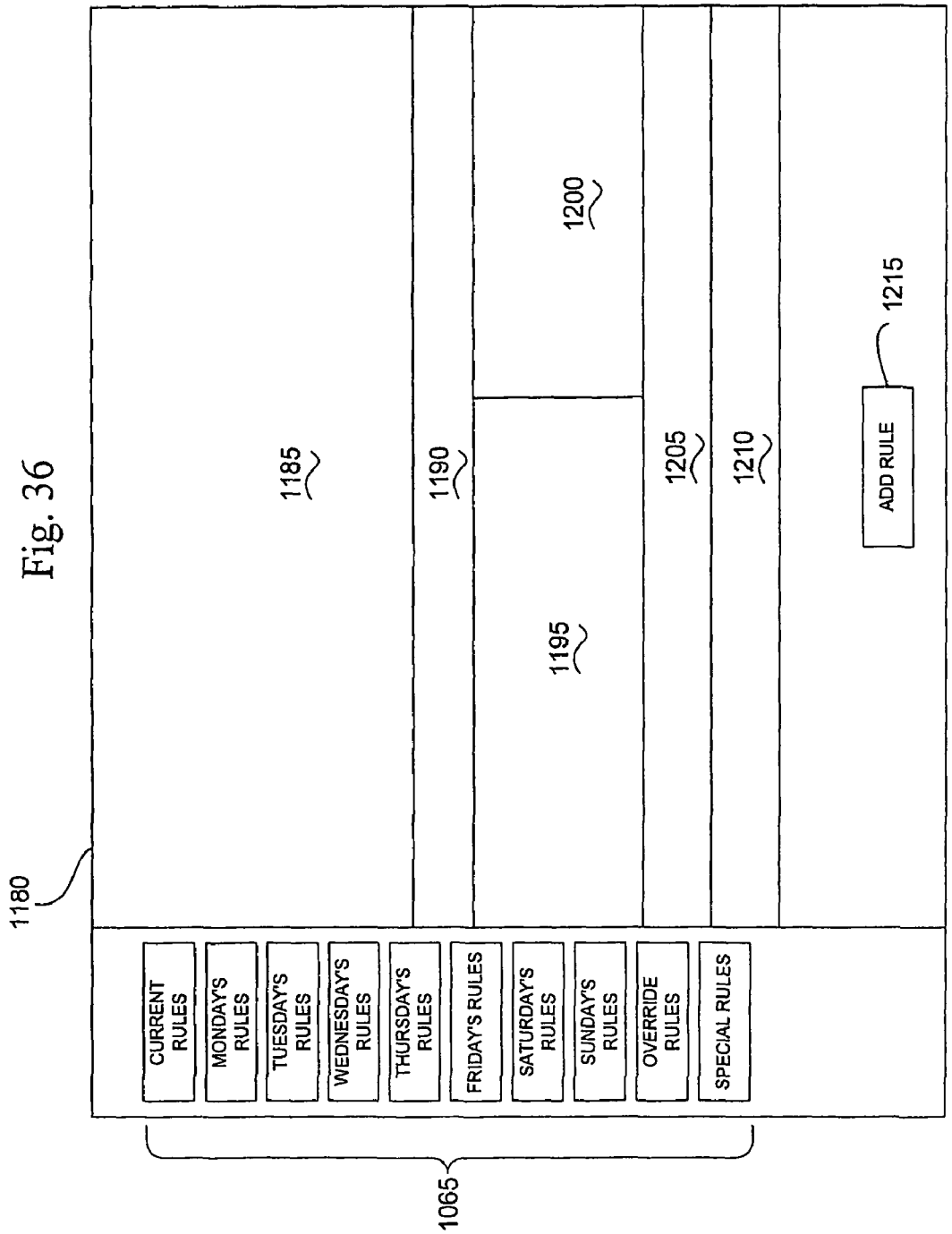
FIG. 36 is a graphic representation depicting a computer screen that provides users the ability to add an inbound call management rule for a specific time and date range and apply that rule to one or more days of the week in an exemplary embodiment of the invention.

FIG. 36 is a graphic representation of a computer screen that serves as a mechanism to define fixed date range, expiring call management rules in the exemplary embodiment of the present invention. The button labeled as "SPECIAL RULES" in 1065 link to the screen. The main frame of the screen 1180, presented within a web browser, contains all of the elements within screen. As a result of a user utilizing this screen, they will have defined date and time ranges in which they are willing to receive calls on the specified days of the week and associated phone numbers in which to forward calls when calls come within the applicable date and time ranges.

The area 1185 contains a label for the page "Special Rules" along with instructions on use of the screen.

The area 1190 contains a user text input box along with a prompt for a user to enter a "Rule Note" which will be associated with a new rule the user creates for this day of week.

The area 1195 provides input boxes for defining a date range and time of day range for the rule being defined. There is also a check box for quickly designating that the user wishes to take calls for the complete 24 hour period.

The area 1200 contains check boxes for all 7 days of the week. The user selects which days of the week the rule should apply. The date and time range from 1195 will be used in conjunction with the days of week selected to determine when the rule will be applied.

The area 1205 contains user input boxes to capture the phone number where incoming calls are to be forwarded if they are within the valid date, time, and day of week range.

The area 1210 contains a selection for the user to determine if they, the call recipient, will pay for the connection charges associated with the call or if the caller will be required to pay upon initiating a call to them.

The button labeled "ADD RULE" 1215 submits the user input from the screen to the application logic to evaluate the validity of the input and to record the new rule into the database if the input is valid. If the input is not valid, the screen will return a message in area 1185, indicating the data errors and prompting the user to correct the problem and resubmit the screen using 1215.

Figure 59:
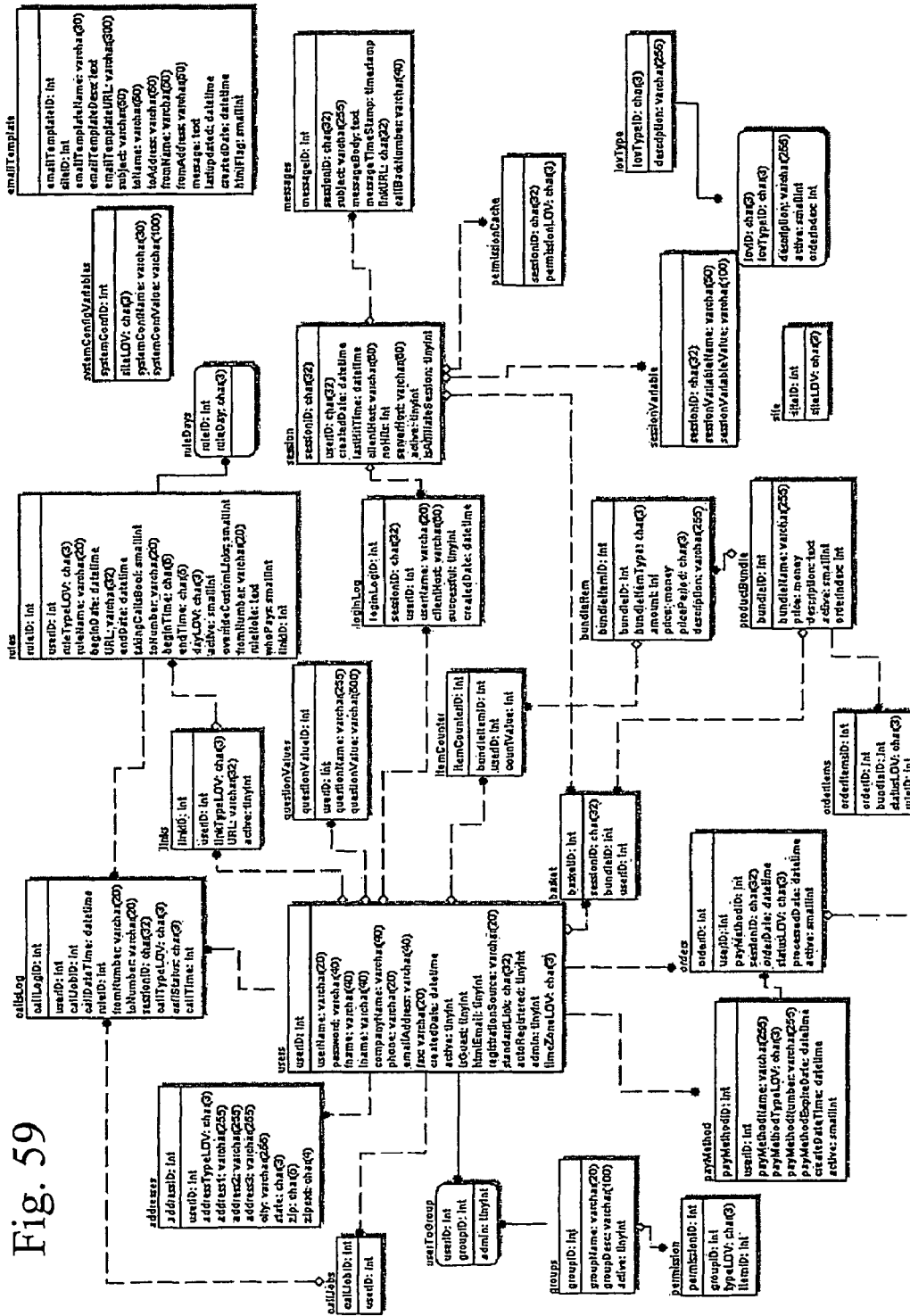
FIG. 59 is a data relationship diagram depicting data relationships in an exemplary embodiment of the present invention.

FIG. 59 is a representation of an exemplary database model used by the invention to manage some of the key data elements and their relationships in order to accomplish some of the functionality provided by the invention.

Figure 2:
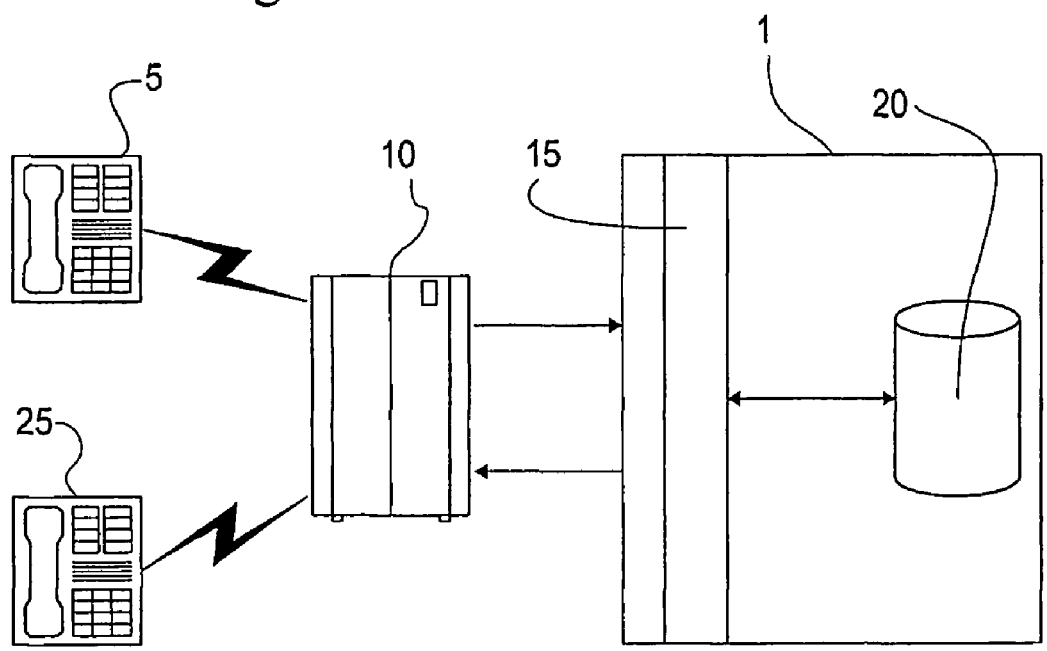
FIG. 2 is a graphic representation of a computer for managing communications connected to a traditional telephone network in an exemplary embodiment of the invention.

In FIG. 2, there is shown an arrangement and apparatus for carrying out an embodiment of the invention. A computer 1 is a computer of the traditional type including ROM, RAM, a processor, etc. is shown connected to a public telephone system switch 10, which is in turn connected to the worldwide public telephone network.

A telephone system user who is initiating a call, or the "caller", has a telephone connected to the public telephone network 5 or is using an analog or digital cellular phone.

Upon initiating a phone call, the caller's connection request is validated by the telephone switch 10 by passing the call request to the application logic 15 of the computer 1. The application logic 15 evaluates the call request for validity of syntax and structure, then searches the rules database 20 for records associated with the call recipient's call management settings.

If there are no such call management settings for the call recipient, the system can respond based on system, group, or per user default setting to either allow or disallow the call. This provides the flexibility to by default connect all calls that do not associated to a rule, or to by default deny all calls that do not associate to a rule.

If the database 20 does contain call management settings for the call recipient, the application logic 15 will evaluate the rules to determine if the caller is authorized to connect with the call recipient at the current time and date. If the caller is authorized by the recipient to connect a recipient phone number, and furthermore authorized for the current time and date, the application logic 15 will connect the call utilizing the public telephone switch 10. Depending on the API used with the telephone switch 10, this may be accomplished by returning a call approval code to the switch, or establishing a new call setup sequence as provided by the switch 10 API. If the API provides for passing an approval or denial code, the switch can simply connect the call just as it would if it were not interfaced with the invention computer 1. If the switch API does not support the specific functionality required to receive call approval and denial codes from an external system, then a new call can be established such that the original caller connection is terminated and a new call is established to both caller and call recipient phone numbers. As the telephone switch manufacturers and telephone application systems have a varied set APIs available to interface with the telephone switching infrastructure, the actual call connection method will depend on the switching hardware and software utilized in a particular implementation.

Figure 3:
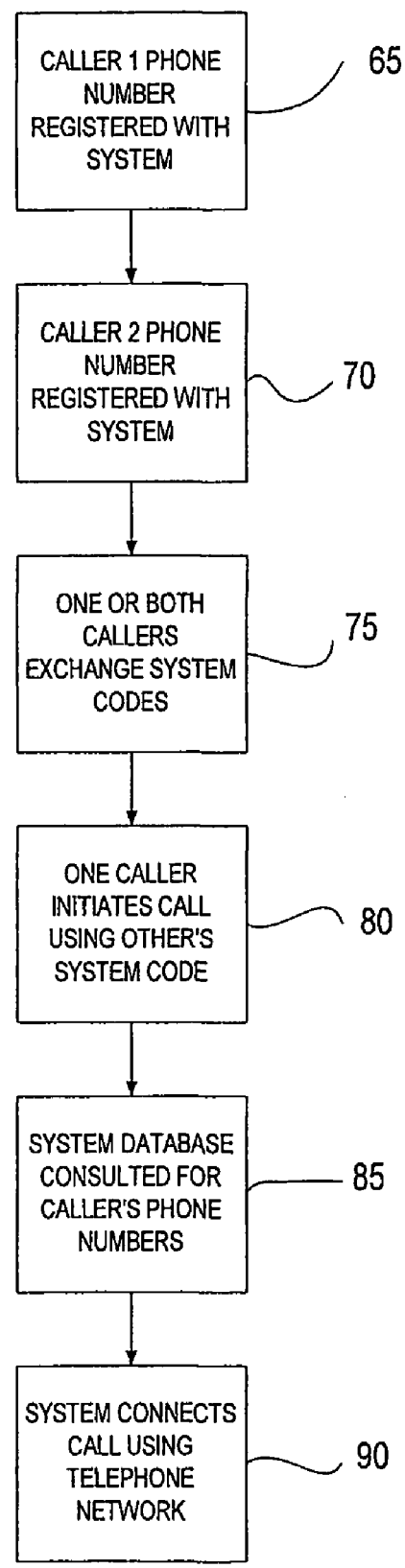
FIG. 3 is a flow chart of the process of an exemplary embodiment of the present invention for connecting two parties to a phone call without revealing telephone numbers to either party.

FIG. 3 is a flowchart of the process in the current embodiment of the invention to connect two parties to a telephone call while keeping the caller and call recipient's phone numbers concealed. The same process could accommodate more than two parties when connecting a three-way or conference call simply by adding the additional callers using the same process. In order to provide a concealed phone number capability to the users, both the caller's 65 and the call recipient's 70 telephone numbers must be registered within the application of the invention computer.

Upon registering with the application system in the exemplary embodiment, at least one of the users must register as a member of the system by filling out a sign up form designating a choice of the monthly service offering and providing a payment method of credit card or online check. Upon registration, one or both users, depending on their choices to become a member, is able to distribute one or more unique system codes 75. In the exemplary embodiment, the system codes are generated and embedded into an Internet URL which can be used to initiate a call.

http://jules.dafoink.com/talkRules/callLink.asp?trID=5631EDC86148489C9BFA904CAD80D4AA In the example above, each code is a unique identifier generated by a publicly know algorithm referred to as GUID (globally unique identifier). Generation of a GUID is not an object of the invention. The generated GUID is unique; the same GUID will not be generated again.

In the example above, the code is the string of alphanumeric characters ("5631EDC86148489C9BFA904CAD80D4AA") appearing after the "=" in the URL. In other embodiments of the invention, the system code could be utilized without the URL, or other forms of a unique identifier could be used as an alternative. For example, a 10 digit numeric string similar to a traditional telephone number could be assigned to a user and this system code could be used as the identifier which references the user's actual telephone number and call management rules associated with it.

In the exemplary embodiment, callers may distribute their system code embedded URLs in a variety of ways, which are standard communication methods including but not limited to: email, voice, written, chat, instant messaging, and public or private web sites.

Regardless of the method used to distribute the URL, in the exemplary embodiment a potential caller must obtain the URL with embedded system code in order to initiate a telephone call. The caller initiates the telephone call 80 by clicking on the URL in an enabled application or by pasting or typing the URL string into their web browser address box. The URL engages the application system logic of the invention to verify the structure and contents of the URL and to search the application database for the telephone number of the recipient associated with the system code 85. It should be noted that the caller's phone number must also be registered with the application system in order to connect a call. The application system obtains this information from the caller 70 prior to connecting the call.

In other embodiments of the invention, the system code processing and call initiation could be handled in a variety of ways. For example, the caller could call a fixed telephone number for a service provider, and then be prompted to enter the call recipient's system code upon which the system would connect the call.

The invention uses the telephone numbers for the caller and call recipient stored in its database to connect both parties to a telephone call 90. The connection is accomplished by integrating the invention with a telephone switching device or switching device API. In utilizing the system code method, neither the caller or call recipient is required to reveal their telephone number to the other.

Figure 4:
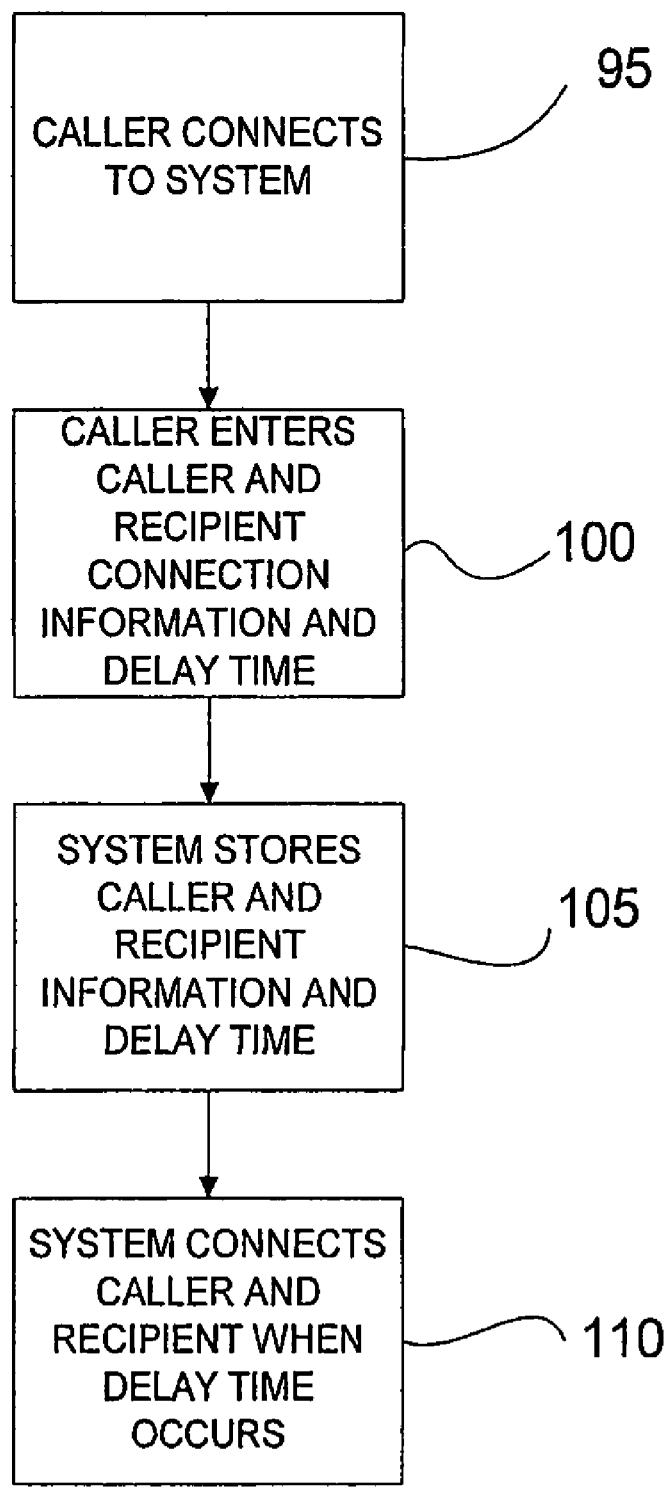
FIG. 4 is a flow chart of the process of an exemplary embodiment of the present invention to automatically connect parties to a phone call after a specific delay time.

FIG. 4 is a flowchart of the process in the exemplary embodiment of the invention to connect two parties to a telephone call after a specified delay time. The caller connects to the application interface of the invention 95 and provides the caller and call recipient telephone numbers, or other connection code as described elsewhere related to the invention, along with the required delay time in hours and minutes 100. In an alternative embodiment, the invention could also accommodate delay times in years, months, and days as well. The application logic validates the user input and stores the connection information in the application database 105 and creates an event trigger which will occur upon completion of the delay time. When the delay time has completed the system will connect the caller and call recipient 110. This capability of the invention can be used to quickly schedule and connect phone calls in the future based on a delay as opposed to a fixed date and time.

Figure 5:
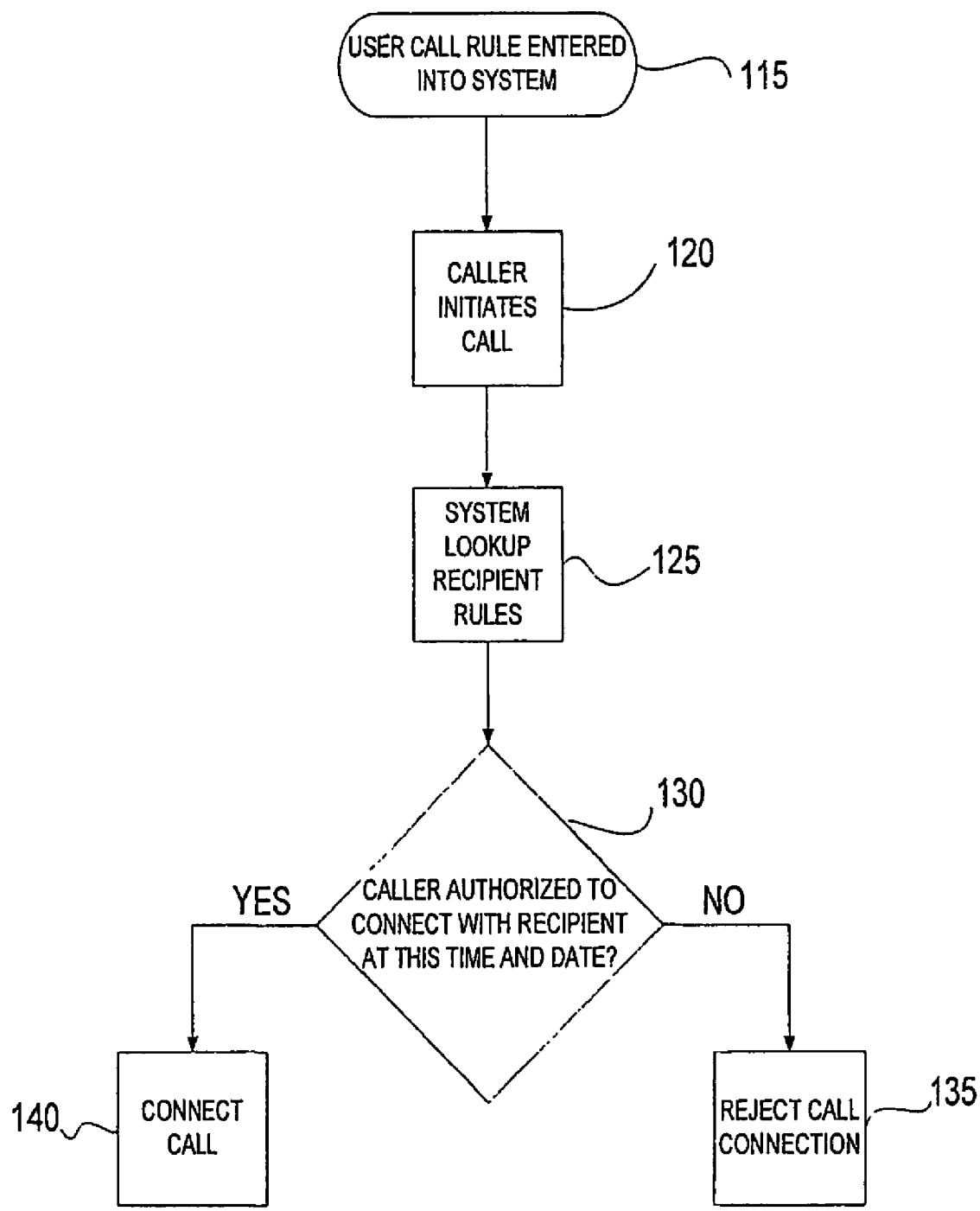
FIG. 5 is a flow chart of the process of an exemplary embodiment of the present invention to manage inbound telephone calls such that the call recipient can control if, when, and who may call them.

FIG. 5 is a flowchart of the process in the exemplary embodiment of the invention to manage inbound telephone calls to a user such that the call recipient user can control if they may be called, when they are willing to accept phone calls, and who may call them.

As depicted in FIG. 5, the call recipient connects to the application interface of the invention 115 and defines one or more rules to be applied as incoming telephone calls are processed. In the exemplary embodiment the rules are associated with a unique system code related to the rules but other embodiments could implement the rules without such requirement by merely associating the rules with the caller and call recipient's telephone numbers.

Continuing with FIG. 5, when the caller initiates a call 120, the system of the invention, which is integrated with the telephone switching mechanism, will lookup the target call recipient rules in the application system database 125. In the exemplary embodiment of the invention, initiating the call is accomplished utilizing an Internet URL from a computer of the traditional type connected to the public Internet. Other embodiments of the invention could initiate the call from a traditional telephone, analog or digital cellular phone, or other voice communication enabled device.

The call recipient rules are compared to the current general rules they have defined for processing incoming calls or specific rules associated to the caller or source phone number of the call. In the exemplary embodiment of the system, a unique system code embedded within an Internet URL is compared to rules associated with that code to determine if the call should be connected. In either the exemplary or other embodiments of the system, the call recipient's rules are evaluated to determine if the caller is authorized to connect with the call recipient at the current date and time 130. If the rules allow the call to be connected, the system will connect the call 140 utilizing its connection to a telephone switching infrastructure. If the rules dictate that a call is not authorized to be connected, then the call is rejected 135. In the exemplary embodiment of the invention, this rejection is represented to the caller in the form of a message displayed on their web browser screen. Alternative embodiments of the invention may utilize other methods to notify the caller of the rejection, or may not notify the user and rather just not connect the call.

Figure 6:
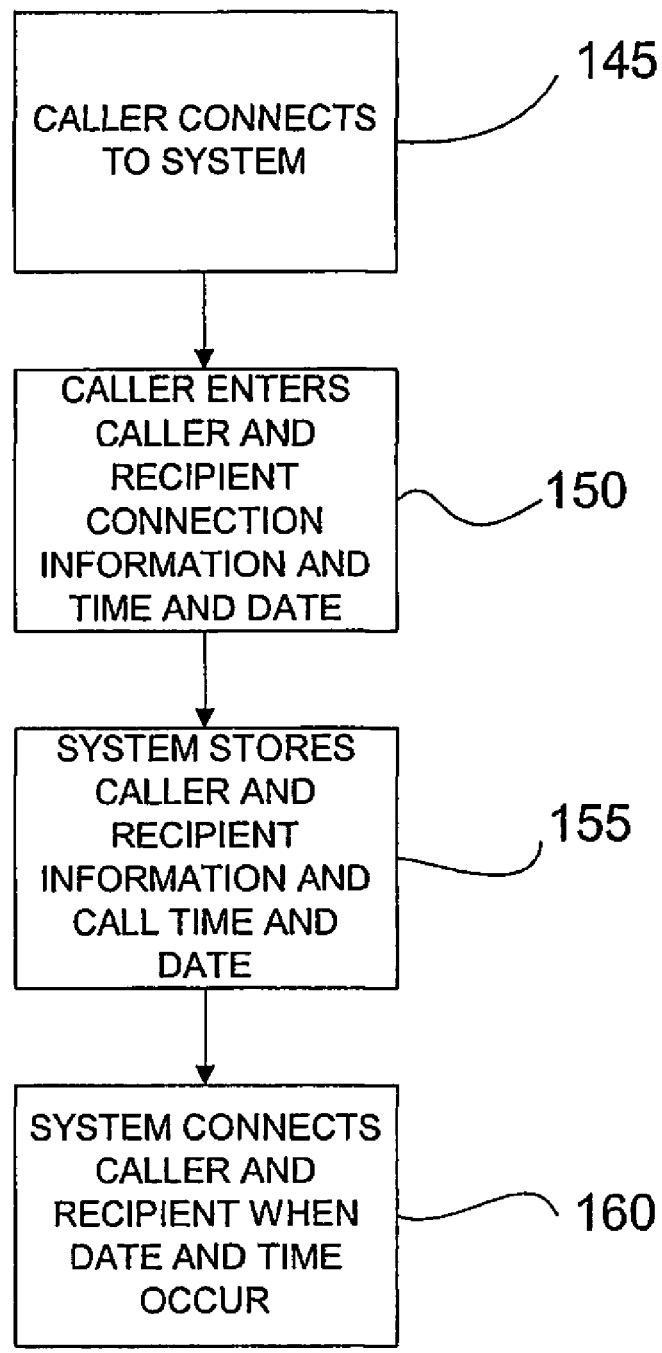
FIG. 6 is a flow chart of the process of an exemplary embodiment of the present invention to automatically connect parties to a phone call at a specific date and time.

FIG. 6 is a flowchart of the process in the exemplary embodiment of the invention to connect two parties to a telephone call at a specific date and time. The caller connects to the application interface of the invention 145 and provides the caller and call recipient telephone numbers, or other connection code as described elsewhere related to the invention, along with the required date and time in hours and minutes 150. In alternative embodiments, the invention could also accommodate time in more precise terms such as seconds or fractions of a second. The application logic validates the user input and stores the connection information in the application database 155 and creates an event trigger which will occur upon reaching the date and time specified. When the date and time has been reached the system will connect the caller and call recipient 160. This capability of the invention can be used to quickly schedule and connect phone calls in the future based on a fixed date and time.

Figure 7:
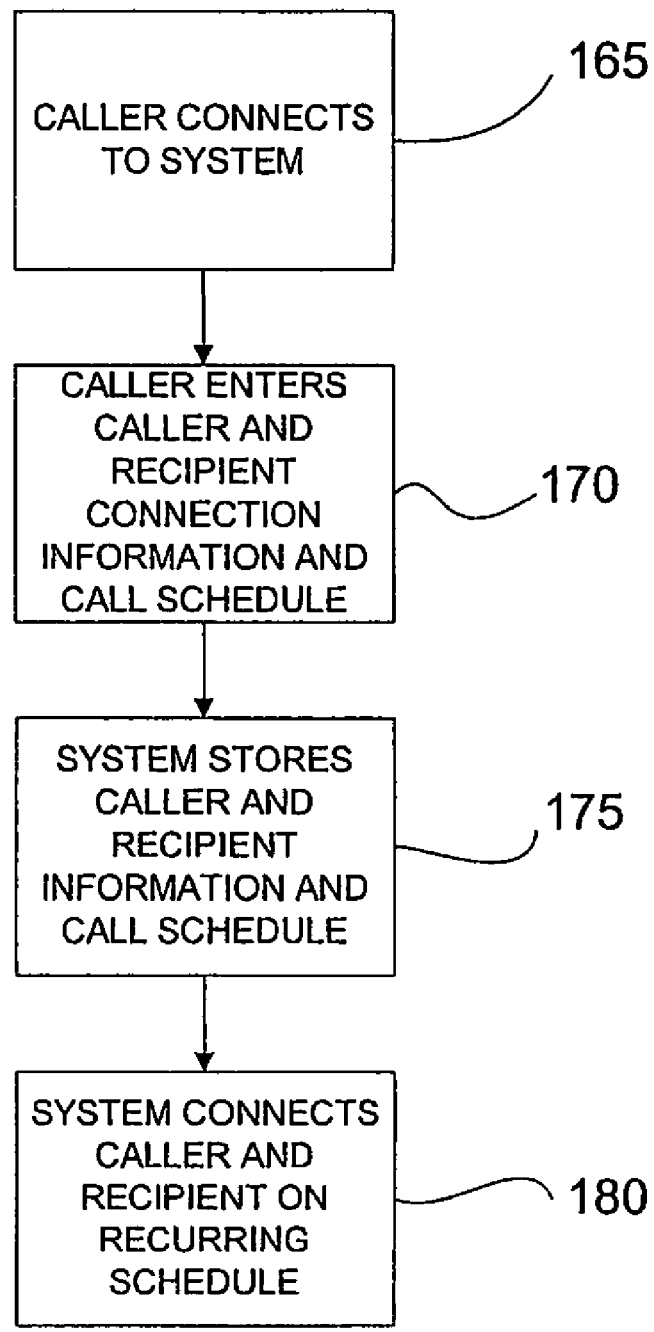
FIG. 7 is a flow chart of the process of an exemplary embodiment of the present invention to automatically connect parties to a phone call on a recurring schedule.

FIG. 7 is a flowchart of the process in an embodiment of the invention to connect two parties to a telephone call at according to a recurring schedule. The caller connects to the application interface of the invention 165 and provides the caller and call recipient telephone numbers, or other connection code as described elsewhere related to the invention, along with the required recurring schedule definition 170. The scheduled day could be represented as specific days of the year (example every March 1st, or every year on the 35th day of the year), days of the month (example the 15th of every month, the first Tuesday of every month), days of a week (example every Tuesday). The scheduled time would be represented in hours and minutes or if necessary, in more precise terms such as seconds or fractions of a second. The application logic validates the user input and stores the connection information in the application database 175 and creates an event trigger which will occur upon reaching the first occurrence of the date and time as specified in the schedule. When the date and time has been reached the system will connect the caller and call recipient 180. The system would use either a perpetual event trigger or submit a new trigger for the next scheduled call for each instance. This capability of the invention can be used to quickly schedule and connect phone calls in the future based on a recurring call schedule.

Figure 8:
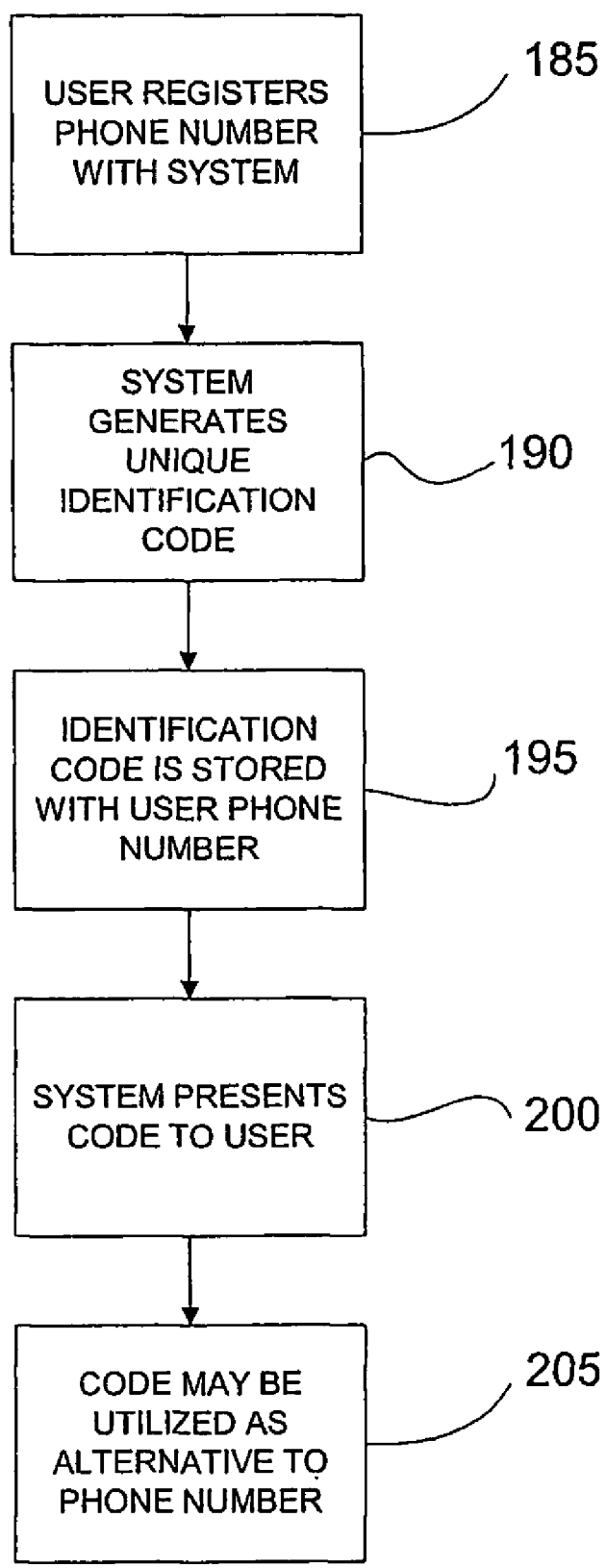
FIG. 8 is a flow chart of the process of an exemplary embodiment of the present invention to create a unique system identification code related to a telephone number which may be used as an alternative method to initiate telephone calls.

FIG. 8 is a flowchart of the process in the exemplary embodiment of the invention to create a unique system identification code related to a telephone number which may be used as an alternative mechanism to initiate telephone calls. The call recipient connects to the application interface of the invention 185 and registers their telephone number as the target for an incoming call. The system generates a unique identification code ("system code") 190 which is associated with the call recipient's telephone number and stored in the system database 195.

The code generated in the exemplary embodiment of the invention is a guaranteed globally unique identifier (GUID) which can only be generated once. The GUID is created using a publicly available algorithm which is not an object of the invention. Other embodiments of the invention could use any of a number of methods to establish a unique system code, including random number generation, selection from a fixed grouping of numeric, alphanumeric, or extended character set codes, or sequential numeric code generation to name a few. Other embodiments could also employ any number of minimum and maximum allowable characters as required for a particular implementation. One example would be to utilize a 10 digit numeric code, similar to a traditional telephone number, which could be used as an alternative method to identify a target call recipient when placing a call utilizing the invention.

In the exemplary embodiment of the invention, this system code is embedded into an Internet URL and presented to the user 200. This embedded URL can be used by callers to initiate a call to the call recipient without revealing the recipient's telephone number 205. Other embodiments of the invention could utilize a variety of methods for collecting the code from a caller in order to connect a call to the call recipient. As an example, an alternate embodiment could prompt a caller to enter the system code from their telephone using the touch tone keypad and then utilize the code to determine the call recipient telephone number and connect the call.

Figure 9:
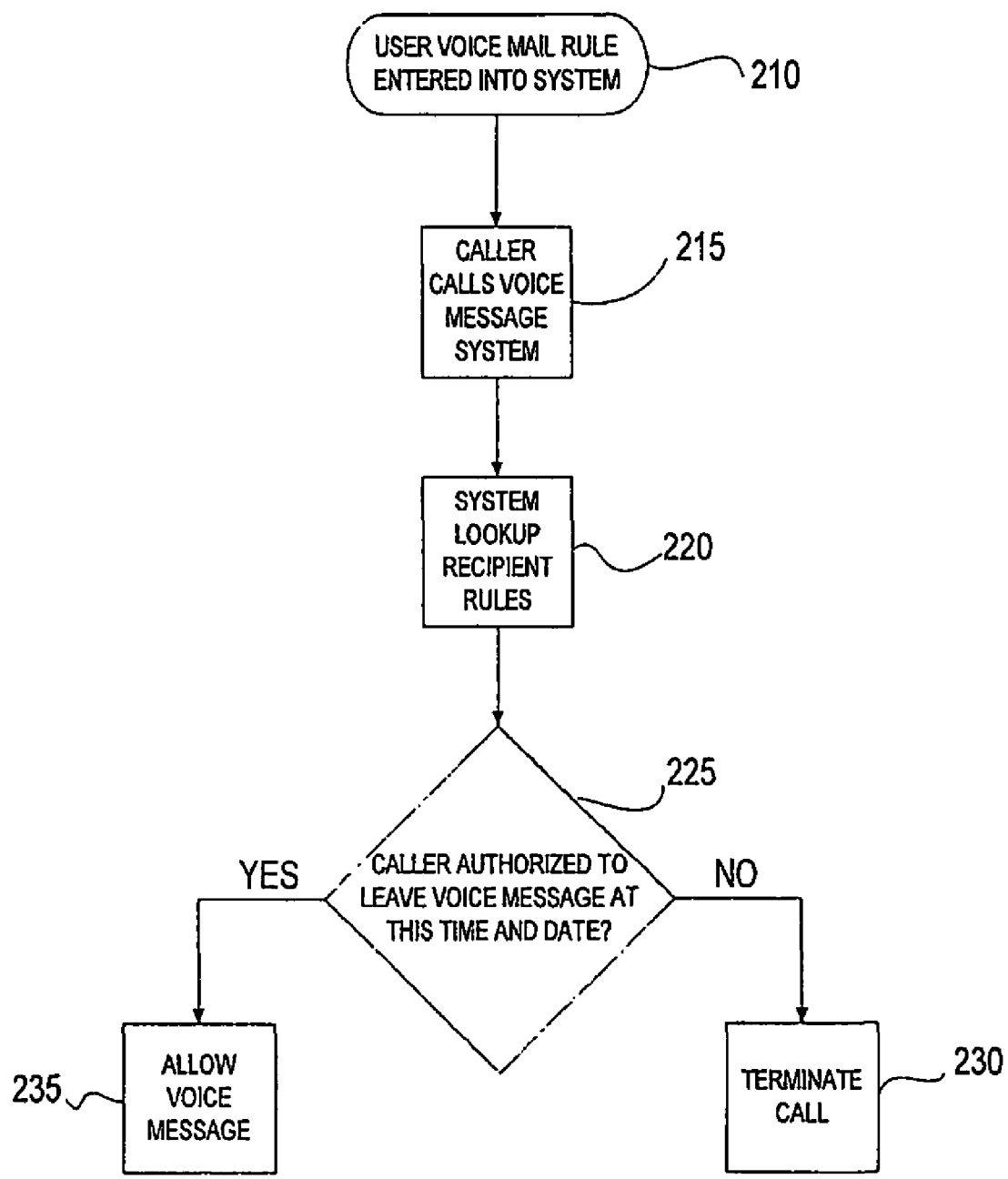
FIG. 9 is a flow chart of the process of an exemplary embodiment of the present invention to manage incoming voice messages such that the message recipient can control if, when, and who may leave voice messages to them.

FIG. 9 is a flowchart of the process in the exemplary embodiment of the invention to manage incoming voice messages to a user such that the voice message recipient can control if they may be messaged, when they are willing to accept voice messages, and who may leave messages for them. The voice message recipient connects to the application interface of the invention 210 and defines one or more rules to be applied as incoming voice messages are processed and to enter the target telephone number and extension or voice mailbox ID for their voice mail system. In the exemplary embodiment the rules are associated with a unique system code related to the rules but other embodiments could implement the rules without such requirement by merely associating the rules with the caller telephone number and recipient's voice mail numbers.

When the caller initiates a call 215, the system of the invention which is integrated with the telephone switching mechanism will lookup the target voice mail recipient rules in the application system database 220. In the exemplary embodiment of the invention, initiating the call is accomplished utilizing an Internet URL from a computer of the traditional type connected to the public Internet. Other embodiments of the invention could initiate the call from a traditional telephone, analog or digital cellular phone, or other voice communication enabled device.

The call recipient rules are compared to the current general rules they have defined for processing incoming voice message calls or specific rules associated to the caller or source phone number of the call. In the exemplary embodiment of the system, a unique system code embedded within an Internet URL is compared to rules associated with that code to determine if the call should be connected. In either the exemplary or alternative embodiments of the system, the voice message recipient's rules are evaluated to determine if the caller is authorized to connect with the call recipient's voice mail system at the current date and time 225. If the rules allow the call to be connected, the system will connect the call to the recipient's voice message system 235 utilizing its connection to a telephone switching infrastructure. If the rules dictate that a call is not authorized to be connected, then the call is rejected 230. In the exemplary embodiment of the invention, this rejection is represented to the caller in the form of a message displayed on their web browser screen. Other embodiments of the invention may utilize other methods to notify the caller of the rejection, or may not notify the user and rather just not connect the call.

Figure 10:
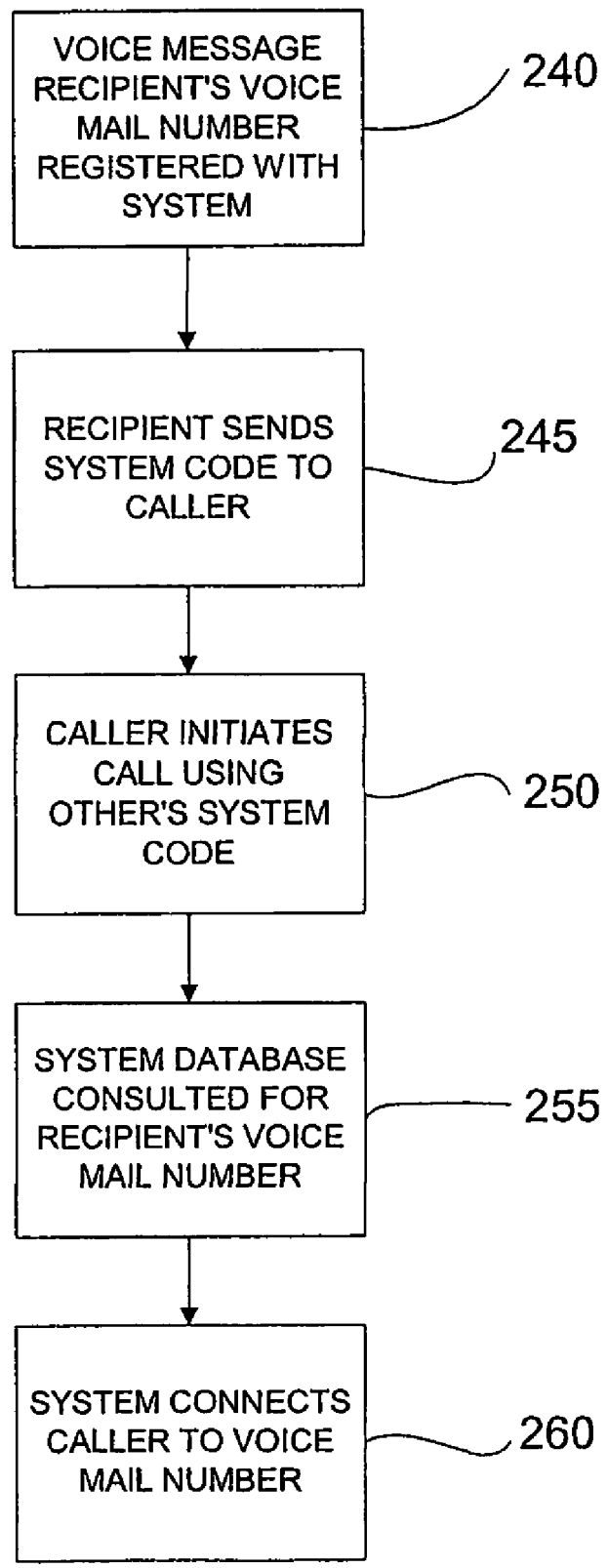
FIG. 10 is a flow chart of the process of an exemplary embodiment of the present invention to connect a party to another's voice messaging service without revealing the voice messaging system telephone number and optionally mailbox number to the calling party.

FIG. 10 is a flowchart of the process in the exemplary embodiment of the invention to connect a caller to a voice message recipient's voice message system while keeping the message recipient's voice message system phone numbers and extension or voice mailbox ID concealed. In order to provide a concealed voice message system phone number capability to the message recipient, the recipient's voice message telephone number and extension or voice mailbox ID must be registered within the application of the invention computer 240.

Upon registering with the application system in the exemplary embodiment, at least one of the users must register as a member of the system by filling out a sign up form designating a choice of the monthly service offering and providing a payment method of credit card or online check. Upon registration, one or both users, depending on their choices to become a member, is able to distribute one or more unique system codes 245. In the exemplary embodiment, the system codes are generated and embedded into an Internet URL which can be used to initiate a voice message call.

http://jules.dafoink.com/talkRules/callLink.asp?trID=5631EDC86148489C9BFA904CAD80D4AA Each code is a unique identifier generated by a publicly know algorithm referred to as GUID or globally unique identifier, which is not an object of the invention, that cannot be generated again. In the example above, the code is the string of alphanumeric characters appearing after the "=" in the URL. In other embodiments of the invention, the code could be utilized without the URL, or other forms of a unique identifier could be used as an alternative. For example, a 10 digit numeric string similar to a traditional telephone number could be assigned to a user and this system code could be used as the identifier which references the user's actual voice message system telephone number and call management rules associated with it.

In the exemplary embodiment, callers may distribute their system code embedded URLs in a variety of ways, which are standard communication methods including but not limited to: email, voice, written, chat, instant messaging, and public or private web sites.

Regardless of the method used to distribute the URL, in the exemplary embodiment a potential caller must obtain the URL with embedded system code in order to initiate a voice message call. The caller initiates the voice message telephone call 250 by clicking on the URL in an enabled application or by pasting or typing the URL string into their web browser address box. The URL engages the application system logic of the invention to verify the structure and contents of the URL and to search the application database for the telephone number of the recipient voice mail system associated with the system code 255. It should be noted that the caller's telephone number must also be registered with the application system in order to connect a the voice message call in the exemplary embodiment. The application system obtains this information from the caller prior to connecting the call.

In alternative embodiments, the caller would not need to specifically register their phone number if the embodiment simply connected the call through to the voice message system from the caller's telephone. System code processing and call initiation could also be handled in a variety of ways. For example, the caller could call a fixed telephone number for a service provider, and then be prompted to enter the call recipient's system code upon which the system would connect the call to the recipient's voice mail system.

Continuing with FIG. 10, the invention uses the telephone numbers for the caller and voice message recipient's voicemail system stored in its database to connect the calling party to the receiving voice message system 260. The connection is accomplished by integrating the invention with a telephone switching device or switching device API. In utilizing the system code method, the voice message recipient is not required to reveal their voice message system telephone number to the calling party.

Figure 11:
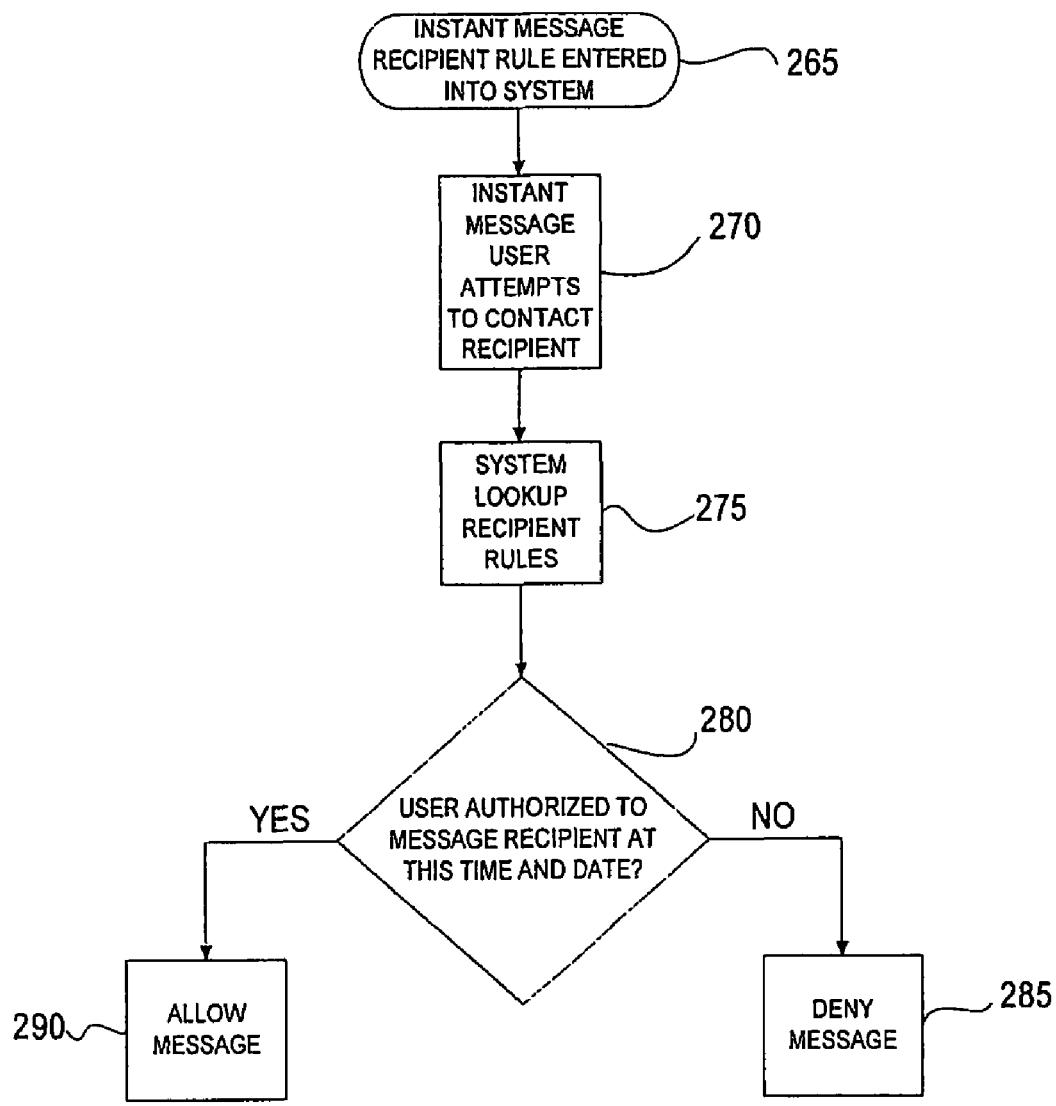
FIG. 11 is a flow chart of the process of an exemplary embodiment of the present invention to manage incoming instant messages such that the message recipient can control if, when, and who may send instant messages to them.

FIG. 11 is a flowchart of the process in an embodiment of the invention to manage incoming instant messages to a user such that the message recipient can control if they may be messaged, when they are willing to accept messages, and who may leave messages for them.

In the exemplary embodiment of the invention, integration with an existing instant messaging system would be required.

Examples of such systems include: AOL's Instant Messenger (AIM), Microsoft's MSN Messenger, and ICQ. The invention is designed to augment these types of existing applications' features with its communication management capabilities. API integration or direct code integration between the invention and these messaging systems would be required or a new instant message system could be created utilizing the invention as an embedded component.

As depicted in FIG. 11, the voice message recipient connects to the application interface of the invention 265 and define one or more rules to be applied as incoming instant messages are processed and to enter the target instant message system ID for their account on the instant message system. When the message sender initiates an instant message from their instant messaging software client 270, the system of the invention which is integrated with the instant messaging application will lookup the recipient rules in the application system database 275.

Continuing with FIG. 11, the message recipient rules are compared to the current general rules they have defined for processing incoming instant messages or specific rules associated to the sender. The message recipient's rules are evaluated to determine if the sender is authorized to send a message to the message recipient's instant messaging client at the current date and time 280. If the rules allow the message to be sent, the system will permit the message to be forwarded to the recipient's instant message client 290 utilizing its integration with an instant message application. If the rules dictate that a message is not authorized to be sent, then the message is rejected 285. The embodiment of the invention may utilize any method to notify the sender of the rejection, or may not notify the user and rather just not send the message.

Figure 12:
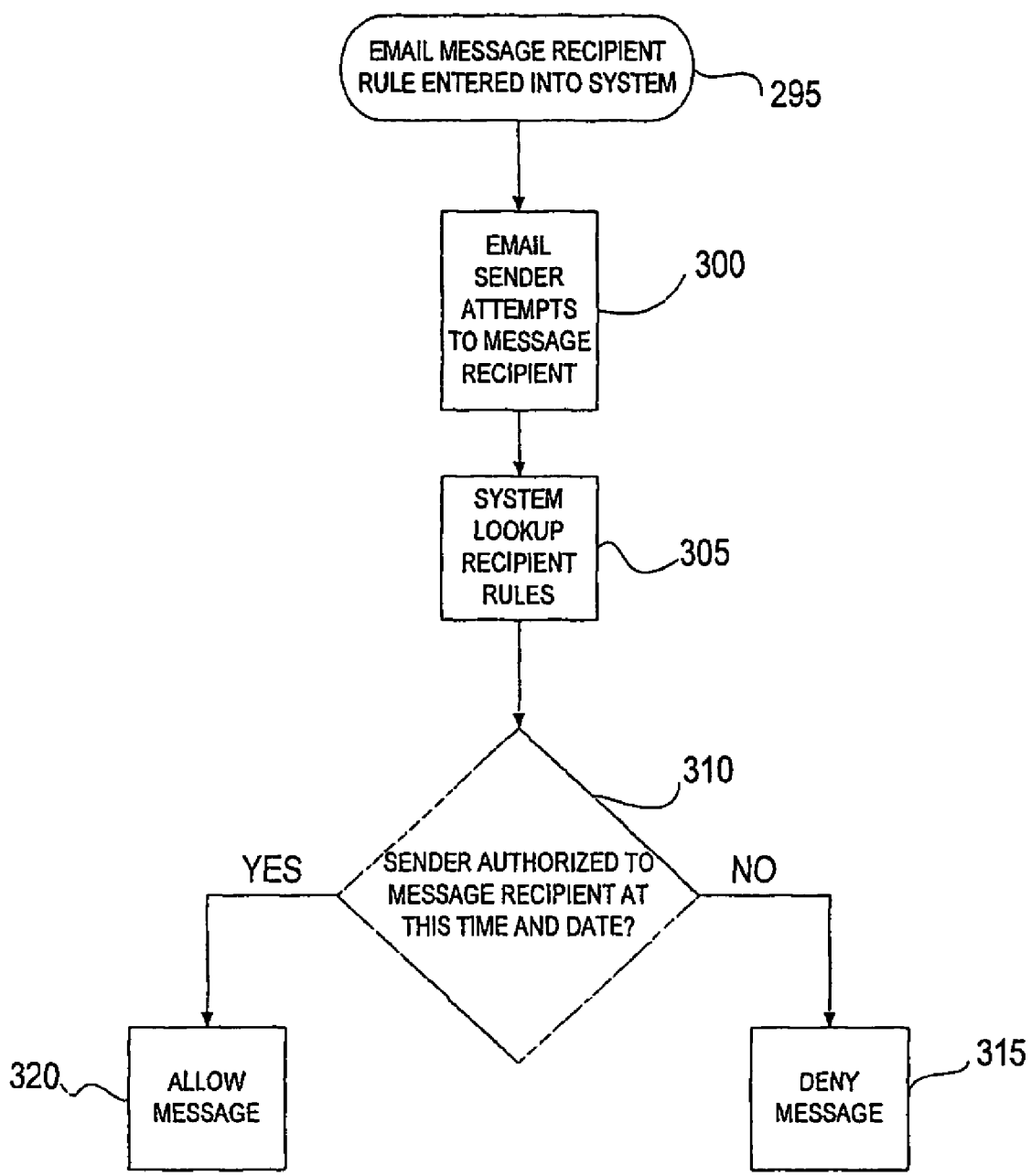
FIG. 12 is a flow chart of the process of an exemplary embodiment of the present invention to manage incoming email messages such that the message recipient can control if when, and who may send email messages to them.

FIG. 12 is a flowchart of the process in an embodiment of the invention to manage incoming electronic ("email") messages to a user such that the message recipient can control if they may be messaged, when they are willing to accept messages, and who may leave messages for them.

In the exemplary embodiment of the invention, integration with an existing email messaging system would be required. This integration could consist of an embedding of the invention into the email application client or server application, integration via API with the client or server application, or configuring the invention as a mail forwarding server for processing messages prior to their delivery to the recipient's email server.

Continuing with FIG. 12, the email message recipient is required to connect to the application interface of the invention 295 and define one or more rules to be applied as incoming email messages are processed and to enter the target email address for their email system account. When the message sender initiates an email message from their email messaging software client 300 either 1) the recipient's email client software which is integrated with the invention or 2) the recipient's email server application with is integrated with the invention or 3) the invention configured as a forwarding server between the recipient's email server and the public Internet or private network will lookup the recipient rules in the invention's application system database 305.

Continuing with FIG. 12, the message recipient rules are compared to the current general rules they have defined for processing incoming email messages or specific rules associated to the sender. The message recipient's rules are evaluated to determine if the sender is authorized to send a message to the message recipient's email system at the current date and time 310. If the rules allow the message to be sent, the system will permit the message to be forwarded to the recipient's email software 320 utilizing its integration or forwarding configuration with the email server application. If the rules dictate that a message is not authorized to be sent, then the message is rejected 315. The embodiment of the invention may utilize any method to notify the sender of the rejection, including returning a delivery failure notice, or may not notify the user and rather just not send the message.

Figure 13:
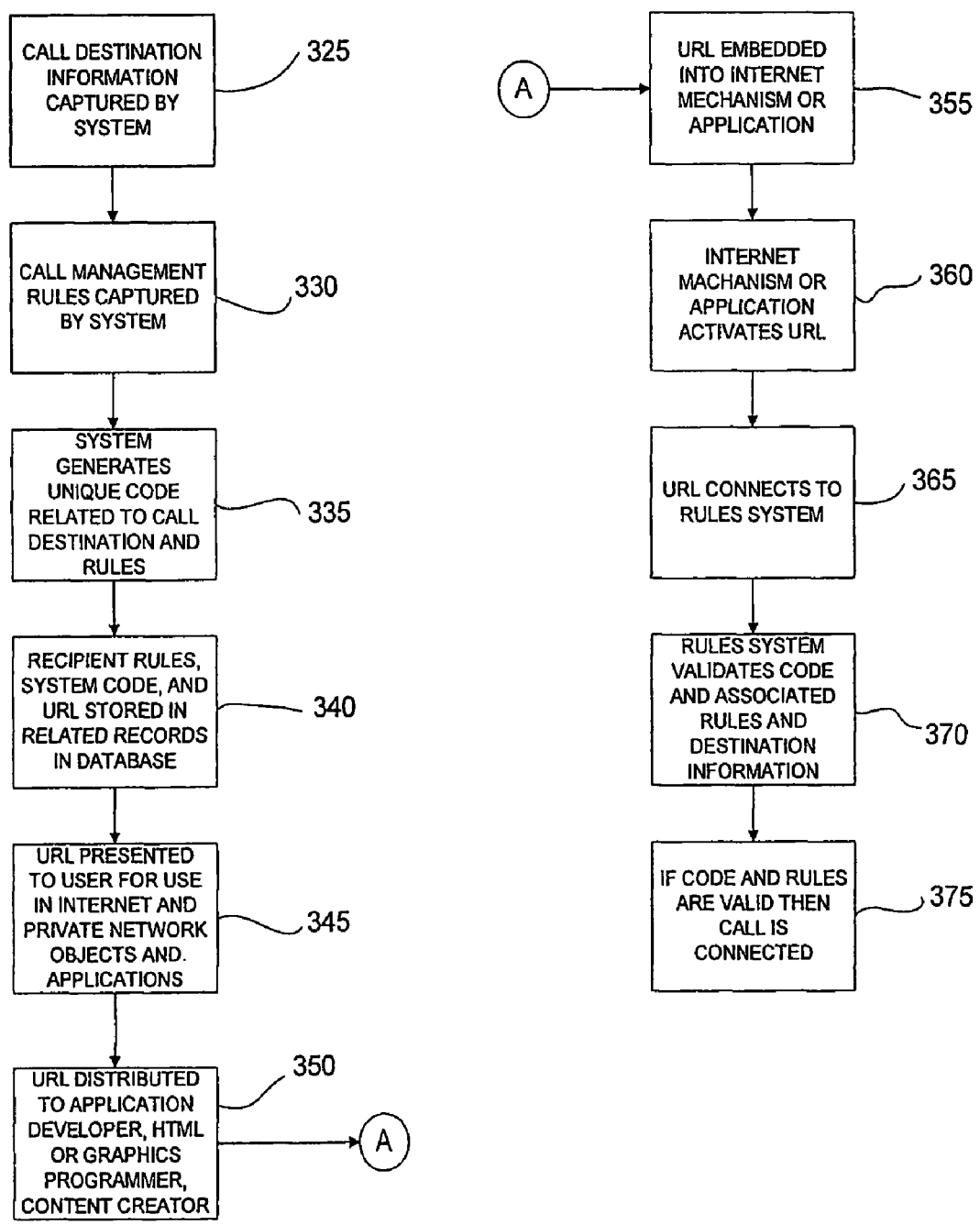
FIG. 13 is a flow chart of the process of an exemplary embodiment of the present invention to create and utilize unique Internet URLs which can be used to initiate rules-managed telephone calls when embedded into Internet objects and applications.

FIG. 13 is a flowchart of the process in the exemplary embodiment of the invention to create and utilize unique Internet URLs which can be used to initiate rules-managed telephone calls when embedded into Internet objects and applications. The call recipient information including target phone number is required to be entered into the application interface of the invention or otherwise loaded into the application via file or data transfer 325 where it is validated and stored in the application database 330. The system generates a unique identification code ("system code") 335 which is associated with the call recipient's telephone number and stored in the system database 340.

The code generated in the exemplary embodiment of the invention is a guaranteed globally unique identifier (GUID) which can only be generated once. The GUID is created using a publicly available algorithm which is not an object of the invention. Other embodiments of the invention could use any of a number of methods to establish a unique system code, including random number generation, selection from a fixed grouping of numeric, alphanumeric, or extended character set codes, or sequential numeric code generation to name a few. Other embodiments could also employ any number of minimum and maximum allowable characters as required for a particular implementation.

In the exemplary embodiment of the invention, this system code is embedded into an Internet URL and presented to the user 345 where it may be utilized in a wide variety of Internet or private network objects or applications. The URL is then distributed as necessary 350 to appropriate software developers, HTML or graphics developers, or other content creators and managers responsible for the creation, modification, and management of Internet objects, and software applications.

Objects and applications include graphics with embedded links, client and server side programs and scripts, HTML links, user interface elements which allow for embedding of a URL, COM or CORBA distributed application objects, or stand alone compiled programs. The appropriate content or application creator or manager must embed the URL 355 into the target object or application and in certain cases create logic appropriate to the use to support the URL's activation.

The object or application activates the URL 360 by doing an HTTP call to the URL address, which connects to the computer of the invention 365. The ability to utilize an HTTP request to a URL and interpret return results is available on all of the common computer hardware and software platforms and Internet applications either as a native capability or as an add-on component or readily creatable by a programmer using simple network input and output routines built into application development tools.

Upon activation of the URL, the computer of the invention evaluates the URL 370 for validity of syntax and structure, and if valid retrieves rules in the database which are related to the system code embedded into the URL. If the call management rules related to the URL are valid for the current date and time, the call is connected 375 by the invention utilizing its integration with a telephone switching application or device. If the rules for the URL are not valid for the current date and time, the call is not connected and a message is returned to either the end user or the calling object or application via HTTP response formatted with HTML.

Figure 14:
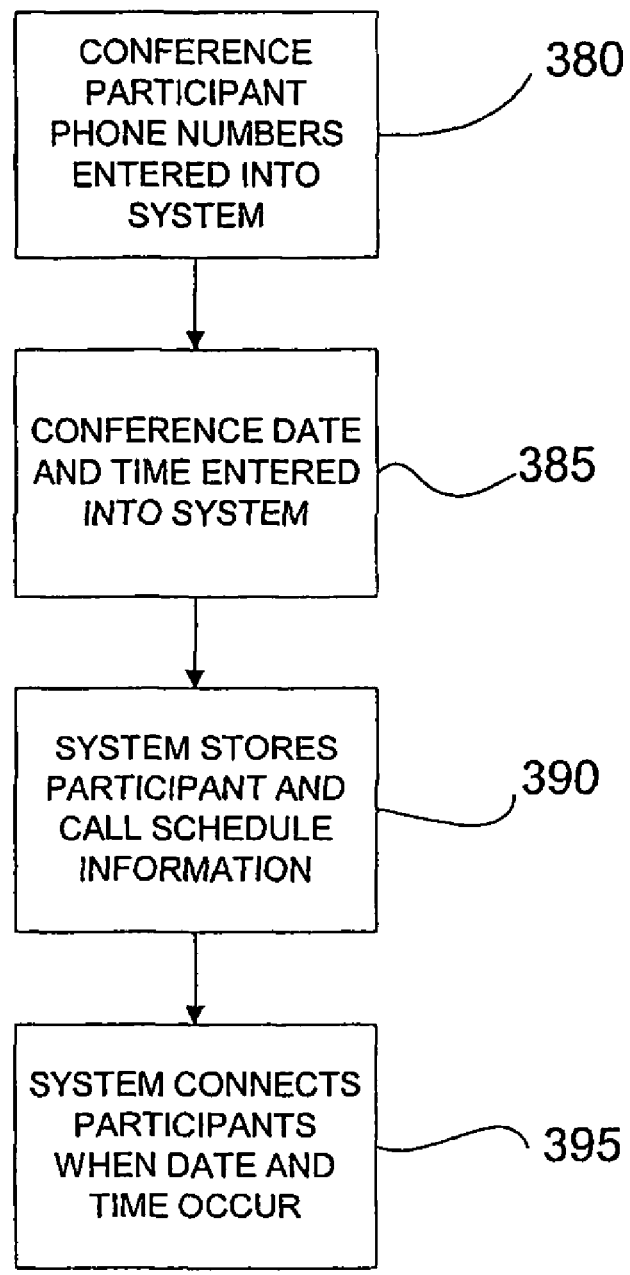
FIG. 14 is a flow chart of the process of an exemplary embodiment of the present invention to establish conference calls via an automated, scheduled connection mechanism.

FIG. 14 is a flowchart of the process in an embodiment of the invention to connect two or more parties to a telephone conference call at a specific date and time. As depicted in FIG. 14, a call administrator connects to the application interface of the invention 380 and provides the target conference service telephone number and conference extension if required and conference participant telephone numbers, or other connection code as described elsewhere related to the invention, along with the required date and time in hours and minutes 385. The invention could also accommodate time in more precise terms such as seconds or fractions of a second. The application logic validates the user input and stores the connection information in the application database 390 and creates an event trigger which will occur upon reaching the date and time specified. When the date and time has been reached the system will connect the conference participants to the conference service telephone number 395. This capability of the invention can be used to quickly schedule conference phone calls in the future based on a fixed date and time. It may also be similarly to schedule conference calls on a recurring schedule.

Figure 15:
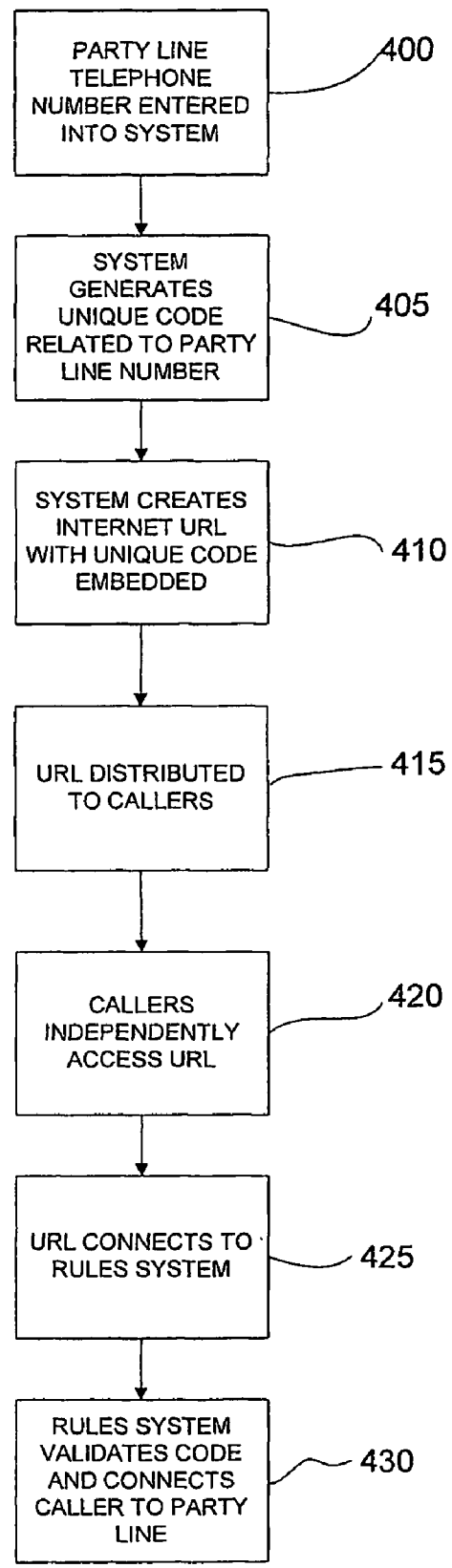
FIG. 15 is a flow chart of the process of an exemplary embodiment of the present invention to connect party line callers utilizing an Internet URL, web form, or other Internet input method.

FIG. 15 is a flowchart of the process in the exemplary embodiment of the invention to connect parties to a telephone party line call utilizing rules to control party line access and keeping the party line phone number concealed. In the exemplary embodiment, in order to provide the party line with rules-based access control and conceal the party line phone number, the party line telephone number must be registered 400 within the application of the invention computer. A party line administrator has the option to create a rule set and a single Internet URL for distribution to callers or to create multiple rule sets and associated URLs for distribution to individual callers or groups of callers. In either case the system generates one or more unique system codes 405 related to the party line phone number and rule set, and creates one or more URLs 410 with the embedded system code.

The party line administrator is able to distribute one or more of the URLs 415 using any appropriate method. In the exemplary embodiment, callers may distribute their system code embedded URLs in a variety of ways, which are standard communication methods including but not limited to: email, voice, written, chat, instant messaging, and public or private web sites. An example of a URL generated by the exemplary invention is below.

http://jules.dafoink.com/talkRules/callLink.asp?trID=5631EDC86148489C9BFA904CAD80D4AA Each code is a unique identifier generated by a publicly know algorithm referred to as GUID or globally unique identifier, which is not an object of the invention, that cannot be generated again. In the example above, the code is the string of alphanumeric characters appearing after the "=" in the URL. In other embodiments of the invention, the code could be utilized without the URL, or other forms of a unique identifier could be used as an alternative. For example, a 10 digit numeric string similar to a traditional telephone number could be assigned to a user and this system code could be used as the identifier which references the user's actual telephone number and call management rules associated with it.

Regardless of the method used to distribute the URL, in the exemplary embodiment a potential caller must obtain the URL with embedded system code in order to initiate a party line telephone call. The caller initiates the telephone call 420 by clicking on the URL in an enabled application or by pasting or typing the URL string into their web browser address box. The URL engages the application system logic 425 of the invention to verify the structure and contents of the URL and to search the application database for the telephone number of the party line and associated rules sets which related to the system code in the URL. It should be noted that in the exemplary embodiment of the invention, the caller's phone number must also be registered with the application system in order to connect a call. The application system obtains this information from the caller 420 prior to connecting the call.

In alternative embodiments of the invention, the system code processing and call initiation could be handled in a variety of ways. For example, the caller could call a fixed telephone number for a service provider, and then be prompted to enter the party line's system code upon which the system would connect the call.

The invention uses the telephone numbers for the caller and party line stored in its database to connect both parties to a telephone call 430 if the rules associated with the system code allow for the connection. The connection is accomplished by the invention's integration with a telephone switching device API.

Figure 16:
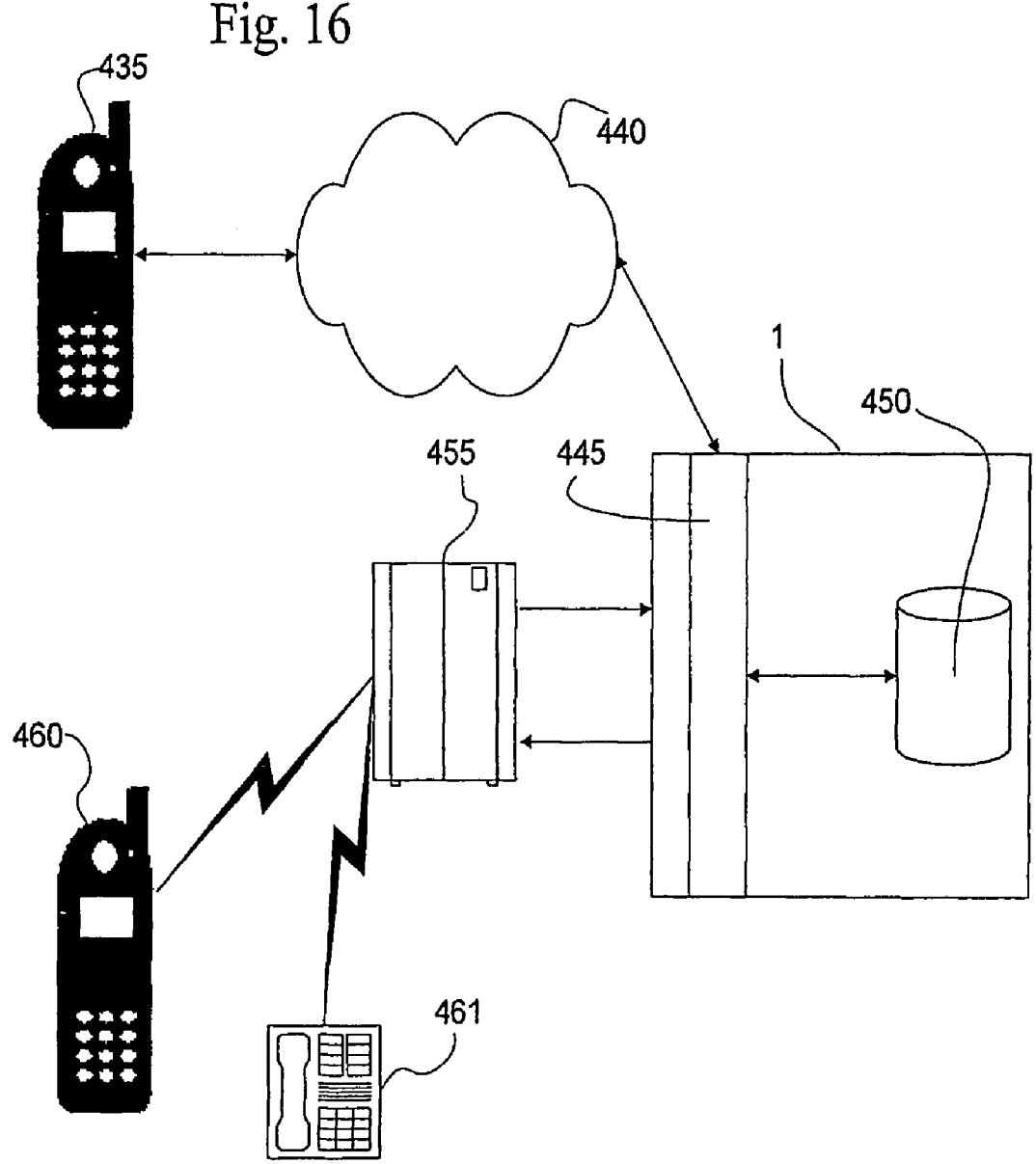
FIG. 16 is a graphic representation depicting cellular phones use WAP or cellular web browsers to initiate calls using a computer for managing communications that is connected to a traditional telephone network in an exemplary embodiment of the present invention.

FIG. 16 represents an exemplary embodiment of the invention in which cellular telephones use wireless application protocol (WAP) or cellular web browsers to initiate rules-managed and/or concealed recipient phone number calls using a computer for managing communications that is connected to a traditional telephone network and to the public Internet.

A cellular telephone system user who is initiating a call, or the "caller", has a cellular service which supports connecting to Internet based web sites and applications via WAP or an web browser implemented into the cell phone 435.

The cellular network is integrated with the public Internet 440 via any functional arrangement such that any standard WAP or Internet web application can be accessed by the cellular user via their compatible cell phone 435.

Another telephone system user who will receive the call, or the "call recipient", has a telephone connected to the public telephone network 461 or is using an analog or digital cellular phone 460.

The caller initiates the phone call using their cellular phone 435, accessing either a WAP or appropriately formatted web application presented over the public Internet, such application hosted by the invention computer 1. The application presents the caller the ability to select from an existing contact listing to initiate a call, to input a system code or URL for a recipient's rules based call management, or to input a telephone number for the recipient.

Upon initiating a phone call, the caller's connection request is validated by the application logic 445. The logic evaluates the call request for validity of syntax and structure, then searches the rules database 450 for records associated with the call recipient's call management settings if any exist. Note that the call recipient need not be a user of or know to the system unless a system code of the invention is the method used to connect with the recipient.

If there are no user or system rules preventing the connection, the application logic 445 will connect the call utilizing the public telephone switch 455. The computer 1 passes the caller and call recipient phone numbers as stored in the database 450 to the telephone switch 455 using an application programming interface ("API") appropriate to the service provider or telephone switch manufacturer. The telephone switch then connects both parties' telephones 435, 460 or 461 to a phone call by dialing both numbers and connecting the call upon the parties' answer.

Figure 17:
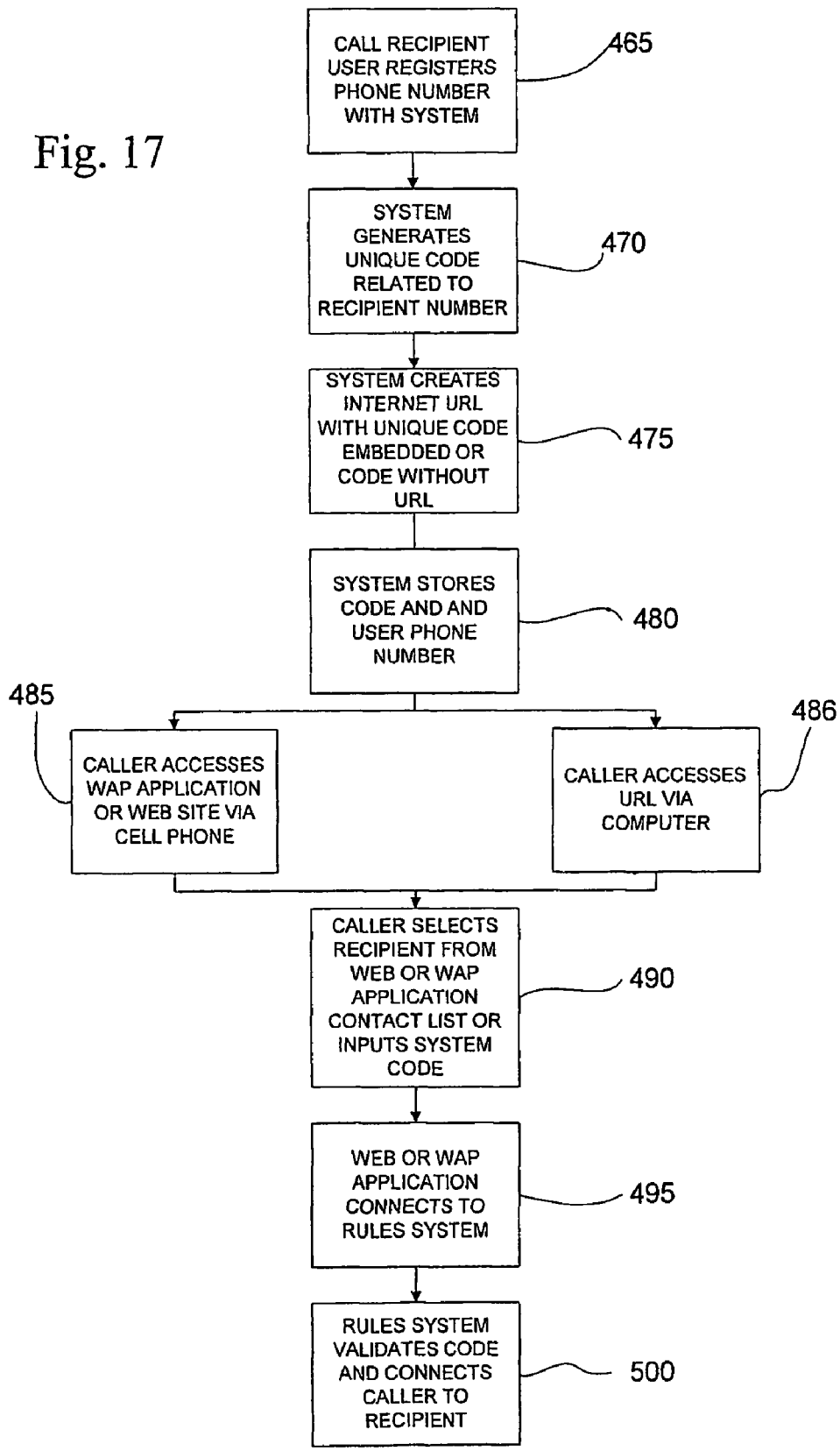
FIG. 17 is a flow chart of the process of an exemplary embodiment of the present invention to connect cellular users to other parties phone numbers without the call recipient revealing their phone number.

FIG. 17 is a flowchart of the process in an embodiment of the invention to connect a cellular phone caller to a call recipient's telephone while keeping the call recipient's phone number concealed. In the exemplary embodiment of the invention depicted in FIG. 17, in order to provide a concealed phone number capability to the call recipient, the telephone number must be registered within the application of the invention computer 465. Upon registration, the system generates 470 and stores one or more unique system codes associated with the call recipient's telephone number. The system presents one or more unique system codes in either a URL form (example below) or as a code to be used in other user interface methods with the invention 475. The system code and/or URL is stored 480 in the database along with the associated call recipient telephone number.

http://jules.dafoink.com/talkRules/callLink.asp?trID=5631EDC86148489C9BFA904CAD80D4AA Each code is a unique identifier generated by a publicly know algorithm referred to as GUID or globally unique identifier, which is not an object of the invention, that cannot be generated again. In the example above, the code is the string of alphanumeric characters appearing after the "=" in the URL. In other embodiments of the invention, the code could be utilized without the URL, or other forms of a unique identifier could be used as an alternative. For example, a 10 digit numeric string similar to a traditional telephone number could be assigned to a user and this system code could be used as the identifier which references the user's actual voice message system telephone number and call management rules associated with it.

Call recipients may distribute their system code in a variety of ways, which are standard communication methods including but not limited to: email, voice, written, chat, instant messaging, and public or private web sites.

Continuing with FIG. 17, the caller initiates the telephone call 490 by: 1) selecting a contact name using their WAP or web browsing enabled cell phone; 2) entering the system code of the call recipient using their WAP or web browsing enabled cell phone; 3) clicking on the URL in an enabled application or by pasting or typing the URL string into their cell phone web browser address box; 4) clicking on the URL in an enabled application or by pasting or typing the URL string into their cell phone web browser address box; or 5) entering the system code of the call recipient using computer web browser while accessing the application of the invention computer.

Either method of initiation engages the application system logic 495 of the invention to verify the structure and contents of the URL and to search the application database for the telephone number of the recipient associated with the system code 500.

The embodiment could be implemented such that the call could be processed and connected immediately upon initiation of the system logic 495. Otherwise the caller would be required to specifically register their phone number with the application and a call connection process would connect both the caller and call recipient. System code processing and call initiation could also be handled in a variety of ways. For example, the caller could call a fixed telephone number for a service provider, and then be prompted to enter the call recipient's system code upon which the system would connect the call to the recipient's voice mail system.

The invention uses the telephone numbers for the caller and call recipient stored in its database to connect the call 500. The connection is accomplished by integrating the invention with a telephone switching device or switching device API. In utilizing the system code method, the call recipient is not required to reveal their telephone number to the calling party cell phone user.

Figure 18:
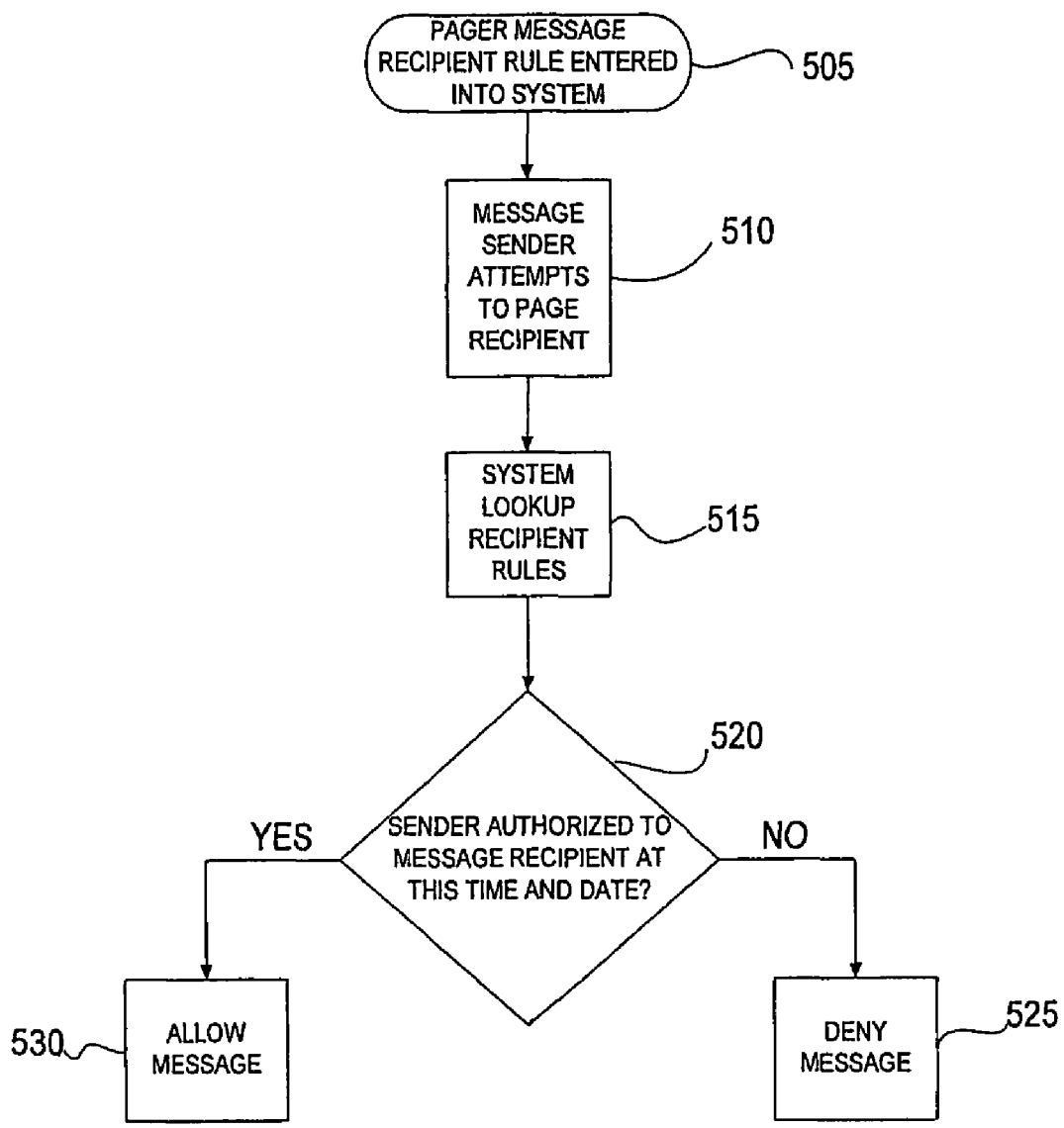
FIG. 18 is a flow chart of the process of an exemplary embodiment of the present invention to manage incoming pager messages such that the message recipient can control if, when, and who may send pager messages to them.

FIG. 18 is a flowchart of the process in an exemplary embodiment of the invention to manage incoming pager messages to a user such that the message recipient can control if they may be messaged, when they are willing to accept messages, and who may leave messages for them.

In the exemplary embodiment of the invention depicted in FIG. 18, integration with existing paging services is required. Several alternatives exist for such integration, the selection of which will depend on technical and functionality considerations, the most important being the desired input methods for pages being sent to recipients. Many paging systems allow page messages to originate: from an automated or operator assisted call center, from an email message, from a web page on the public Internet, from a paging application utilizing an Internet connection or modem to connect to the paging service, from another paging device equipped with two-way paging capability, or from an API allowing any variety of independent software applications to send a pager message. Either input method would require the invention to be integrated with or embedded into the application or device originating the message.

Continuing with FIG. 18, the voice message recipient is required to connect to the application interface of the invention 505 and define one or more rules to be applied as incoming instant messages are processed and to enter the target instant message system ID for their account on the instant message system. When the message sender initiates a pager message utilizing any of the methods above or others not noted 510, the system of the invention which is integrated with the paging system application will lookup the recipient rules in the application system database 515.

The message recipient rules are compared to the current general rules they have defined for processing incoming paging messages or specific rules associated to the sender. The message recipient's rules are evaluated to determine if the sender is authorized to send a message to the message recipient's pager at the current date and time 520. If the rules allow the message to be sent, the system will permit the message to be forwarded to the recipient's pager 530 utilizing its integration with a pager system application. If the rules dictate that a message is not authorized to be sent, then the message is rejected 525. The embodiment of the invention may utilize any method to notify the sender of the rejection, or may not notify the user and rather just not send the message.

Figure 19:
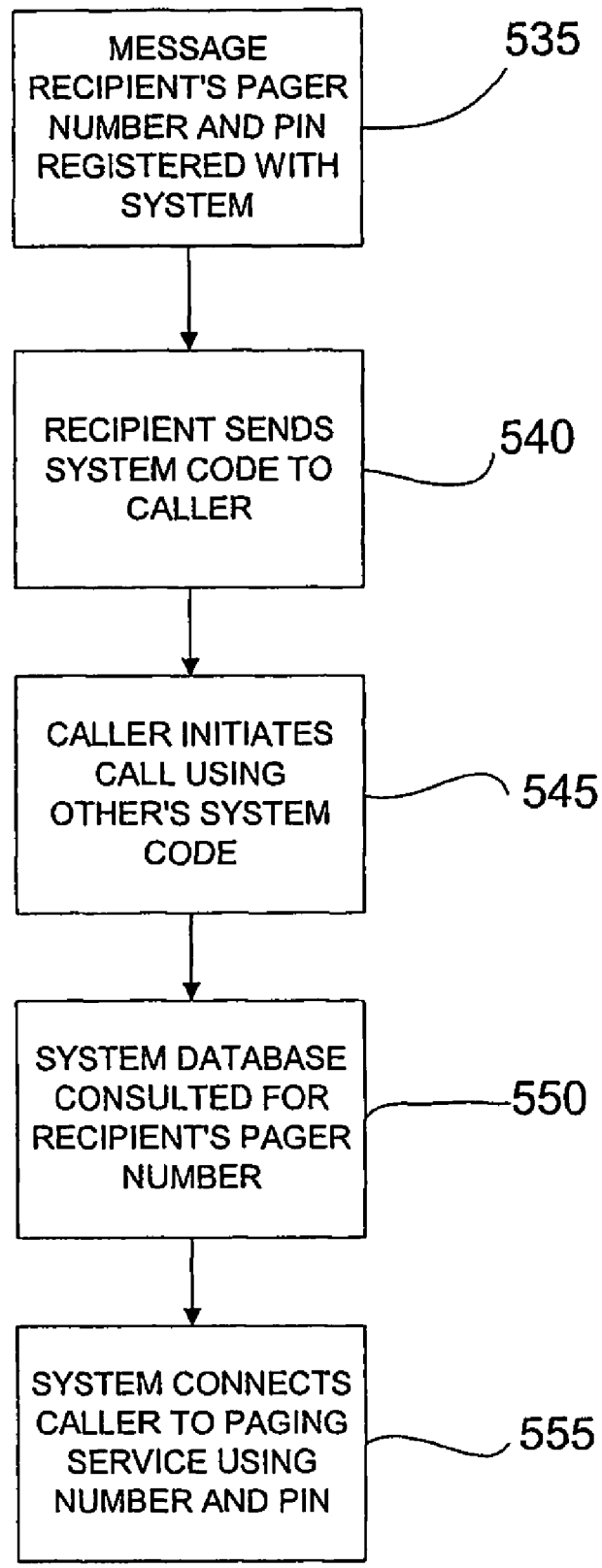
FIG. 19 is a flow chart of the process of an exemplary embodiment of the present invention for a party to send a message to a recipient's pager without revealing the paging system telephone number or paging recipient's PIN number to the calling party.

FIG. 19 is a flowchart of the process in the exemplary embodiment of the invention to connect a caller to a pager message recipient's telephone message system while keeping the message recipient's paging service message system phone number and extension or PIN concealed. In the exemplary embodiment of the invention, in order to provide a concealed paging message system phone number capability to the message recipient, the recipient's paging system telephone number and extension or PIN must be registered within the application of the invention computer 535.

Upon registering with the application system in the exemplary embodiment, at least the pager recipient must register as a member of the system by filling out a sign up form designating a choice of the monthly service offering and providing a payment method of credit card or online check. Upon registration, one or both users, depending on their choices to become a member, is able to distribute one or more unique system codes 540. In the exemplary embodiment, the system codes are generated and embedded into an Internet URL which can be used to initiate a paging system call.

http://jules.dafoink.com/talkRules/
callLink.asp?trID=5631EDC86148489C9BFA904CA
D80D4AA Each code is a unique identifier generated by a publicly know algorithm referred to as GUID or globally unique identifier, which is not an object of the invention, that cannot be generated again. In the example above, the code is the string of alphanumeric characters appearing after the "=" in the URL. In other embodiments of the invention, the code could be utilized without the URL, or other forms of a unique identifier could be used as an alternative. For example, a 10 digit numeric string similar to a traditional telephone number could be assigned to a user and this system code could be used as the identifier which references the user's actual paging system telephone number and call management rules associated with it.

In the exemplary embodiment, callers may distribute their system code embedded URLs in a variety of ways, which are standard communication methods including but not limited to: email, voice, written, chat, instant messaging, and public or private web sites.

Regardless of the method used to distribute the URL, in the exemplary embodiment a potential caller must obtain the URL with embedded system code in order to initiate a voice message call. The caller initiates the voice message telephone call 545 by clicking on the URL in an enabled application or by pasting or typing the URL string into their web browser address box. The URL engages the application system logic of the invention to verify the structure and contents of the URL and to search the application database for the telephone number of the recipient paging system associated with the system code 550. It should be noted that the caller's telephone number must also be registered with the application system in order to connect the paging system call in the exemplary embodiment. The application system obtains this information from the caller prior to connecting the call 545.

Alternative embodiments would not require the caller to specifically register their phone number if the embodiment connects the call through to the voice message system from the caller's telephone. System code processing and call initiation could also be handled in a variety of ways. For example, the caller could call a fixed telephone number for a service provider, and then be prompted to enter the call recipient's system code upon which the system would connect the call to the recipient's paging system.

The invention uses the telephone numbers for the caller and pager message recipient's paging system stored in its database to connect the calling party to the receiving paging message system 555. The connection is accomplished by integrating the invention with a telephone switching device or switching device API. In utilizing the system code method, the pager message recipient is not required to reveal their paging system message system telephone number or PIN to the calling party.

Figure 20:
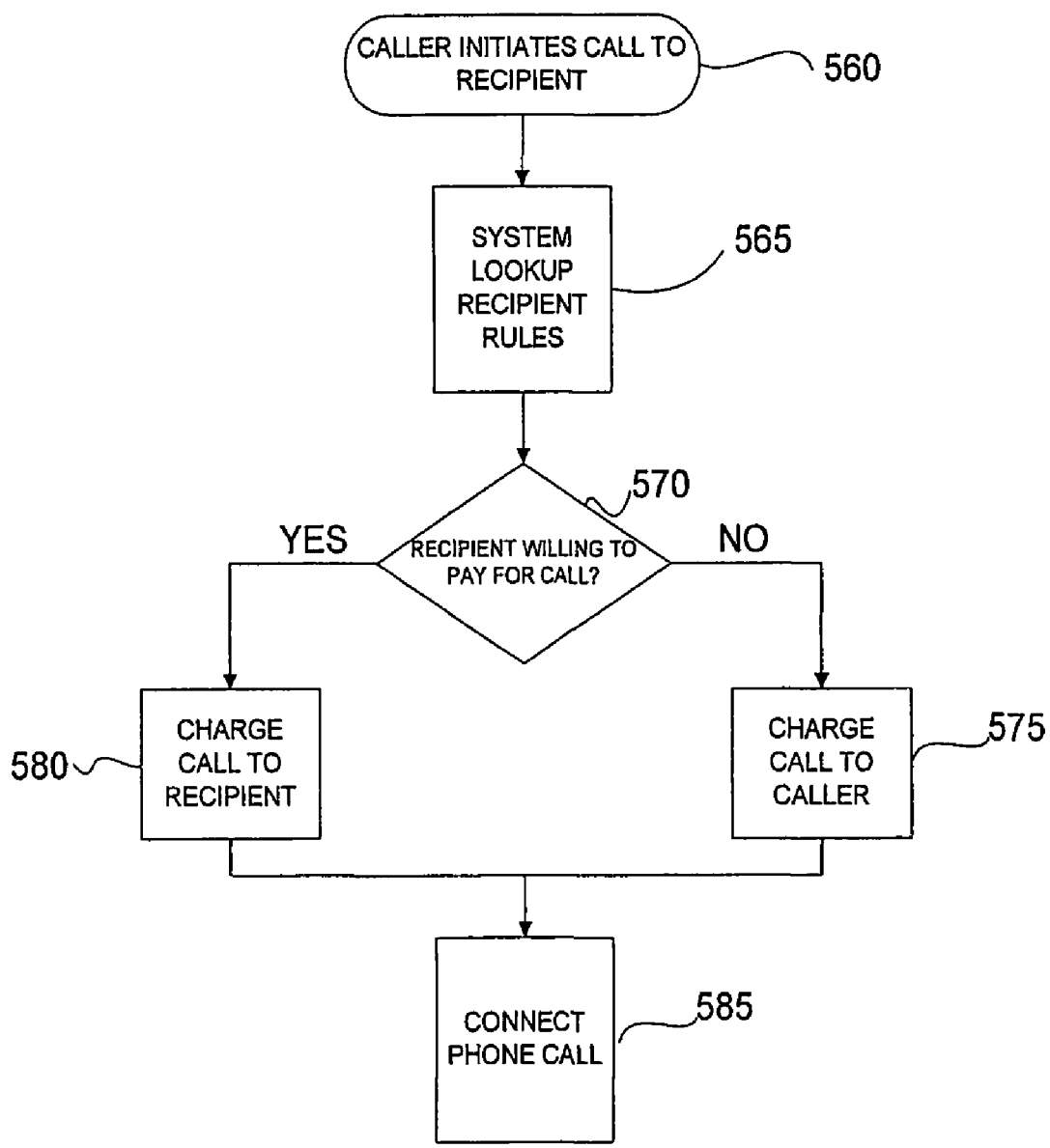
FIG. 20 is a flow chart of the process of an exemplary embodiment of the present invention to provide callers and call recipients the choice of who will pay connection charges for a telephone call.

FIG. 20 is a flowchart of the process in the exemplary embodiment of the invention to provide telephone callers and call recipients the ability to make choices as to who will pay for a metered telephone call. Other embodiments of the invention could provide the same choices for fixed rate telephone calls. In the exemplary embodiment, in order to utilize the call payment options, at least the call recipient must be registered with the application system of the invention. The call recipient is given a choice upon defining call management rules as to whether they are willing to pay for incoming calls related to a rule set and system code. In the exemplary embodiment, if the caller is also registered with the application system, no further options are offered to either caller but other embodiments of the invention could offer other variations and priorities for payments if the payment preferences for both users are entered into the system. For example, another embodiment could allow for more varied call payment preferences such as: user A would prefer not to pay for calls from user B but will do so if user B opts not to pay for a call.

In the exemplary embodiment of the invention, the payment option that is related to a rule set is activated upon the caller utilizing a system code embedded URL to initiate a call 560. The URL engages the application system logic of the invention to verify the structure and contents of the URL and to search the application database for the telephone number of the recipient associated with the system code along with the payment setting for the rule associated with the system code embedded in the link 565.

The system logic determines if the call recipient is willing to pay for the call 570. If the recipient is willing to pay 580, the call is immediately connected 585 and the recipient's account is charged for the metered call usage. If the recipient is unwilling to pay for the call according to the payment options defined with the rule set for the system code, the caller is presented with a message indicating the requirement to pay and a billing option payment screen to enter billing information. If the caller enters valid billing information 575, the call is initiated 585 and the caller's billing method is utilized for payment. If the caller chooses not to enter valid payment information and initiate the call, no call is connected and no billing transaction takes place.

The recipient may be billed electronically by credit card, online check, or have a terms-based monthly billing cycle. Other embodiments could use alternate payment methods such as, but not limited to: user's telephone service bill, ACH transactions, wire transfers, or Internet payment options such as PayPal or Billpoint.

Figure 21:
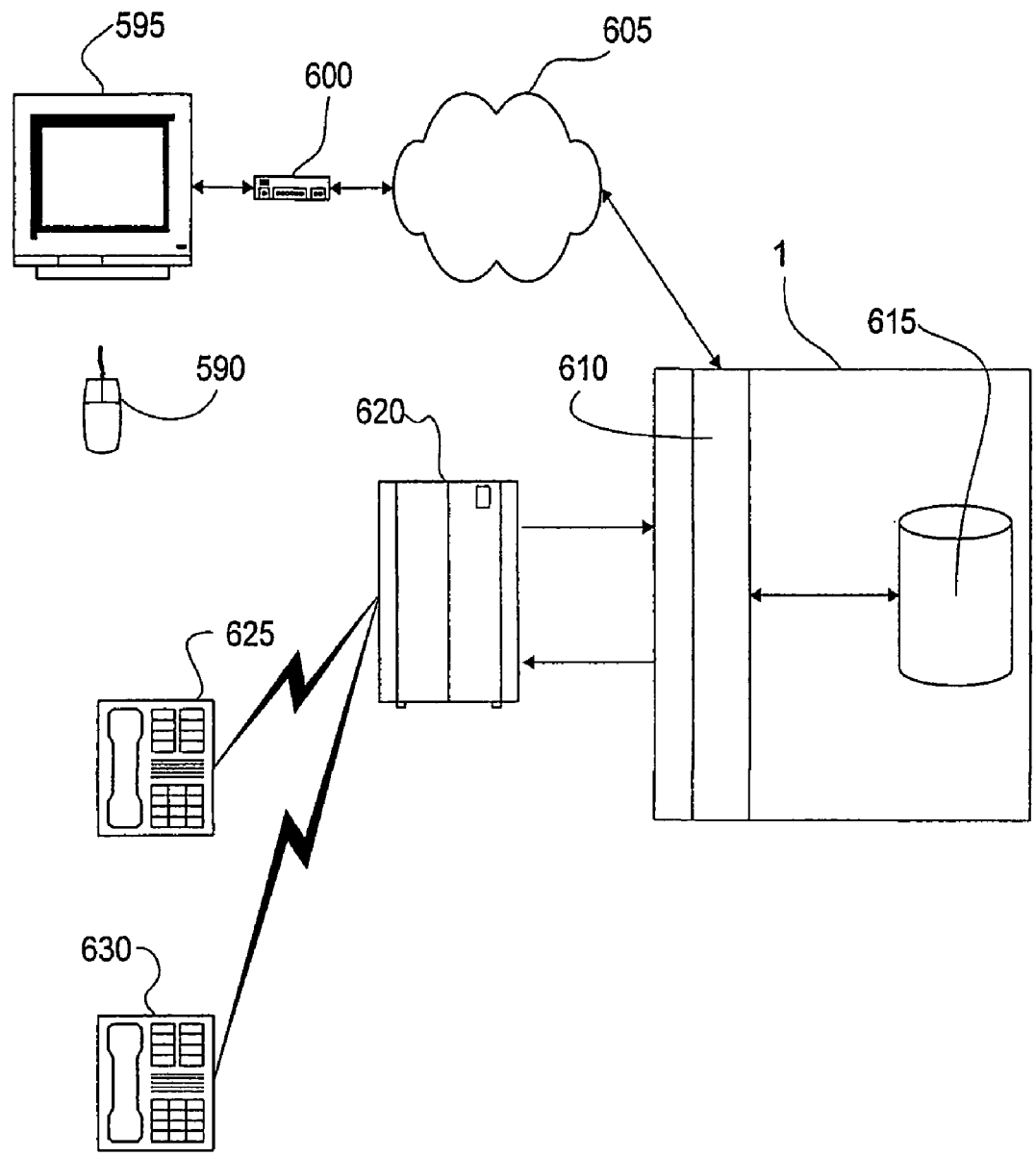
FIG. 21 is a graphic representation depicting televisions with embedded or add-on interactive television capabilities initiating calls using a computer for managing communications that is connected to a traditional telephone network and the ITV network in an exemplary embodiment of the present invention.

FIG. 21 represents an embodiment of the invention whereas the capability is provided for Interactive Television (ITV) systems to initiate rules-managed and concealed phone number calls as provided by a computer 1 for managing communications.

The computer 1 is a computer of the traditional type including ROM, RAM, a processor, etc. is shown connected to a public telephone system switch 620, which is in turn connected to the worldwide public telephone network. The computer is also connected to the public Internet or a private ITV network 605. The computer contains the hardware, application software, and database required to operate the invention.

An ITV user utilizes hardware typically consisting of a television 595, a remote control or other input device 590, and an ITV control system 600 connected to an ITV service provider network 605. The ITV control system 600 may be a self-contained unit or embedded into the television, a computing device, or gaming device connected to the television 595.

The ITV service provider network can be a completely closed system, a private system integrated via gateway to the Internet, or a completely Internet carried system. The service provider's implementation choices will impact the integration process with an ITV network. If the ITV network is implemented with Internet capabilities offering support for standard URL linking within its ITV applications then integration is not required. Alternately, if an API exists for Internet enabled ITV applications on the network it would be required to integrate the invention with that API. Finally, if the system is a closed network, the invention would be required to be directly integrated with the ITV system application. The ITV industry appears to be embracing Internet enabled ITV infrastructures in an effort to leverage the pervasiveness of the pubic Internet. In any case, the invention must be integrated or able to be reached using standard Internet URLs in order to satisfy the requirements of the embodiment.

As an ITV user views ITV enhanced programming or other capabilities such as computing or gaming utilizing the ITV hardware which has been integrated with the invention, the programming or other ITV application could allow for the connecting of a call to the user's telephone 625 upon the user viewing enabled content, taking a certain action with the remote control device or other input device 590, or specifically requesting the call utilizing the remote control or other input device 590.

The invention will require the ITV user's telephone 625 number and a target telephone 630 number to connect a second party. These telephones may be wired to the traditional telephone network or be of the wireless cellular type. The phone number for the second party will be required to be either 1) stored in the invention database 615 along with any other call management rules or, 2) passed to the invention by the ITV application at the time a call is initiated. The phone number for the ITV user may be 1) collected from the user via ITV remote control or other input device 590 at the time of the call, 2) stored in the invention database 615, or 3) passed to the invention by the ITV application at the time a call is initiated.

At the initiation of a call, the ITV application system will connect to the invention via the public Internet or a custom connection to a private ITV network 605. The application logic 610 will evaluate the caller's connection request. The application logic 610 evaluates the call request for validity of syntax and structure, then searches the rules database 615 for records associated with the call recipient's call management settings.

If there are no such call management settings for the call recipient, the system can respond based on system, group, or per user default setting to either allow or disallow the call. This provides the flexibility to by default connect all calls that do not associate to a rule, or to by default deny all calls that do not associate to a rule.

If the database 615 does contain call management settings for the call recipient, the application logic 610 will evaluate the rules to determine if the caller is authorized to connect with the call recipient at the current time and date. If the caller is authorized by the recipient to connect a recipient phone number, and furthermore authorized for the current time and date, the application logic 610 will connect the call utilizing the public telephone switch 620. The computer 1 passes the caller and call recipient phone numbers as stored in the database 615 to the telephone switch 620 using an application programming interface ("API") appropriate to the service provider or telephone switch manufacturer. The telephone service provider then connects the ITV user telephone 625 to a call with the recipient telephone 630 by dialing both numbers and connecting the call upon the parties' answer.

Figure 22:
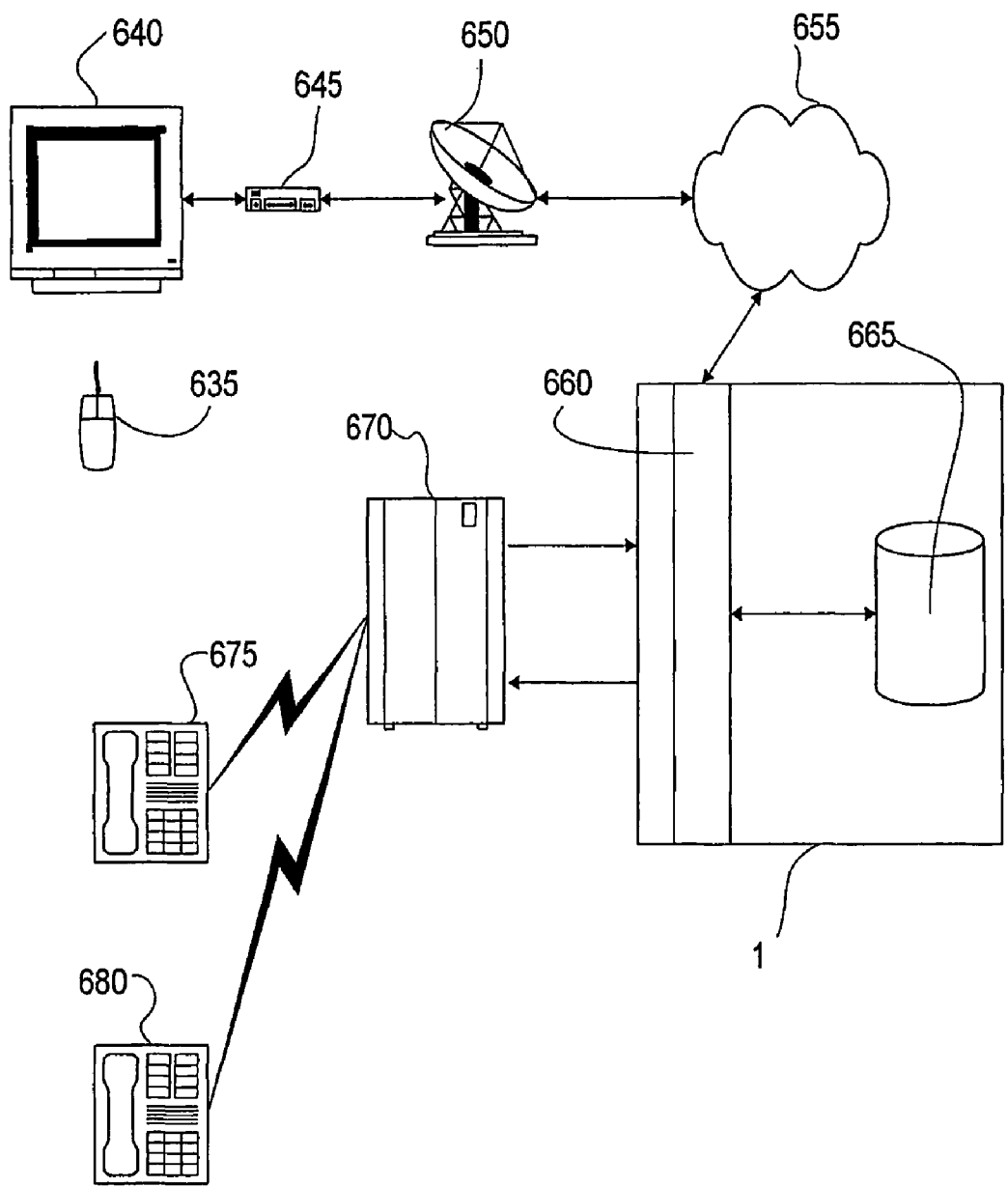
FIG. 22 is a graphic representation depicting televisions with embedded or add-on satellite communications systems initiating calls using a computer for managing communications that is connected to a traditional telephone network and the satellite network in an exemplary embodiment of the present invention.

FIG. 22 represents an embodiment of the invention whereas the capability is provided for satellite television systems to initiate rules-managed and concealed phone number calls as provided by a computer for managing communications 1.

A computer 1 is a computer of the traditional type including ROM, RAM, a processor, etc. is shown connected to a public telephone system switch 670, which is in turn connected to the worldwide public telephone network. The computer is also connected to the public Internet or a private satellite network 655. The computer contains the hardware, application software, and database required to operate the invention.

A satellite television user utilizes hardware typically consisting of a television 640, a remote control device 635, and a satellite control system 645 connected to a satellite dish. Some satellite systems also connect the control system 645 to a telephone line in order to order pay per view programming. The satellite control system 645 may be a self contained unit or embedded into the television, a computing device, or gaining device connected to the television 640.

Three methods of placing calls are conceived in this embodiment. The first method would consist of integrating with the embedded software application that operates the control system 645, and utilizing the built in modem contained in standard DSS type satellite systems to connect with the standard telephone network, dial a telephone connecting to either dedicated modems connected with the invention, or to a standard Internet ISP. In either case, a simple character based login procedure would be executed to authenticate the satellite account, and a uniquely assigned system code would be passed to identify the account associated with the control system 645. Call parameters would then be passed to the invention in either a simple character transmission, or via other standard TCP/IP or Internet protocol such as an HTTP request to a URL as implemented in the exemplary embodiment. The software application of the satellite control system 645 would require modification to support this first connection method. The invention would support users with multiple control systems 645 in their homes, offices, or simultaneous multiple locations by storing unlimited system codes in association with the account.

The second method of placing calls would consist of utilizing two-way Internet functionality supported by certain satellite systems 650 and 655. Calls could be placed using a standard computer connected to the satellite system, connecting to the invention as in the exemplary embodiment to interact with the application via a web browser and utilizing the ability to originate a call from the invention. Calls could also be placed utilizing the user interface mechanisms supported by the control system 645 and its remote control device 635. The control system application would have to be enhanced to support the initiation of phone calls from the control system 645 on screen menus, and if phone call origination related to satellite programming is required, the programming would need to be encoded with destination telephone numbers and the control system application enhanced to capture the encoded data and utilize it based on the satellite user's actions with the remote control device 635.

The third method of placing calls would consist of integrating with the ITV application system the functionality supported by certain satellite systems in an arrangement and method as discussed in FIGS. 21 and 22.

The invention will require the satellite user's telephone 675 number and a target telephone 680 number to connect a second party. These telephones may be wired to the traditional telephone network or be of the wireless cellular type. The phone number for the second party will be required to be either 1) stored in the invention database 665 along with any other call management rules or, 2) passed to the invention by the satellite application at the time a call is initiated. The phone number for the satellite user may be 1) collected from the user via satellite remote control device 635 at the time of the call, 2) stored in the invention database 665, or 3) passed to the invention by the satellite application at the time a call is initiated.

At the initiation of a call, the satellite application system will connect to the invention via the public Internet or a custom connection to a private satellite network 655. The application logic 660 will evaluate the call connection request. The application logic 660 evaluates the call request for validity of syntax and structure, then searches the rules database 665 for records associated with the call recipient's call management settings.

If there are no such call management settings for the call recipient, the system can respond based on system, group, or per user default setting to either allow or disallow the call. This provides the flexibility to by default connect all calls that do not associate to a rule, or to by default deny all calls that do not associate to a rule.

If the database 665 does contain call management settings for the call recipient, the application logic 660 will evaluate the rules to determine if the caller is authorized to connect with the call recipient at the current time and date. If the caller is authorized by the recipient to connect a recipient phone number, and furthermore authorized for the current time and date, the application logic 660 will connect the call utilizing the public telephone switch 670. The computer 1 passes the caller and call recipient phone numbers as stored in the database 665 to the telephone switch 670 using an application programming interface ("API") appropriate to the service provider or telephone switch manufacturer. The telephone service provider then connects the satellite user telephone 675 to a call with the recipient telephone 680 by dialing both numbers and connecting the call upon the parties' answer.

Figure 23:
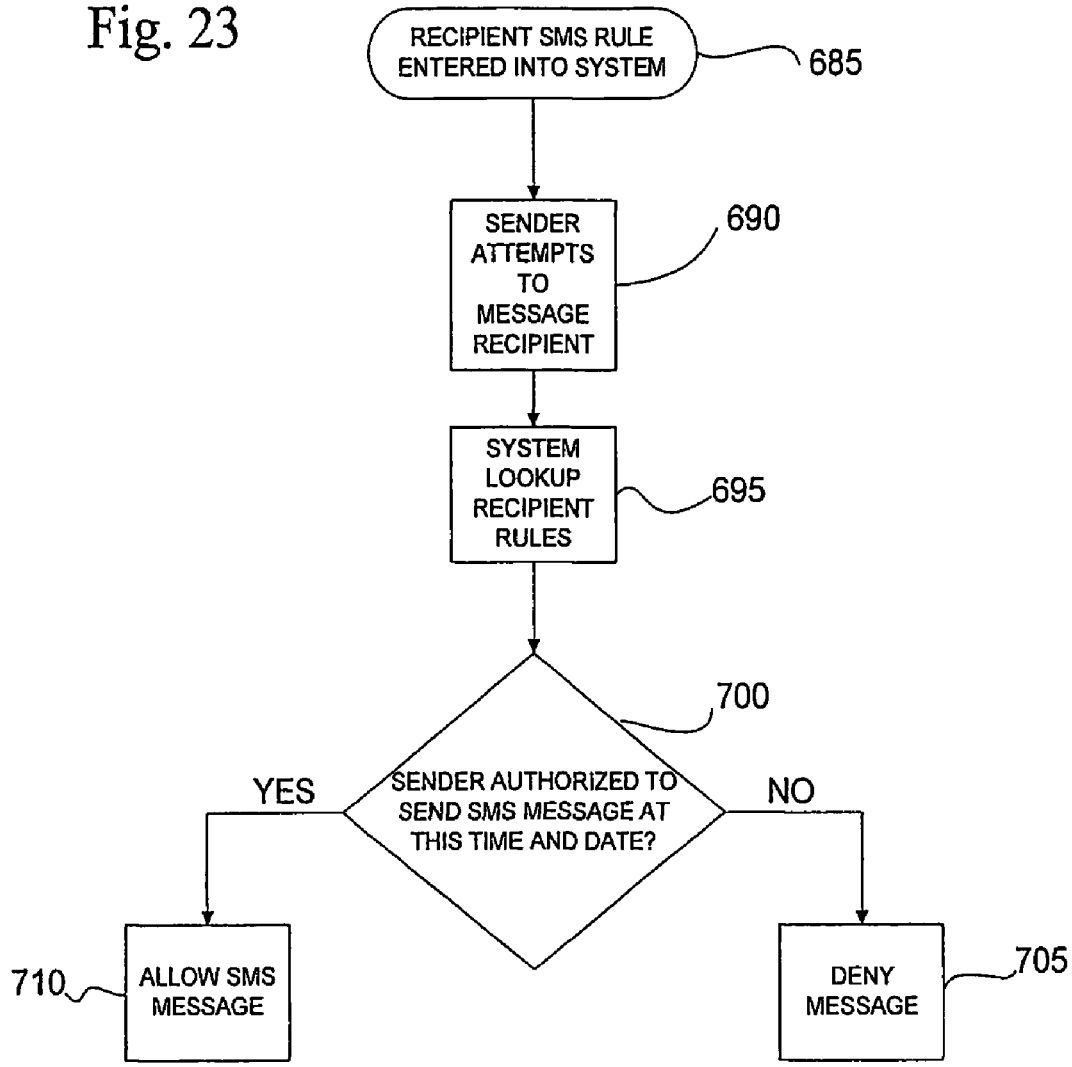
FIG. 23 is a flow chart of the process of an exemplary embodiment of the present invention to manage incoming SMS messages such that the message recipient can control if, when, and who may send SMS messages to them.

FIG. 23 is a flowchart of the process in an embodiment of the invention to manage incoming SMS messages to a user such that the message recipient can control if they may be messaged, when they are willing to accept messages, and who may leave messages for them.

In order to implement this embodiment of the invention, integration with existing SMS services is required. Providers of SMS services, typically cellular phone network operators, have implemented email gateways and APIs to their SMS systems. In order to effectively implement managed SMS services using the invention, it must be tightly integrated or embedded into the SMS services application architecture.

The SMS message recipient is required to connect to the application interface of the invention 685 and define one or more rules to be applied as incoming SMS messages are processed and to enter the target SMS phone number for their account on the SMS message system.

When the message sender initiates an SMS message utilizing any of the methods above (as well as others not noted), the system of the invention which is integrated with the paging system application will lookup the recipient rules in the application system database 695.

The message recipient rules are compared to the current general rules they have defined for processing incoming SMS messages or specific rules associated to the sender. The message recipient's rules are evaluated to determine if the sender is authorized to send a message to the message recipient's SMS device at the current date and time 700. If the rules allow the message to be sent, the system will permit the message to be forwarded to the recipient's SMS device 710 utilizing its integration with the SMS system application. If the rules dictate that a message is not authorized to be sent, then the message is rejected 705. The embodiment of the invention may utilize any method to notify the sender of the rejection, or may not notify the user and rather just not send the message.

Figure 24:
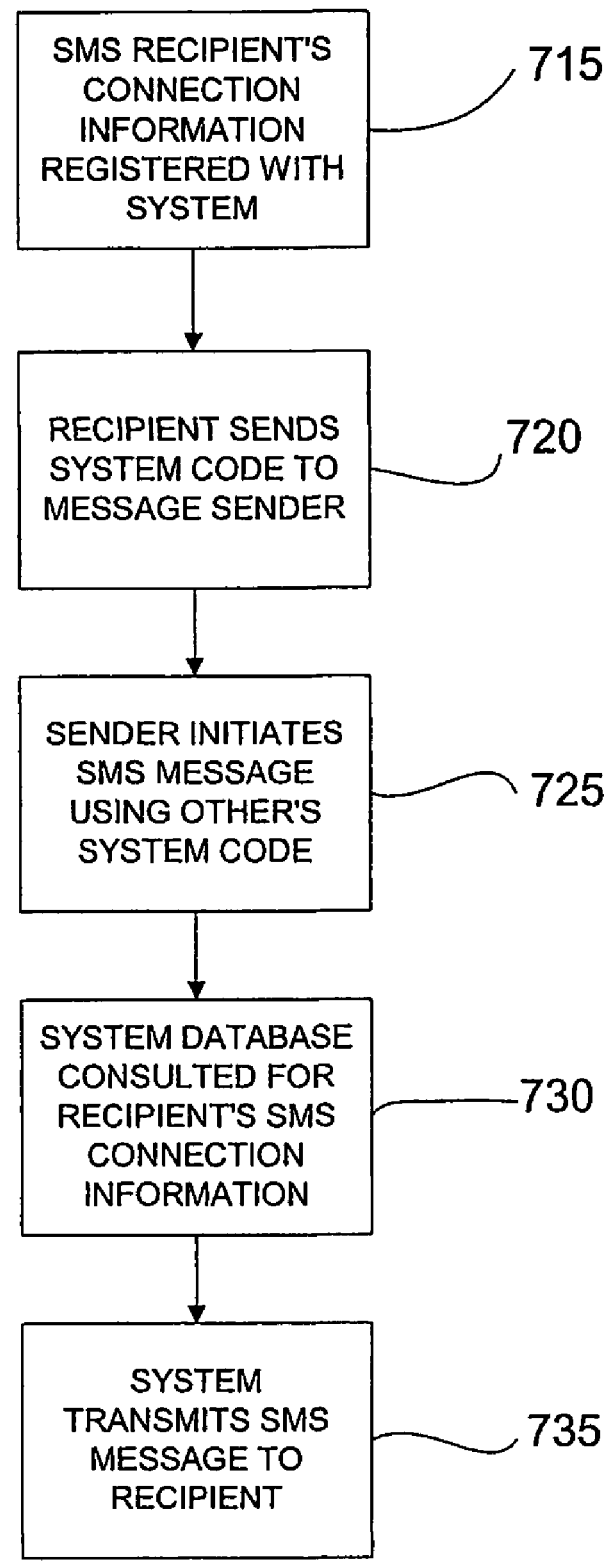
FIG. 24 is a flow chart of the process of an exemplary embodiment of the present invention for a party to send an SMS message to a recipient's SMS enabled device without revealing the SMS recipient number to the sending party.

FIG. 24 is a flowchart of the process in an embodiment of the invention to enable a party to send an SMS message to a recipient's SMS enabled device while keeping the recipient's SMS number concealed from the sending party. In order to provide a concealed SMS message system phone number capability to the message recipient, the recipient's SMS system number must be registered within the application of the invention computer 715. Upon registration, one or both users, depending on their choices to become a member, are able to distribute one or more unique system codes 720. System codes may be utilized as stand alone codes or embedded into an Internet URL as below.

http://jules.dafoink.com/talkRules/
callLink.asp?trID=5631EDC86148489C9BFA904CA
D80D4AA In the example above, each code is a unique identifier generated by a publicly know algorithm referred to as GUID or globally unique identifier, which is not an object of the invention, that cannot be generated again. In the example above, the code is the string of alphanumeric characters appearing after the "=" in the URL. The system code could be utilized without the URL, or other forms of a unique identifier could be used as an alternative. For example, a 10 digit numeric string similar to a traditional telephone number could be assigned to a user and this system code could be used as the identifier which references the user's actual SMS system number and call management rules associated with it.

Message recipients may distribute 720 their system code in a variety of ways, which are standard communication methods including but not limited to: email, voice, written, chat, instant messaging, and public or private web sites.

The sender initiates the SMS message 725 by either: 1) using their SMS device to send a message using the recipient's system code as the target SMS number, 2) using a screen of the invention to enter the system code and send an SMS message (invention is integrated with SMS system); 3) using an Internet URL to activate a screen of the invention to send an SMS message without having to enter the system code (code is embedded into URL); or 4) using an SMS enabled software application to send an SMS message using the recipient system code.

Either method message initiation engages the application system logic of the invention to verify the structure and contents of the URL and to search the application database for the SMS number of the recipient associated with the system code 730.

The invention uses the SMS number for the SMS message recipient's SMS device stored in its database to transmit the message to the receiving SMS device 735. The invention is integrated with the SMS service provider's application API or embedded into the SMS service provider's application which handles the message delivery. In utilizing the system code method, the SMS message recipient is not required to reveal their SMS number to the message sender.

Figure 25:
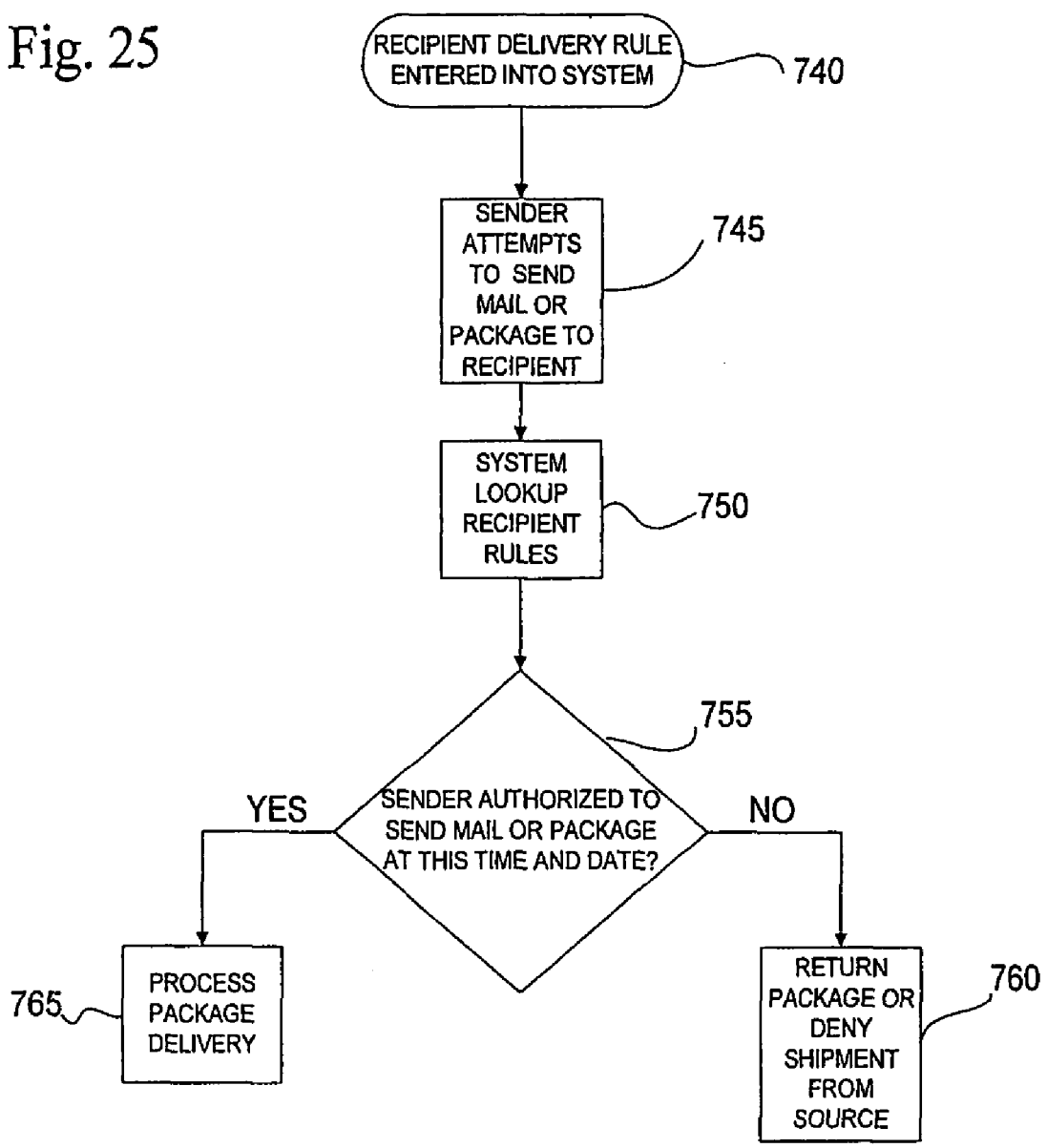
FIG. 25 is a flow chart of the process of an exemplary embodiment of the present invention to manage incoming mail and packages such that the recipient can control if, when, and who may send mail and packages to them.

FIG. 25 is a flowchart of the process in a further exemplary embodiment of the invention to manage incoming mail and packages such that the recipient can control if, when, and who, may send mail and packages to them. This embodiment of the invention would require 1) integration with one or more commercial or government postal and package delivery services or 2) establishment of a mail and package processing and forwarding service which would serve as in intermediary between the sender and recipient but utilize existing commercial and government delivery services or 3) establishment of a new delivery service with the invention implemented as a core part of its delivery process.

Herein, the name "sender" will refer to a party (individual, business, or organization) sending a letter, document, post card, advertisement, parcel or any other type of item normally delivered by the postal service or commercial delivery services. The recipient will refer to the party receiving or intended to receive the item being delivered.

Regardless of the nature of the implementation, the overall processing and delivery of mail and packages would be the same. The postal recipient is required to connect to the application interface of the invention 740 and define one or more rules to be applied as incoming delivery items are processed and to enter the target mailing address for delivery.

When the sender uses a delivery service to send the delivery item 745, the service utilizes the system of the invention which is integrated with a delivery software application, or alternately a human operator will use the application interface of the invention to lookup the recipient rules in the application system database 750.

The recipient rules are compared to the current general rules they have defined for processing incoming delivery items or specific rules associated to the sender. The recipient's rules are evaluated to determine if the sender is authorized to send a delivery item to the recipient's address at the current date and time 755. If the rules allow the delivery item to be sent, the system will permit the item, either by authorizing it to a human operator using an application interface to the invention, or by authorizing its delivery to a delivery service software application. The delivery item will them be processed and delivered 765 according to the normal operation of the delivery service. If the rules dictate that a delivery item is not authorized to be sent, then the delivery item is rejected 760 and not delivered to the recipient. The embodiment of the invention may utilize any method to process a rejection, potentially through return of the delivery item to the sender.

Figure 26:
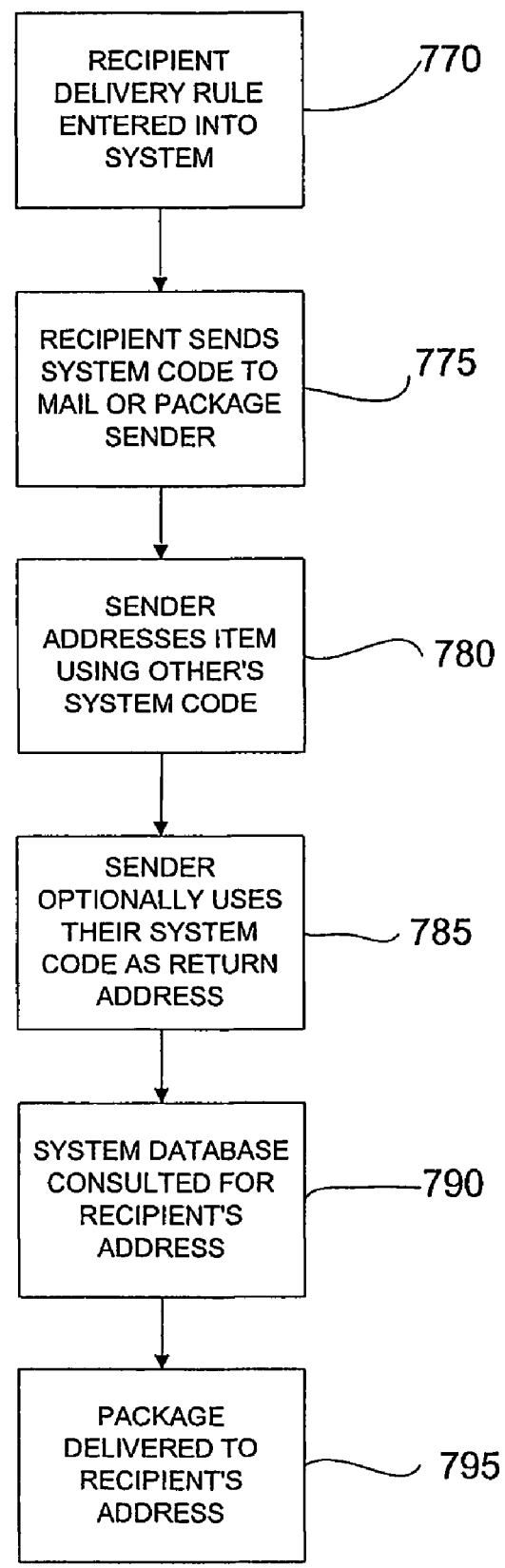
FIG. 26 is a flow chart of the process of an exemplary embodiment of the present invention for a party to send mail or a package to a recipients address without revealing the recipient address to the sending party or the return address to the recipient.

FIG. 26 is a flowchart of the process in a further exemplary embodiment of the invention to deliver a mail item or package to a recipient's mailing address while keeping the recipient concealed. This embodiment of the invention would require 1) integration with one or more commercial or government postal and package delivery services or 2) establishment of a mail and package processing and forwarding service which would serve as in intermediary between the sender and recipient but utilize existing commercial and government delivery services or 3) establishment of a new delivery service with the invention implemented as a core part of its delivery process.

In order to provide a concealed mailing address capability to the delivery item recipient, the recipient's address must be registered within the application of the invention computer 770. Upon registration, the recipient and optionally the sender is able to distribute one or more unique system codes 775. Each code is a unique identifier generated by a publicly know algorithm referred to as GUID or globally unique identifier, which is not an object of the invention, that cannot be generated again. In other embodiments of the invention other forms of a unique identifier could be used as an alternative. For example, a 10 digit numeric string similar to a traditional telephone number could be assigned to a user and this system code could be used as the identifier which references the user's actual mailing address and delivery management rules associated with it.

Recipients may distribute their system code in a variety of ways, which are standard communication methods including but not limited to: email, voice, written, chat, instant messaging, and public or private web sites.

Regardless of the method used to distribute the system code, in the exemplary embodiment a potential caller must obtain the system code in order to initiate a delivery. The caller addresses the delivery item 780 by using the system code of the recipient as an alternative to the recipient's mailing address. Optionally, the sender can use their own system code as the return address 785 in order to keep their mailing address private.

When the sender uses a delivery service to send the delivery item, the service utilizes the system of the invention which is integrated with a delivery software application, or alternately a human operator will use the application interface of the invention to lookup the recipient rules in the application system database 790. The database contains the actual mailing address for the recipient, which will be used by the delivery service to deliver the item 795.

Figure 27:
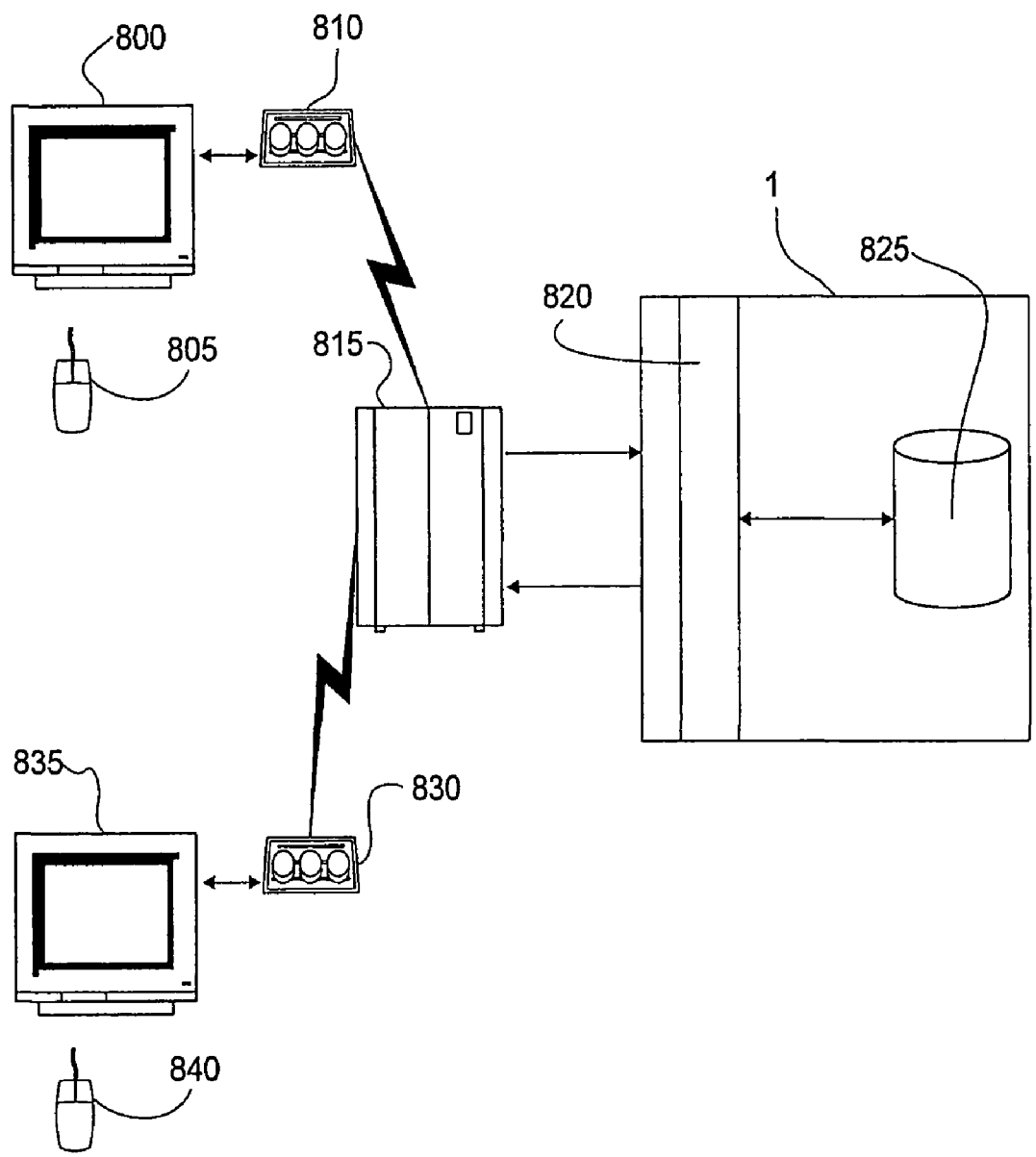
FIG. 27 is a graphic representation depicting video conferencing system and video phone call users initiating calls using a computer for managing communications that is connected to a traditional telephone network in an exemplary embodiment of the present invention.

FIG. 27 represents an exemplary embodiment of the invention that provides the capability of video conferencing system or video phone call users to connect calls using a computer 1 for managing communications that is connected to a traditional telephone network.

A typical video conferencing configuration consists of a monitor 800 connected to a video camera and control unit 810, and a remote control device 805. Other variations of the configuration could combine or further separate the components, or other components could be added such as a traditional computer but the essential elements of monitor, camera, control hardware, and input device are always present. Video conferencing systems are usually connected to the telecommunications system via one or more ISDN lines, or via leased or T1 lines that terminate at a telephone company point-of-presence (POP) facility.

A video phone call configuration has similar core components including monitor, camera, control hardware, and input device, but is usually connected to standard telephone lines and manufactured as a more compact unit which will also function as a standard telephone.

Video conferencing systems and video phones are similar but may not use compatible communication methods and therefore may not have the capability to establish a video call between the two types. Also, there may be variances in the capabilities of video conferencing systems and video phones in that they may not be able to communicate to similar products in the same category. This would be more common with video phones as they are a less mature technology. For the purposes of discussing this embodiment, it is assumed that only compatible devices will attempt to communicate through the system.

Upon initiating a phone call, the video caller's connection request is validated by the telephone switch 815 by passing the call request to the application logic 820 of the computer 1. The application logic 820 evaluates the call request for validity of syntax and structure, then searches the rules database 825 for records associated with the call recipient's call management settings.

If there are no such call management settings for the call recipient, the system can respond based on system, group, or per user default setting to either allow or disallow the call, or to allow a voice only call. This provides the flexibility to by default connect all calls that do not associated to a rule, or to by default deny all calls that do not associate to a rule, or to allow only allow a voice only call. Any variation of voice and video defaults could be configured into the system.

If the database 825 does contain call management settings for the call recipient, the application logic 820 will evaluate the rules to determine if the caller is authorized to connect with the call recipient at the current time and date, and then determine if voice, video, or both are permitted. If the caller is authorized by the recipient to connect a recipient video phone number, and furthermore authorized for the current time and date, the application logic 820 will connect the call utilizing the public telephone switch 815. Depending on the API used with the telephone switch 815, this may be accomplished by returning a call approval code to the switch, or establishing a new call setup sequence as provided by the switch 815 API. If the API provides for passing an approval or denial code, the switch can simply connect the call just as it would if it were not interfaced with the invention computer 1. If the switch API does not support the specific functionality required to receive call approval and denial codes from an external system, then a new call can be established such that the original caller connection is terminated and a new call is established to both caller and call recipient phone numbers. As the telephone switch manufacturers and telephone application systems have a varied set APIs available to interface with the telephone switching infrastructure, the actual call connection method will depend on the switching hardware and software utilized in a particular implementation.

Figure 28:
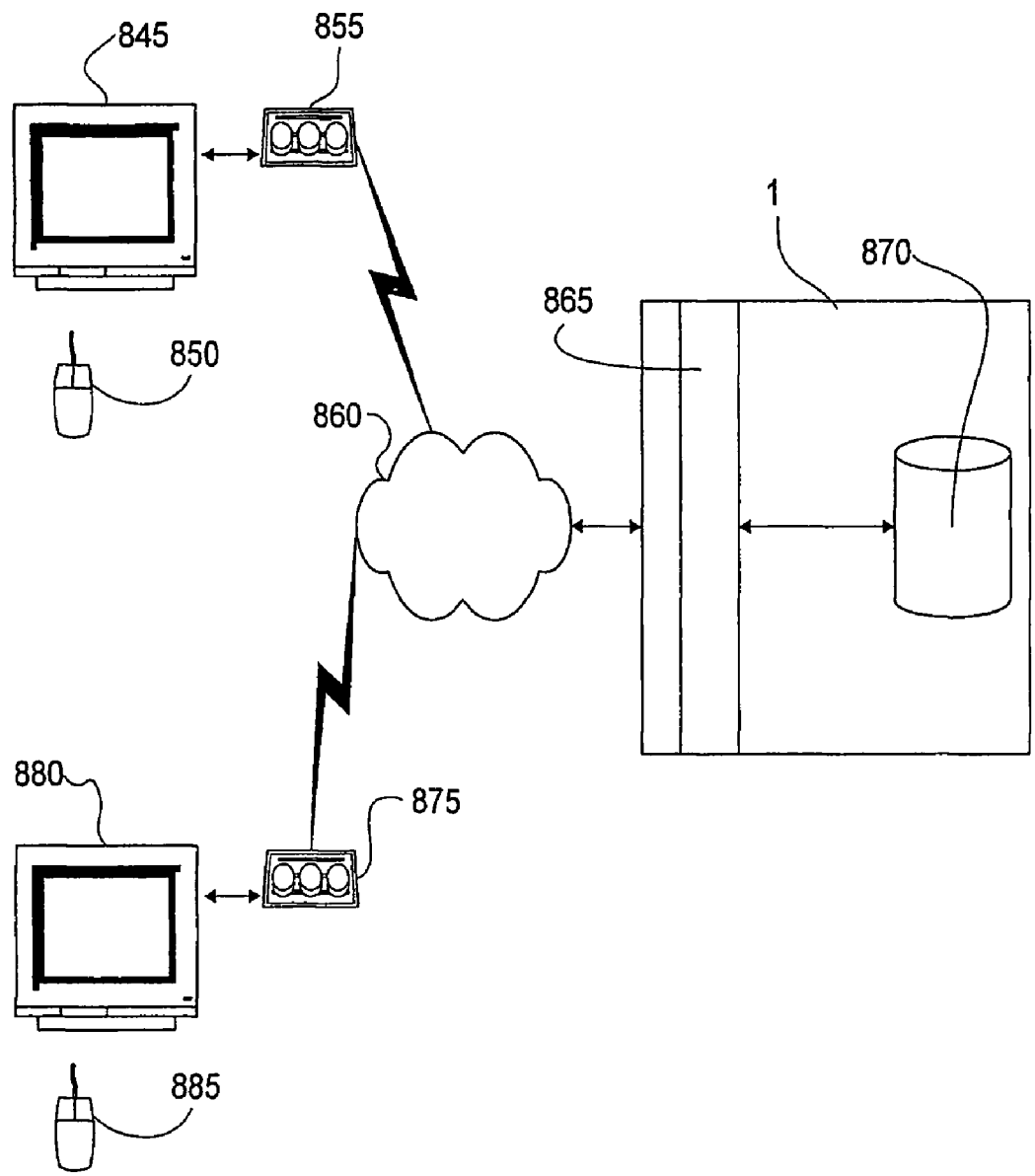
FIG. 28 is a graphic representation depicting video conferencing system, video phone call, or Internet-based video and/or audio, or multimedia communication application users initiating calls using a computer for managing communications that is connected to the Internet or a private network in an exemplary embodiment of the present invention.

FIG. 28 represents a further exemplary embodiment of the invention that provides the capability for video conferencing system, video phone, or Internet-based video and audio devices, or multimedia communication application users to connect calls using a computer for managing communications 1 that is connected to the public Internet or private network.

A typical video conferencing configuration consists of a monitor 845 connected to a video camera and control unit 855, and a remote control device 850. Other variations of the configuration could combine or further separate the components, or other components could be added such as a traditional computer but the essential elements of monitor, camera, control hardware, and input device are always present. In this embodiment we are assuming the use of video conferencing equipment which is connected and can operate over the public Internet or private network.

A video phone call configuration has similar core components including monitor, camera, control hardware, and input device, but is usually manufactured in a more compact offering. In this embodiment we are assuming the use of video phone equipment which is connected and can operate over the public Internet or private network.

Internet-based video and audio devices are usually connected to a traditional computer. The computer operates one or more control applications to collect the video and audio input from the devices and to manage the transmission of the data across the public Internet or private network. Although this is the typical case, video and audio units are available which can operate independently of a separate computer and connect directly to the Internet via modem, router, gateway, or LAN connection. These types of units have embedded the required functions of a typical computer into their hardware. In this embodiment we are assuming the use of Internet-based video and audio equipment which is connected and can operate over the public Internet or private network.

Multimedia communication applications allow computer users to share live video and audio similar to video conferencing, to sketch on a shared virtual white board, to simultaneously review and modify documents, to transfer documents, and to review pre-recorded videos, among other features, between two or more computers located anywhere on the public Internet or a private network. These applications are connected to a variety of input devices as necessary to collect input to be transmitted and shared among the computers participating in the session. In this embodiment we are assuming the use of multimedia applications which can operate over the public Internet or private network.

Video conferencing systems and video phones are similar but may not use compatible communication methods and therefore may not have the capability to establish a video call between the two types. Also, there may be variances in the capabilities of video conferencing systems and video phones in that they may not be able to communicate to similar products in the same category. This would be more common with video phones as they are a less mature technology. Internet video and audio devices may not be able to communicate with others of similar capabilities do to incompatible application and transmission implementations. Multimedia applications may also be incompatible depending on the manufacturer or user configuration. For the purposes of discussing this embodiment, it is assumed that only compatible devices and applications will attempt to communicate through the system.

For the purposes of describing this embodiment, users of the several communication device and application combinations described above will be referred to as video callers and video call will be used to describe to connection.

Upon initiating a phone call, the video call connection request is validated by the application logic 865 of the computer 1. The application logic 865 evaluates the call request for validity of syntax and structure, then searches the rules database 870 for records associated with the call recipient's call management settings.

If there are no such call management settings for the call recipient, the system can respond based on system, group, or per user default setting to either allow or disallow the call, or to allow a voice only call. This provides the flexibility to by default connect all calls that do not associated to a rule, or to by default deny all calls that do not associate to a rule, or to allow only allow a voice only call. Any variation of voice and video defaults could be configured into the system.

If the database 870 does contain call management settings for the call recipient, the application logic 865 will evaluate the rules to determine if the caller is authorized to connect with the call recipient at the current time and date, and then determine if voice, video, or both are permitted. If the caller is authorized by the recipient to connect a recipient video address, and furthermore authorized for the current time and date, the application logic 865 will connect the call utilizing the public Internet 860.

Figure 29:
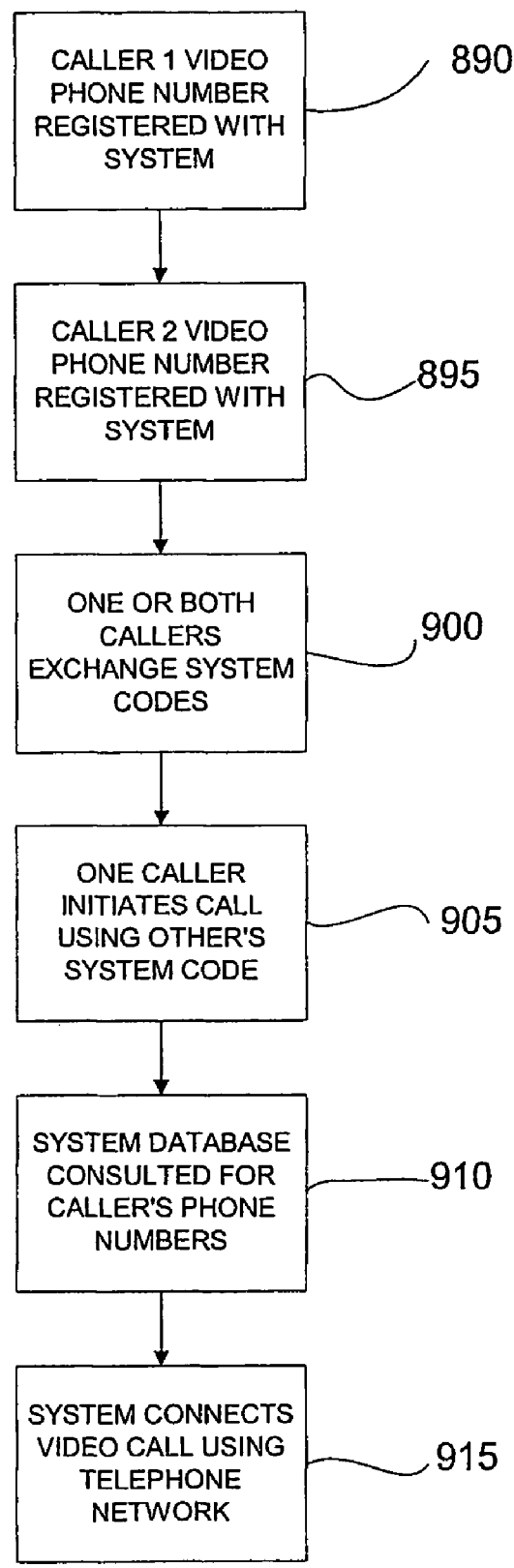
FIG. 29 is a flow chart of the process in an exemplary embodiment of the present invention to connect video conferencing system or video phone call users to other parties' compatible systems via the traditional telephone network without the call recipient(s) revealing their video system phone number.

FIG. 29 is a flowchart of the process in an embodiment of the invention to connect parties to a video conference or video telephone call using the traditional telephone network while keeping the caller and call recipient's phone numbers concealed. In order to provide a concealed phone number capability to the users, both the caller's 890 and the call recipient's 895 telephone numbers must be registered within the application of the invention computer.

Upon registration, one or both users, is able to distribute one or more unique system codes 900. In the exemplary embodiment, the system codes are generated and embedded into an Internet URL which can be used to initiate a call.

http://jules.dafoink.com/talkRules/
callLink.asp?trID=5631EDC86148489C9BFA904CA
D80D4AA Each code is a unique identifier generated by a publicly know algorithm referred to as GUID or globally unique identifier, which is not an object of the invention, that cannot be generated again. In the example above, the code is the string of alphanumeric characters appearing after the "=" in the URL. In other embodiments of the invention, the code could be utilized without the URL, or other forms of a unique identifier could be used as an alternative. For example, a 10 digit numeric string similar to a traditional telephone number could be assigned to a user and this system code could be used as the identifier which references the user's actual telephone number and call management rules associated with it.

Callers may distribute their system code in a variety of ways, which are standard communication methods including but not limited to: email, voice, written, chat, instant messaging, and public or private web sites.

Regardless of the method used to distribute the system code, a potential caller must obtain the system code in order to initiate a telephone call. The caller initiates the video call 905 by entering a code in an enabled application, or by utilizing a URL with the system code embedded. The system code engages the application system logic of the invention to verify the structure and contents of the code and to search the application database for the video telephone number of the recipient associated with the system code 910.

In alternative embodiments of the invention, the system code processing and call initiation could be handled in a variety of ways. For example, the caller could call a fixed telephone number for a service provider, and then be prompted to enter the call recipient's system code upon which the system would connect the video call.

The invention uses the telephone numbers for the caller and call recipient stored in its database to connect both parties to a telephone call 915. The connection is accomplished by integrating the invention with a telephone switching device or switching device API. In utilizing the system code method, neither the video caller nor call recipient is required to reveal their telephone number to the other.

Figure 30:
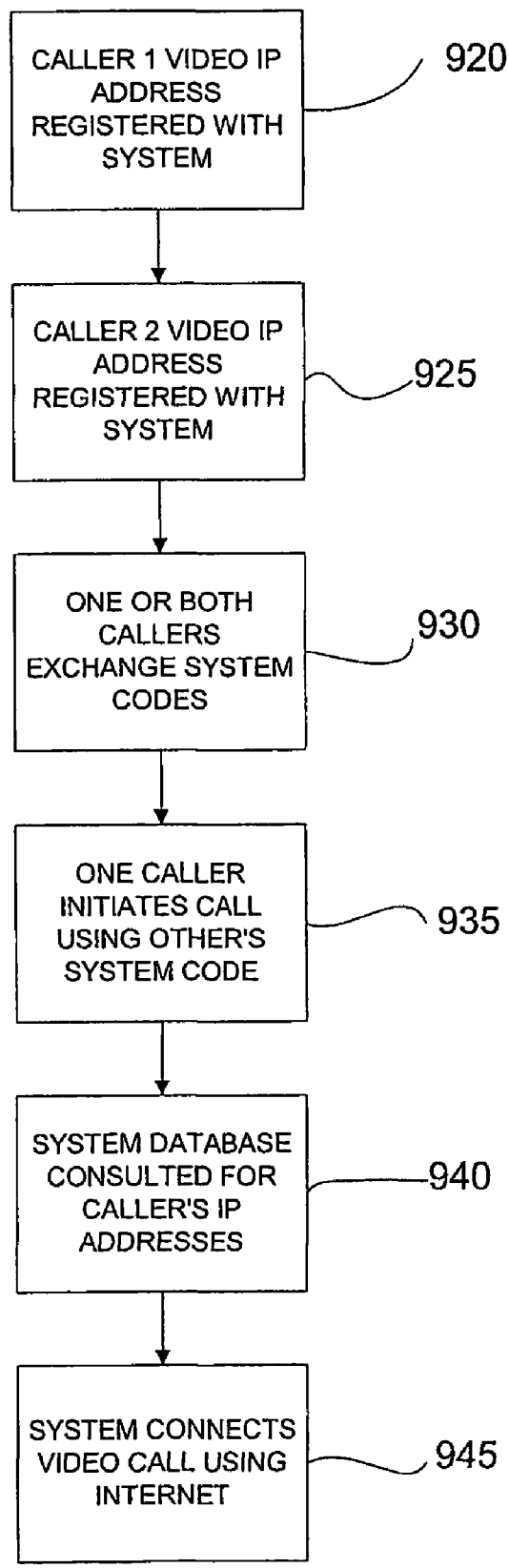
FIG. 30 is a flow chart of the process in an exemplary embodiment of the present invention to connect video conference, video phone call, or Internet-based video and/or audio, or multimedia communication users to other parties' compatible systems via the Internet without the call recipient(s) revealing their video system address, IP address, phone number, or other user system specific communication address.

FIG. 30 is a flowchart of the process in an embodiment of the invention to connect parties to a video conference or video telephone call using the public Internet or private network while keeping the caller and call recipient's network addresses and access codes concealed.

In order to provide a concealed connection capability to the users, both the caller's 920 and the call recipient's 925 network addresses and system access codes (if applicable to the particular video communication application) must be registered within the application of the invention computer. Video communications applications which allow two or more parties to communicate live over the Internet required mechanisms of addressing in order to route traffic between the callers. The basis for the addressing schemes is the TCP/IP protocol and associated IP address of a user's computer.

Upon registration, one or both users, is able to distribute one or more unique system codes 930. In the exemplary embodiment, the system codes are generated and embedded into an Internet URL which can be used to initiate a call.

http://jules.dafoink.com/talkRules/callLink.asp?trID=5631EDC86148489C9BFA904CAD80D4AA Each code is a unique identifier generated by a publicly know algorithm referred to as GUID or globally unique identifier, which is not an object of the invention, that cannot be generated again. In the example above, the code is the string of alphanumeric characters appearing after the "=" in the URL. In other embodiments of the invention, the code could be utilized without the URL, or other forms of a unique identifier could be used as an alternative. For example, a 10 digit numeric string similar to a traditional telephone number could be assigned to a user and this system code could be used as the identifier which references the user's actual telephone number and call management rules associated with it.

Callers may distribute their system code in a variety of ways, which are standard communication methods including but not limited to: email, voice, written, chat, instant messaging, and public or private web sites.

Regardless of the method used to distribute the system code, a potential caller must obtain the system code in order to initiate a video call. The caller initiates the video call 935 by entering a code in an enabled application, or by utilizing a URL with the system code embedded. The system code engages the application system logic of the invention to verify the structure and contents of the code and to search the application database for the network address of the recipient associated with the system code 940.

In other embodiments of the invention, the system code processing and call initiation could be handled in a variety of ways. For example, the caller could call a fixed telephone number for a service provider, and then be prompted to enter the call recipient's system code upon which the system would connect the call.

The invention uses the network IP addresses for the caller and call recipient stored in its database to connect both parties to a telephone call 945. In utilizing the system code method, neither the video caller or call recipient is required to reveal their telephone number to the other.

Figure 31:
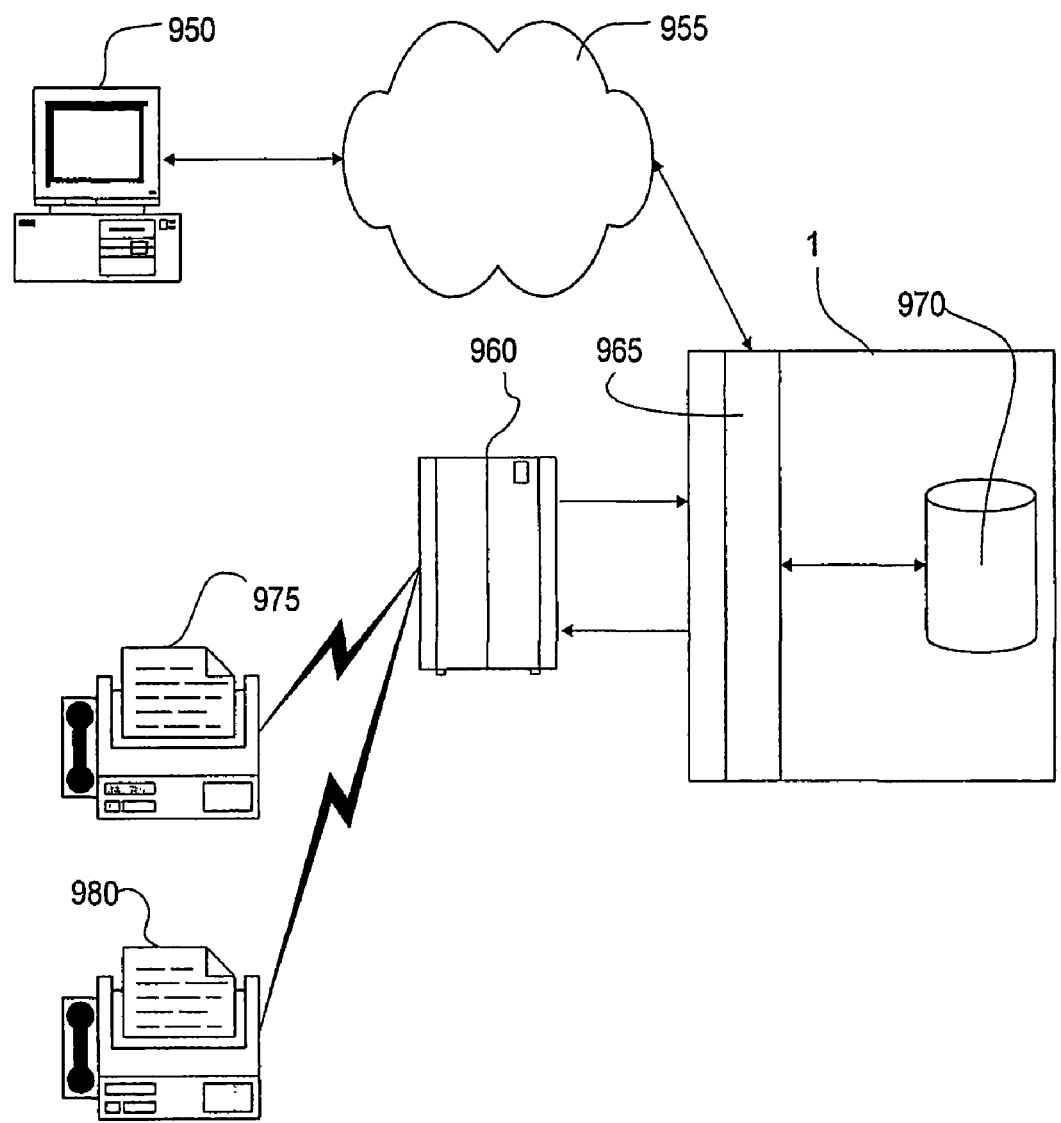
FIG. 31 is a graphic representation depicting facsimile machines and computer based facsimile applications initiating and receiving calls using a computer for managing communications that is connected to a traditional telephone network and to the Internet or private network in an exemplary embodiment of the invention.

FIG. 31 represents an embodiment of the invention whereas the capability is facsimile devices and computer based facsimile applications to transmit fax documents using a computer for managing communications 1 that is connected to the telephone network and public Internet or private network.

A facsimile device is connected to the public telephone network 975, 980 or is using an analog or digital cellular phone, or has a computer of the traditional type 950 connected to the public Internet 955 or alternately the computer could utilize a modem to connect directly to the stand alone facsimile devices. Both the computer equipped with fax application software and the standard facsimile devices are potential fax document senders and recipients in this embodiment. There are also facsimile devices which are able to connect to the public Internet or private network as a transmission medium, such functionality provided either natively to the device or as an add on component. The invention could be integrated into these network enabled fax devices utilizing an API or embedding the invention into their operating software. It is also functionally equivalent for any fax enabled software application or multifunction device with embedded facsimile capability to be a sender or recipient in this embodiment.

The sender initiates the fax transmission call using their computer 950, or utilizing a facsimile device 975, 980. Depending upon the software application, the computer may transmit a fax document using direct transmission over the public Internet 955 to a fax gateway, using email, or transmitting over the public Internet 955 or private network to another network connected fax device. Upon initiating a transmission, the sender's connection request is validated by the application logic 965. The application logic 965 evaluates the call request for validity of syntax and structure, then searches the rules database 970 for records associated with the call recipient's fax management settings.

If there are no such fax management settings for the fax recipient, the system can respond based on system, group, or per user default setting to either allow or disallow the transmission. This provides the flexibility to by default transmit all documents that do not associate to a rule, or to by default deny all transmissions that do not associate to a rule.

If the database 970 does contain fax management settings for the fax recipient, the application logic 965 will evaluate the rules to determine if the caller is authorized to transmit documents to the recipient at the current time and date. If the sender is authorized by the recipient to transmit documents, and furthermore authorized for the current time and date, the application logic 965 will connect the call utilizing the public telephone switch 960 or utilizing the public Internet 955 or private network according to sender and recipient configurations. If connecting via the network, the computer 1 must be integrated with the appropriate fax software application or communications gateway and utilize network addressing stored in the invention's application database 970 to connect the sending and receiving devices. If using the public telephone system, the computer 1 passes the caller and call recipient phone numbers as stored in the database 970 when to the telephone switch 960 using an application programming interface ("API") appropriate to the service provider or telephone switch manufacturer. The service provider then connects sending and receiving facsimile devices 975, 980, or computer with modem 950.

Figure 32:
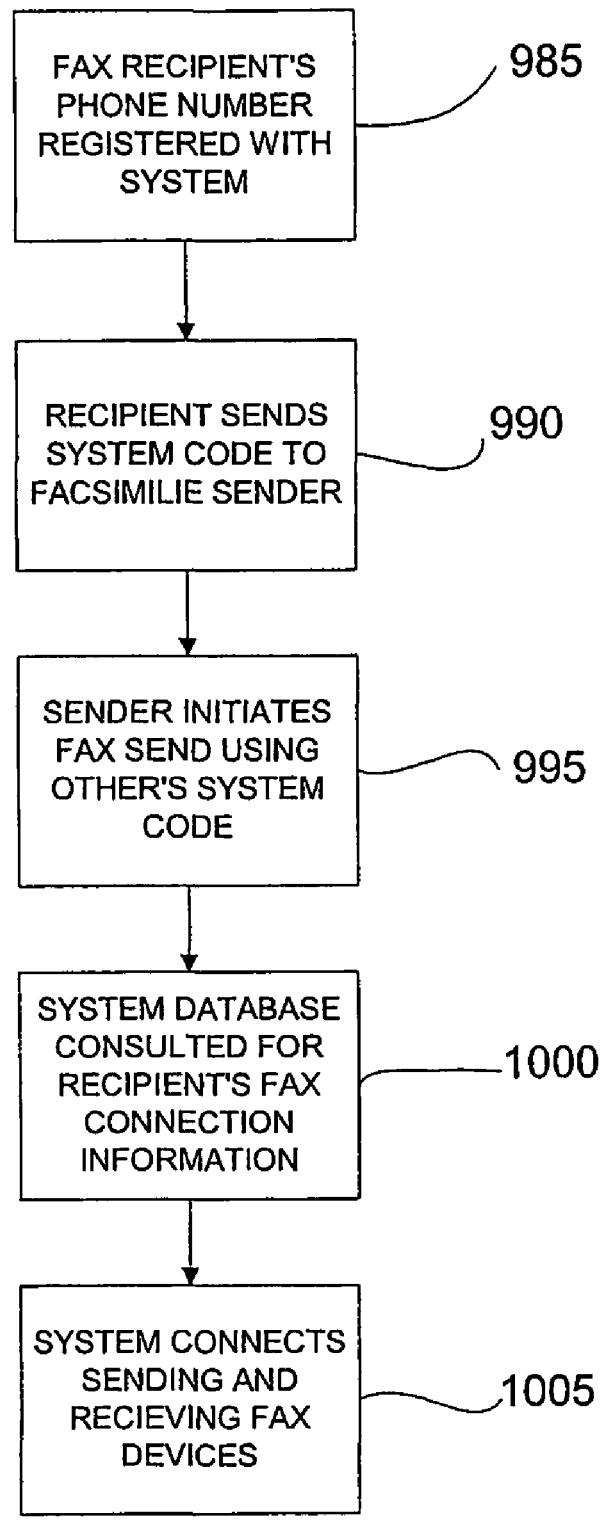
FIG. 32 is a flow chart of the process to connect facsimile machines and computer based facsimile applications to recipient facsimile devices without the fax recipient revealing their device phone number or Internet address, or other such communication address in an exemplary embodiment of the invention.

FIG. 32 is a flowchart of the process in the exemplary embodiment of the invention which enables a party to send a fax document to a recipient's facsimile device while keeping the recipient's fax telephone number concealed from the sending party.

In order to provide a concealed fax phone number capability to the message recipient, the recipient's fax number must be registered within the application of the invention computer 985.

Upon registration, one or both users, depending on their choices to become a member, are able to distribute one or more unique system codes 990. System codes may be utilized as stand alone codes or embedded into an Internet URL as below.

http://jules.dafoink.com/talkRules/
callLink.asp?trID=5631EDC86148489C9BFA904CA
D80D4AA In the example above, each code is a unique identifier generated by a publicly know algorithm referred to as GUID or globally unique identifier, which is not an object of the invention, that cannot be generated again. In the example above, the code is the string of alphanumeric characters appearing after the "=" in the URL. The system code could be utilized without the URL, or other forms of a unique identifier could be used as an alternative. For example, a 10 digit numeric string similar to a traditional telephone number could be assigned to a user and this system code could be used as the identifier which references the user's actual fax number and call management rules associated with it.

Message recipients may distribute their system 990 code in a variety of ways, which are standard communication methods including but not limited to: email, voice, written, chat, instant messaging, and public or private web sites.

The sender initiates the fax transmission 995 by using their fax device to send a message using a phone number to a fax gateway integrated with the invention, entering the recipient's system code as the target fax number. The gateway would consult the system database 1000 for authorization to connect the call, then connect the fax transmission 1005 if it is approved. The invention may also be integrated with a telecommunication switching device such that utilizing a fax gateway device is not required. In that configuration, the switching device would receive the fax call connection request, consult 1000 the invention for authorization to connect the call, then connect the call 1005 if the rules stored in the system database allow such connection.

Figure 37:
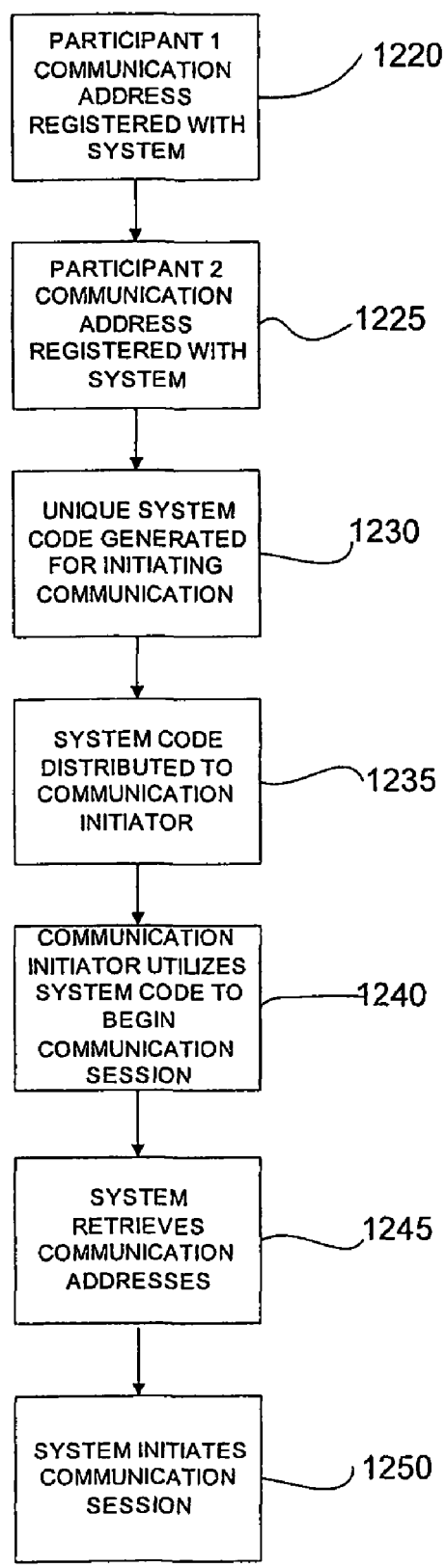
FIG. 37 is a flow chart of an exemplary process in an exemplary embodiment of the present invention by which a calling party, device, or software application initiates communications to a called party without supplying the communication address(es) of the called party, device, or software application.

FIG. 37 is a flow chart of an exemplary process in an exemplary embodiment of the present invention by which a calling party, device, or software application ("initiator") initiates communications to a called party without supplying the communication address(es) of the called party, device, or software application. In order to initiate communication between a first 1220 and a second 1225 party, without the initiator supplying the individual communications addresses of the participants, the first 1220, and second 1225 parties' communication addresses must both be registered within the application of the invention computer. Further, the initiating party must identify to the system the first and second parties to be called.

When the registering party identifies to the system the first and second parties to be called, a single unique system communications initiation code (standalone, or URL-embedded) would be generated, and would be related by the system to the communications addresses of each of the first and second parties to be called. That is, a single system code or system-code embedded URL would be associated with the communications addresses of both the first and second parties to be called. At this point, the registering party or other initiating party can initiate a communications session between the first and second parties; the registering initiating party may or may not themselves be one of the first or second parties.

As will be understood by someone with ordinary skill in the art, the description of two parties is illustrative and is not a limitation of the invention. More than two parties can participate in an invention-initiated communication as long as the communication addresses of all parties are registered with the system, and as long as the communications devices of the participants are technically enabled to participate. As demonstrated herein, the present invention can interface with a wide variety of communication systems and technologies. As will be understood by someone with ordinary skill in the art, the present invention is not limited to communication methods described herein or now known, but would be equally applicable to communication methods not now known or not described herein provided the communication method offers interface capabilities.

The present invention supports varying sizes and full alphanumeric character support in its addressing. The present invention supports communication address registration via user computer interface, file import of addresses, or via application programming interface (API).

Continuing with FIG. 37, upon registration of the participants, a unique system code would be generated 1230. System codes may be utilized as stand alone codes or may be embedded into an Internet URL as below:

http://jules.dafoink.com/talkRules/
callLink.asp?trID=5631EDC86148489C9BFA904CA
D80D4AA In the example above, each code is a GUID. Generation of a GUID is not an object of the invention. The generated GUID is unique; the same GUID will not be generated a second time.

In the example above, the code is the string of alphanumeric characters ("5631EDC86148489C9BFA904CAD80D4AA") appearing after the "=" in the URL. The system code could be utilized without the URL, or other forms of a unique identifier could be used as an alternative. For example, a 10 digit numeric string similar to a traditional telephone number could be assigned to a user and this system code could be used as the identifier which references the user's actual SMS system number and call management rules associated with it.

Continuing with FIG. 37, the system code will then be distributed to a communication initiator 1235. System code distribution can be accomplished in a variety of ways, including but not limited to: email, voice, written, chat, instant messaging, and public or private web sites. A System code may also be distributed to a device or software application initiator via any data transfer mechanism or application programming interface (API).

A communication initiator 1240 would use the system code or system code embedded into a URL to begin a communication session. To do so, the communication initiator 1240 would provide the system of the present invention with the system code. The system of the present invention would retrieve 1245 the communication addresses of the participants corresponding to the system code.

The system of the present invention will then establish a communication session 1250 according to the specific interface with the communication system which has been previously defined.

The exemplary embodiment of the present invention provides a generalized interface structure. In order to add support for a new type of communications interface, a set of specific integration code can be added to initiate message for the new communications interface—the rest of the software would be isolated from the details of the new communications interface. As new "links" and "rules" are defined in the system, a selection would be made of each communication type (phone, SMS, etc) for each system code to be generated; the system software would relate the correct code to initiate the appropriate communication session for each communication type.

Using the invention in this way would enable communication initiation without the initiator having specific communication addresses of the other participants and allows for a single system code or URL to initiate a complete communication session between two or more parties. For example, a user could click on a link embedded into a web page to connect participants to a video phone call providing convenience to the user and address privacy to the participants.

Communication management capabilities of the invention as described above could be integrated within the context of this process to manage the initiated communication session including, but not limited to scheduling automated initiation of communications and enforcing rules allowing or denying participant communication.

Figure 38:
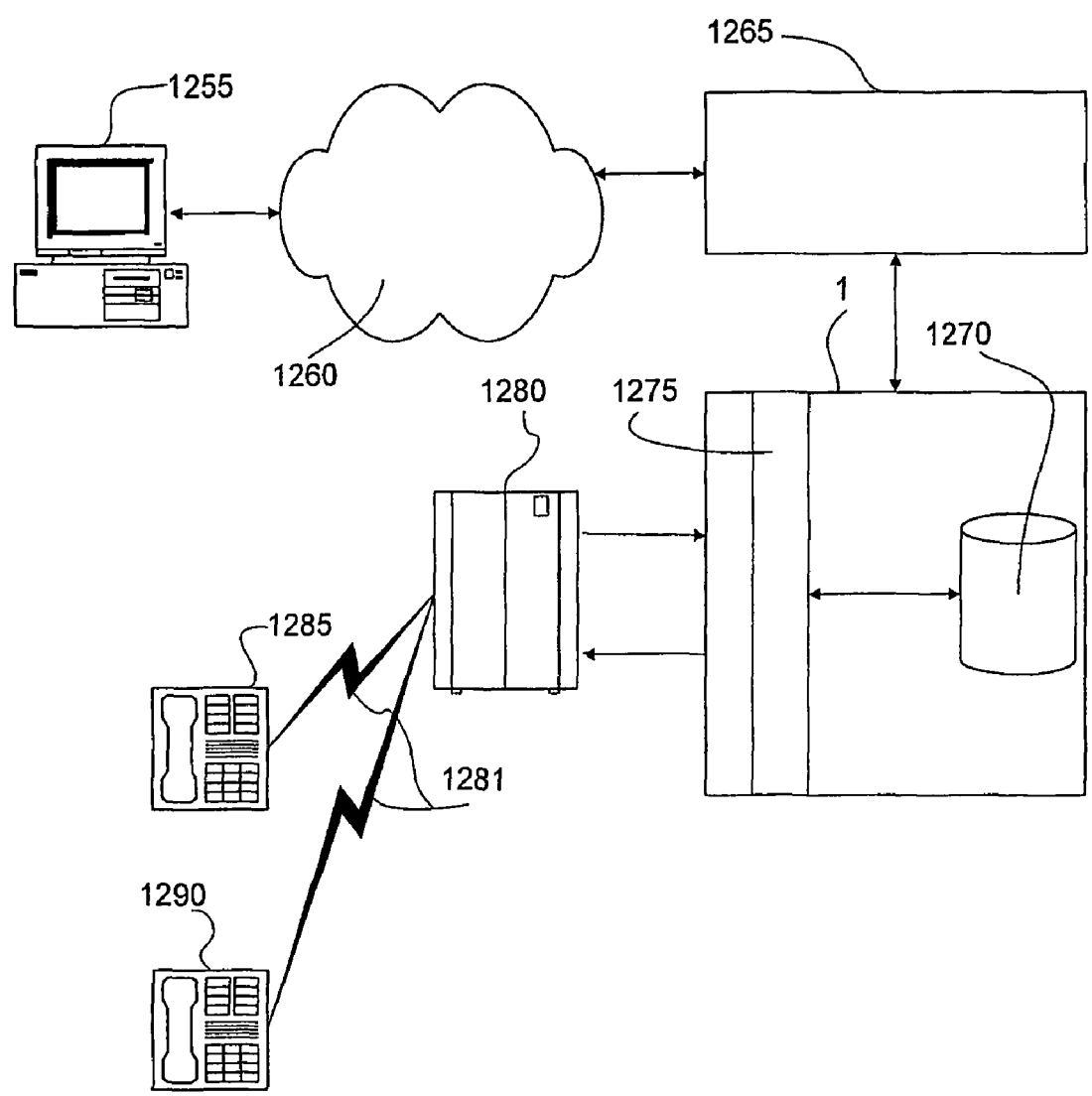
FIG. 38 is a graphic representation of a computer for managing communication connected to a traditional telephone network and integrated with a software application which supports keyword functionality in an exemplary embodiment of the invention.

FIG. 38 is a graphic representation of a computer 1 for managing communication that is connected to both a traditional telephone network and a separate software application which supports keyword capabilities in an exemplary embodiment of the invention. In the illustrated exemplary embodiment, the computer 1 is a conventional computer including ROM (Read-Only Memory), RAM (Random Access Memory), a processor, etc. The computer 1 is shown connected to a public telephone system switch 1280, which is in turn connected to the worldwide public telephone network 1281. The computer 1 is also integrated with a separate keyword-supporting software application 1265. Integration of the computer 1 with the separate keyword-supporting software application 1265 may be comprehensive or simple, depending on the needs of the specific implementation.

Simple integration would require the keyword-supporting application 1265 to store and utilize system codes or system code embedded URLs to initiate telephone calls using the invention. More complex integrations would automate registration of phone numbers, generation of system codes or URLs, and insertion of system codes into the application's database.

As will be further disclosed below, computer 1 contains the hardware 1, application software 1275, and database 1270 with which to operate features of the invention. The separate keyword-supporting software application 1265 and the invention could be hosted on the same computer provided the computer meets the hardware, software, and networking requirements of the invention and provided the separate keyword-supporting application has sufficient processing capacity.

A telephone system user who is initiating a call (the "caller", or "calling party") has a telephone, e.g., 1285, connected to the public telephone network 1281 (or alternatively, is using an analog or digital cellular phone); the caller has a conventional computer 1255 such as a personal computer, connected to the Internet 1260 (also referred to herein as the "public Internet") or to a private network with network connectivity enabling interaction with the application 1265.

Another telephone system user who will receive the call (the "call recipient", or "called party") has a telephone, e.g., 1290, connected to the public telephone network 1281 or is using an analog or digital cellular phone.

The caller would initiate the phone call using the caller's computer 1255. The caller's computer 1255 accesses the software application 1265 presented over the public Internet 1260 (or, alternatively, over a private network with network connectivity enabling interaction with the application). The software application 1265 supports the use of "keywords", meaning a single word, character sequence, or multiple words or character sequences which are related to specific content delivery or action. Herein, such compatible applications and search engines will be referred to collectively as "applications", "application", or "keyword-supporting application".

Examples of publicly available keyword-supporting applications include, for example: AOL browser, Internet Explorer (with RealNames service), MSN, and Yahoo! search engine. Many other Internet-enabled public applications, various private applications and applications on private networks support the concept of keywords. A keyword-supporting application commonly provides an input "box" for receiving user input of one or more words; such applications commonly provide an onscreen "button" or icon labeled with a word such as "GO" or "SEARCH". When a user inputs a word into an invention-enabled application input "box" and clicks on the application keyword button, the application would evaluate the characters entered and attempts to relate the input words to keywords recorded in the application.

Figure 39:
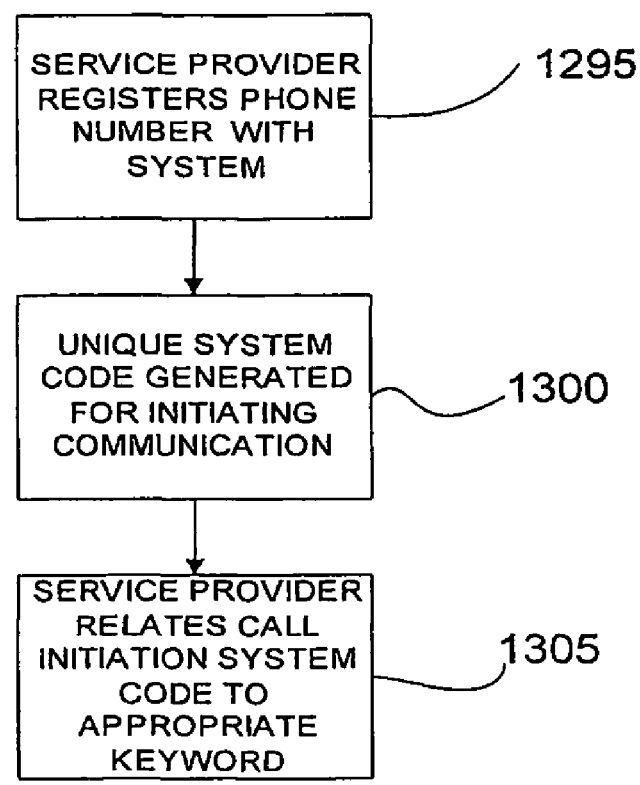
FIG. 39 is a flow chart of the process to relate phone numbers and call initiation codes to keywords in an exemplary embodiment of the present invention.

As depicted in FIG. 39 and as discussed in more detail below, service providers can register telephone numbers 1295, such as, e.g, for paying advertisers. In the exemplary embodiment, the present invention would generate 1300 a unique communication initiation system code for each registered telephone number and would provide the service provider with a keyword relationship selection means. Using the keyword relationship selection means, the service provider would relate the call initiation system code to an appropriate keyword 1305. The present invention would record on a keyword database in a call initiation system code data field, the call initiation system code associated with the corresponding keyword as selected by the service provider. The present invention would also record in a call initiation database, a record relating the call initiation system code to the registered telephone number for the appropriate paying advertiser. It will be understood by someone with ordinary skill in the art that the description of the telephone number owner as a paying advertiser is illustrative, and is not a limitation of the invention. Rather, telephone keyword registrants could be any entity or individual with a telephone number.

Returning to FIG. 38, in the exemplary embodiment of the present invention, the caller would input a keyword into a keyword-supporting application input box and click on the application keyword button, signaling the keyword-supporting application, e.g., 1265, to evaluate the characters entered and relate the characters to keywords. In the exemplary embodiment of the present invention, when the invention-enabled keyword-supporting application, e.g., 1265, identifies that the word(s) entered is a keyword, the application accesses the keyword database on which the keyword has been recorded. The keyword database of the exemplary embodiment of the present invention would contain a call initiation system code. If a call initiation system code is recorded for the particular keyword, then, as is further discussed in relation to FIG. 42 below, the application would initiate a phone call between the caller and the call recipient associated with the keyword call initiation system code. To initiate a call to the call recipient, the application would use the call initiation system code to obtain the telephone number for the call recipient from the database on which the telephone number has been registered.

Upon initiating a phone call, the caller's connection request would be validated by the application logic 1275 of the present invention. The application logic 1275 would evaluate the call request for validity of syntax and structure, and would search and evaluate the rules database 1270 for records associated with the call recipient's call management settings as described above in relation to FIGS. 1 and 5. According to the results of the syntax and structure verification and according to the rules for the particular call recipient, the application logic 1275 would either allow or deny the call. If call management features are not required for implementation with the separate application, then call management rules for records associated with the separate application will be defined to allow calls every day, 24 hours a day, essentially bypassing call management features without preventing their implementation at a further date.

For calls authorized by the application logic 1275, the application logic 1275 will connect the call utilizing the public telephone switch 1280. The computer 1 passes the caller and call recipient phone numbers as stored in the database 1270 to the telephone switch 1280 using an application programming interface ("API") appropriate to the service provider or telephone switch manufacturer. The exemplary embodiment of the invention utilizes an API provided by a telephone service provider as an interface to its switching infrastructure 1280. The API captures both caller and recipient telephone numbers along with other variables useful for call setup and tracking. The telephone service provider then connects both parties' telephones 1285, 1290 respectively, to a phone call by dialing both numbers and connecting the call upon the parties' answer.

FIG. 39 is a flowchart of a process in the exemplary embodiment of the invention for applications supporting keywords to relate phone call initiation codes or URLs generated by the invention to keywords. Such application must support the use of "keywords", meaning a single word, character sequence, or multiple words or character sequences which are related to specific content delivery or action. Examples of publicly available applications supporting keywords include, e.g.: AOL browser, Internet Explorer (with RealNames service), MSN, and Yahoo! search engine. Many other Internet enabled public applications and private applications or applications on private networks support keywords. These applications, according to the particular application-specific method, store keywords and related content or actions.

As depicted in FIG. 39, utilizing the invention, a service provider of a keyword-supporting application can register 1295 phone numbers with the system of the invention through a user interface or automated data interface with the application. The system will generate a system code 1300 or system code embedded URL with which to initiate calls; the system will return the generated code or URL to the user or application interface. System codes may be utilized as stand alone codes or embedded into an Internet URL as below:

http://jules.dafoink.com/talkRules/callLink.asp?trID=5631EDC86148489C9BFA904CAD80D4AA As previously mentioned, and as depicted in the example above, each generated code is a GUID (globally unique identifier), the generation of which is not an object of the invention. In the example above, the code is the string of alphanumeric characters ("5631EDC86148489C9BFA904CAD80D4A") appearing after the "=" in the URL. The system code could be utilized without the URL. Alternatively, other forms of a unique identifier could be used. For example, a 10 digit numeric string similar to a traditional telephone number could be assigned to a user and this system code could be used as the identifier which references the user's actual SMS system number and call management rules associated with it.

The separate keyword-supporting application will then relate 1305 the system code or URL to an appropriate keyword either automatically or by a user entering or selecting the relationship; the relationship between the keyword and system code/URL will be recorded into a user interface or database.

Figure 42:
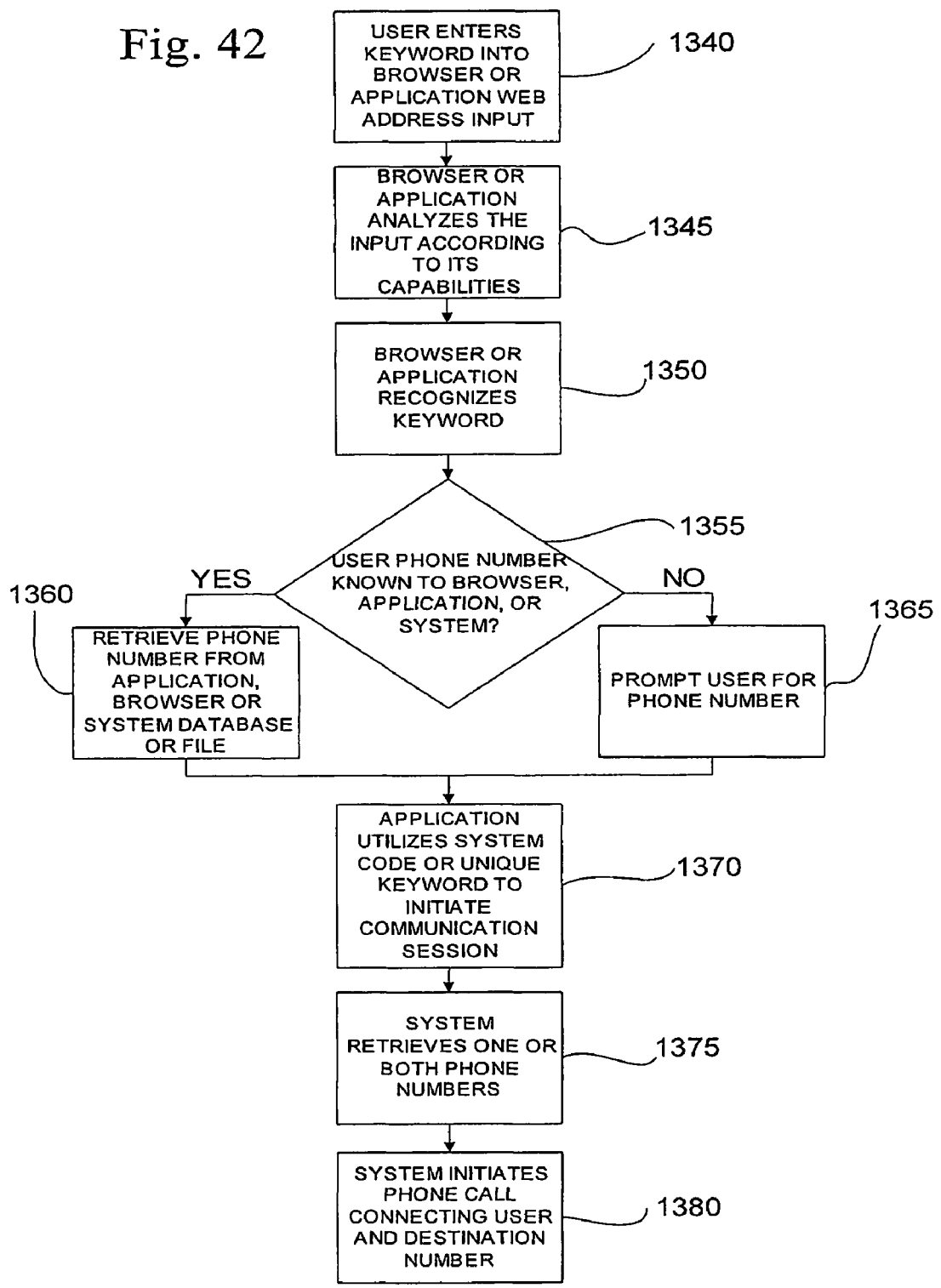
FIG. 42 is a flow chart of the process to initiate telephone calls when users enter specified keywords into web browser or other application's web address input box in an exemplary embodiment of the present invention.

Once the relationship between the system code and keyword is established 1305, the invention can be utilized by the separate keyword-supporting application to initiate telephone calls when a user enters the specific keyword as is discussed in relation to FIGS. 38 and 42.

Using the invention in connection with keyword-supporting applications provides a way for users to conveniently connect phone calls with businesses or individuals by simply entering a known keyword into the URL-enabled input box of the application. For example, typing "callmicrosoft" or "call microsoft" could initiate a telephone call between the user and the company which had its phone number registered with the system of the invention and related to the separate application's keywords contained in the quotes.

FIG. 42 is a flowchart of the process in the exemplary embodiment of the invention to provide web browsers and other keyword-supporting applications supporting web URL navigation with a mechanism to initiate telephone calls when specific keywords are entered by users in the application web address input box.

A user of the web browser or keyword-supporting application would enter a keyword into the web address input area of the keyword-supporting application 1340; this web address input are is often labeled "address". The browser or application would then analyze the words or characters 1345 according to browser's or application's analysis capabilities in order to determine if keywords or standard web addresses have been entered.

Keywords are generally accepted to be of alphanumeric characters such as "callkmart" as opposed to standard web page addresses which take the form of a Uniform Resource Locator ("URL") "http://www.domain.com/index.htm" or the shorthand version supported by most contemporary applications "www.domain.com". Keywords could also be implemented as multiple words or character strings separated by a space or other delimiter. For example "call kmart" combines two words with a space but could be utilized as a single keyword. Keywords could also be used in combination with a word or words, or character sequences following the keyword to create a target of action for the keyword. For example using "instantcall kmart", the word "instantcall" could be the keyword an application was configured to recognize, and "kmart" would be the target of the keyword, evaluated 1345 to determine if it serves as a secondary keyword registered with the application; otherwise the string "kmart" would be treated as regular non-keyword user input.

Upon identifying a designated keyword sequence 1350 as one that has been registered to be related within the application to a telephone number as was described above in connection with the description of FIG. 39, the application would then determine 1355 whether the user's telephone number (e.g., (555) 444-1111) is known to the browser or application

13605, or, in the alternative, would prompt the user for the phone number 1365. User prompting 1365 can also be serviced by the system of the invention in the exemplary embodiment by simply using the system code URL without providing the user's phone number. Otherwise, if the phone number (e.g., (555) 444-1111) is known to the browser or application, then it can be passed to the system of the invention in a URL encoded as:

http://jules.dafoink.com/talkRules/
callLink.asp?trID=5631EDC86148489C9BFA904CA
D80D4AA&fromNumber=5554441111

Using the system code or system code embedded URL related to the keyword, along with insertion of the user phone number if the implementation permits, the browser or application would initiate a phone call 1370.

The system of the invention would retrieve one or both telephone numbers 1375 based on the data related to the system code that has been registered to be related within the application as was described above in connection with the description of FIG. 39. If the system does not have the phone number of the caller as transmitted by the browser or application 1360 and 1370, the system of the invention can optionally prompt the user for a phone number using its web interface or the system can return an error status to the browser, application, or user.

Upon retrieval of the required telephone numbers 1375, the system would connect 1380 the telephone call between the user and the specified phone number associated with the keyword.

Figure 43:
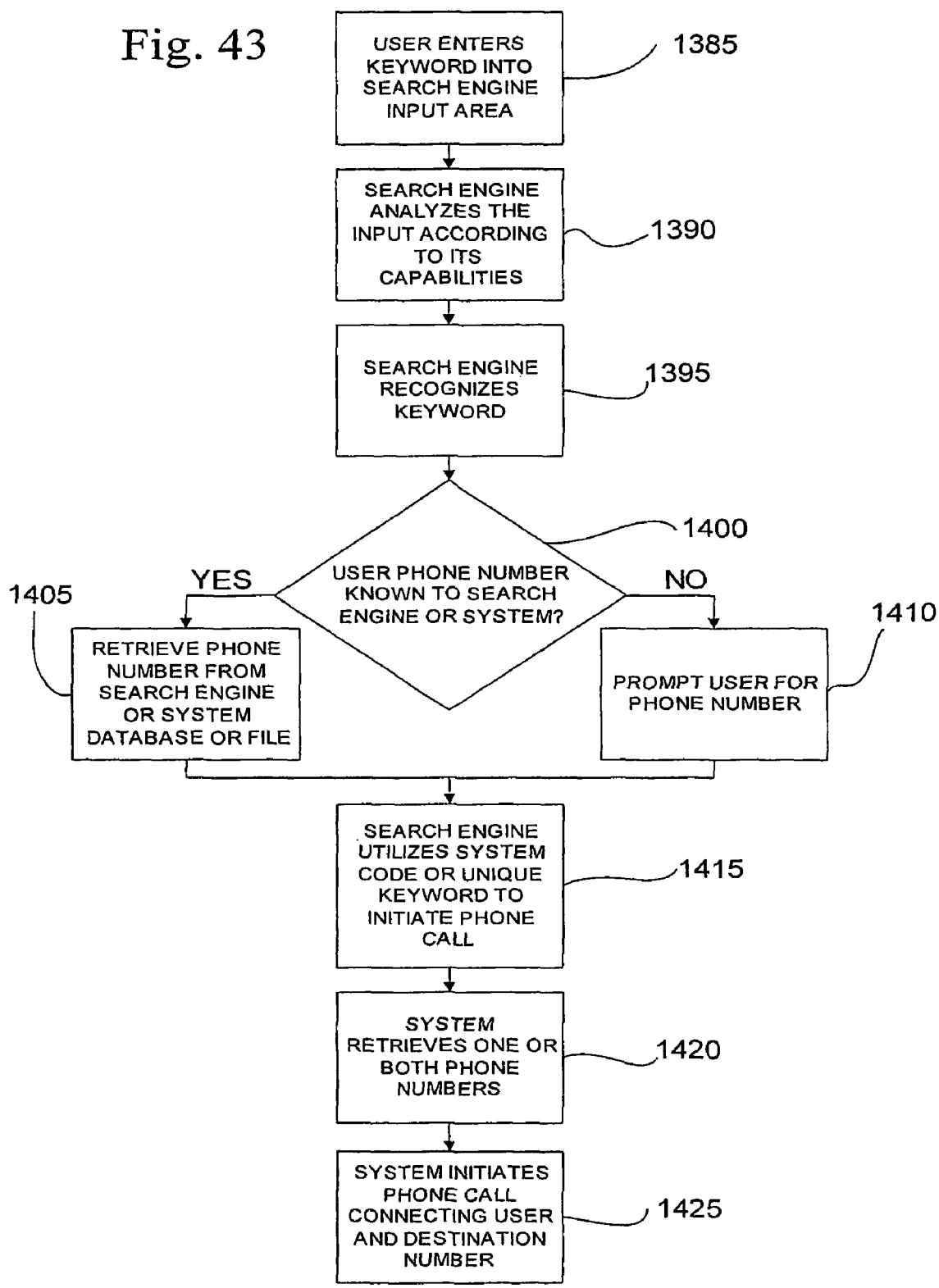
FIG. 43 is a flow chart of the process to initiate telephone calls when users enter specified keywords into search engine input box in an exemplary embodiment of the present invention.

The invention can be implemented with search engines in a manner similar to that described above with respect to keyword-supporting applications. FIG. 43 is a flowchart of the process in the exemplary embodiment of the invention to provide keyword-supporting search engines a mechanism with which to initiate telephone calls when specific keywords are entered by users in the application web address input box. Examples of publicly available search engines supporting keywords include: Yahoo!, Altavista, Google, Go.com, and Lycos. Other Internet enabled public search engines and private search engines on the public Internet or private networks support the concept of keywords.

As depicted in FIG. 43, a user of the web browser or application would enter a keyword into the search input area of the search engine 1385, and would activate the search engine to find the keyword by clicking a button, or other onscreen symbol; search activation buttons are often labeled "Search" or "Go". The invention-enabled search engine would then analyze the words or characters 1390 according to the search engine's capabilities in order to determine if keywords are present in the user search input.

Upon identifying a designated keyword sequence 1395 as registered to be related within the application to a particular telephone number (as describe in connection with FIG. 39), the invention-enabled search engine could determine 1400 if the user's telephone number is known to the browser or application 1405, or, in the alternative, would prompt the user for the user's phone number 1410. User prompting 1410 can also be serviced by the system of the invention in the exemplary embodiment of the invention by simply using the system code URL without providing the user's phone number. Otherwise, if the phone number is known to the user's browser, the search engine or application, then it can be passed to the system of the invention in a URL encoded as:

http://jules.dafoink.com/talkRules/
callLink.asp?trID=5631EDC86148489C9BFA904CA
D80D4AA&fromNumber=5554441111

Using the system code or system code embedded URL related to the keyword, along with insertion of the user phone number if the implementation permits, the browser or application would initiate a phone call 1415.

The system of the invention would retrieve one or both telephone numbers 1420 based on the data related to the system code as discussed in FIG. 39. If the system does not have the phone number of the caller as transmitted by the browser or application 1405, the system of the invention can optionally prompt 1410 the user for a phone number using its web interface or the system can return an error status to the browser, application, or user.

Upon retrieval of the required telephone numbers 1420, the system would connect 1425 the telephone call between the user and the specified phone number associated with the keyword.

As will be understood by someone with ordinary skill in the art, the description of telephone call initiation is not a limitation of the types of communications that can be initiated through the keyword-supporting application integration with the present invention. Rather, the invention can be used to initiate communication using a variety of communication types between communication devices and software applications, included but not limited to: video conferencing, video phones, pagers, SMS, fax machines, voice mail systems, and telephones.

Figure 40:
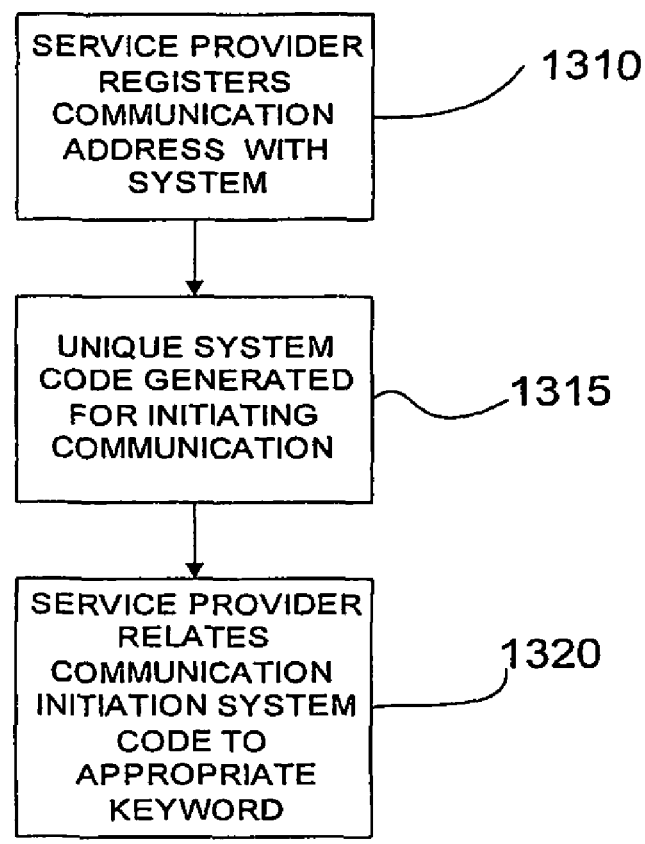
FIG. 40 is a flow chart of the process to relate communication addresses and communication initiation codes to keywords in an exemplary embodiment of the present invention.

FIG. 40 is a flowchart of the process in the exemplary embodiment of the invention for applications supporting keywords to relate communication initiation codes or URLs generated by the invention to keywords. As depicted, in FIG. 40, utilizing the invention, a provider of an invention-enabled keyword-supporting application can register 1310 communication addresses with the system of the invention through a user interface or automated data interface with the application.

As was previously described above, the present invention can interface with a wide variety of communication systems and technologies; as will be understood by someone with ordinary skill in the art, the present invention is not limited to communication methods described herein or now known, but would be equally applicable to communication methods not now known or not described herein provided the communication method offers interface capabilities.

The present invention supports varying sizes and full alphanumeric character support in its addressing. The present invention supports communication address registration via user computer interface, file import of addresses, or via application programming interface (API).

System codes may be utilized as stand alone codes or embedded into an Internet URL as below:

http://jules.dafoink.com/talkRules/
callLink.asp?trID=5631EDC86148489C9BFA904CA
D80D4AA In the example above, each code would be a GUID. The system code could be utilized without the URL, or other forms of a unique identifier could be used as an alternative.

Continuing with FIG. 40, the separate invention-enabled keyword-supporting application would then relate 1320 the system code or URL to an appropriate keyword. To do this, the system would, for example, provide a selection mechanism or would, alternatively, provide for user entry of the relationship into a user interface; the system would then record the relationship in a database.

Once the relationship between the system code and keyword is established 1320, the invention can be utilized by the separate keyword-supporting application to initiate communications when a user enters the specific keyword as further described below in connection with the description of FIG. 60.

This feature of the invention provides a way for users to conveniently initiate communication using a variety of communication types between communication devices and software applications, included but not limited to: video conferencing, video phones, pagers, SMS, fax machines, voice mail systems, and telephones. To do so, users would simply enter a known keyword into the URL enabled input box of the keyword-supporting application to initiate the communication. For example, typing "vidcallmicrosoft" or "vidcall microsoft" could initiate a video conference between the user and the company which had its video conferencing address registered with the system of the invention and related to the separate application's keywords contained within the quotes.

Figure 60:
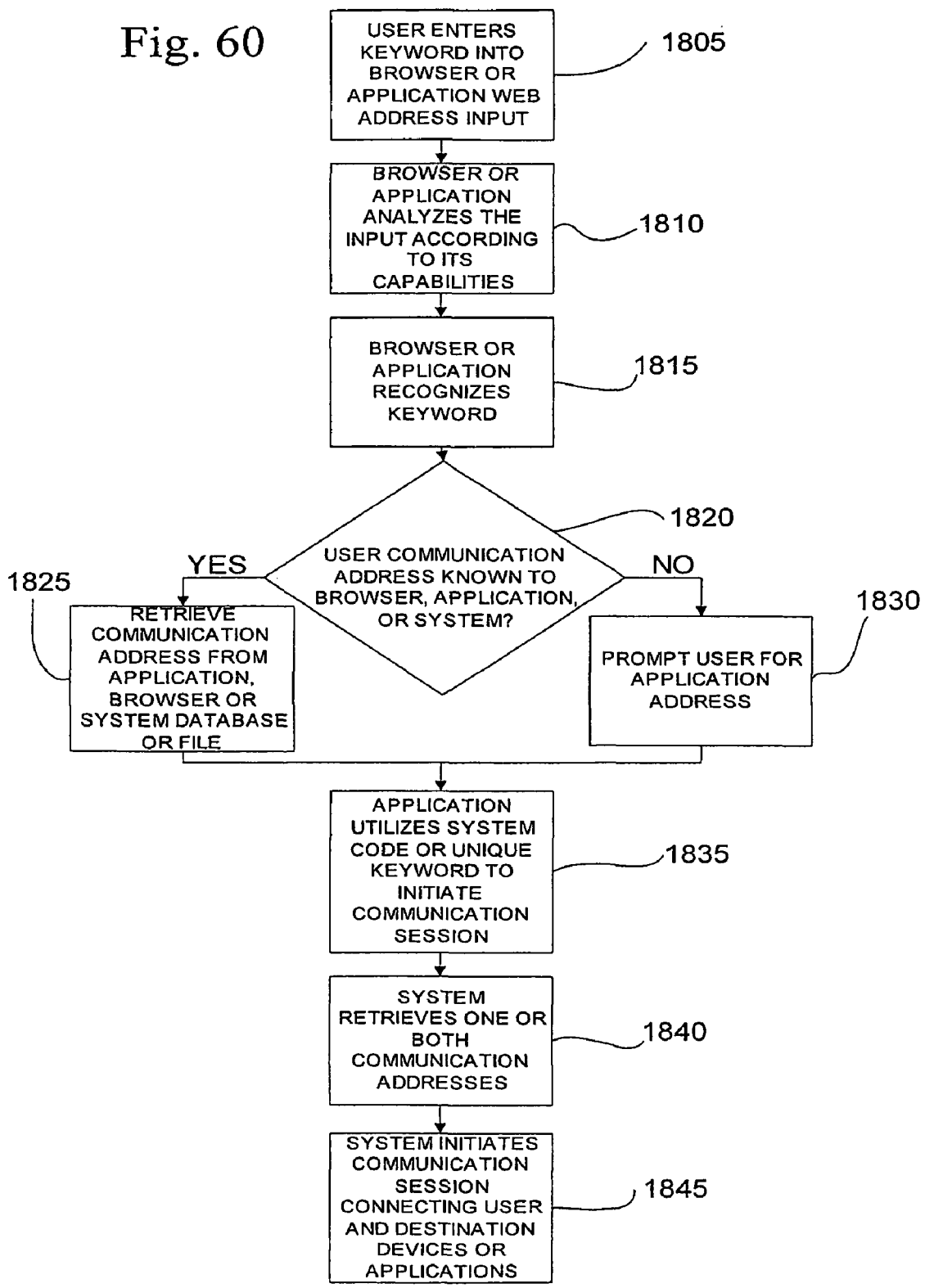
FIG. 60 is a flow chart of the process in the exemplary embodiment of the invention to provide web browsers, search engines, and other keyword-supporting applications a mechanism with which to initiate various types of communication sessions when specific keywords are entered by users in the application input box.

FIG. 60 is a flowchart of the process in the exemplary embodiment of the invention to provide web browsers, search engines, and other keyword-supporting applications a mechanism with which to initiate various types of communication sessions when specific keywords are entered by users in the application input box. As was previously described above, the present invention can interface with a wide variety of communication systems and technologies; as will be understood by someone with ordinary skill in the art, the present invention is not limited to communication methods described herein or now known, but would be equally applicable to communication methods not now known or not described herein provided the communication method offers interface capabilities.

As depicted in FIG. 60, a user of an invention-enabled keyword-supporting application would enter a keyword into the input area of the application 1805. The application would analyze the user-input words or characters 1810 according to the application's analysis capabilities in order to determine if keywords or standard user input were entered.

Continuing with FIG. 60, upon identifying a designated keyword sequence 1815 as related within the application in FIG. 40, the invention-enabled application would then determine 1820 if the user's communication address is known to the application 1825, or in the alternative, simply prompt the user for the user's communication address 1830. User prompting 1830 can also be serviced by the system of the invention in the existing embodiment by simply using the system code URL without providing the user's communication address. Otherwise, if the communication address is known to the application then it can be passed to the system of the invention in a URL encoded as:

http://jules.dafoink.com/talkRules/
callLink.asp?trID=5631EDC86148489C9BFA904CA
D80D4AA&fromNumber=5554441111

Using the system code or system code embedded URL related to the keyword, along with insertion of the user communication address if the implementation permits, the invention-enabled browser or application would initiate a communication session 1835.

The system of the invention would retrieve one or both communication addresses 1840 based on the data related to the system code as discussed in connection with the description above of FIG. 40. If the system does not have the communication address of the caller as transmitted by the application 1825, the system of the invention can optionally prompt 1830 the user for a communication address using its web interface or the system can return an error status to the browser, application, or user.

Upon retrieval of the required communication addresses 1840, the system would connect the communication session 1845 between the user and the specified communication address associated with the keyword.

As will be understood by someone with ordinary skill in the art, the descriptions of telephone call initiation and other types of communication initiation are not a limitation of the functionality of the invention that can be initiated through the keyword-supporting application integration with the present invention. Rather, for example, the invention can be implemented to initiate electronic document downloads by simply entering a known keyword into the URL enabled input box of the application to initiate the download.

Figure 41:
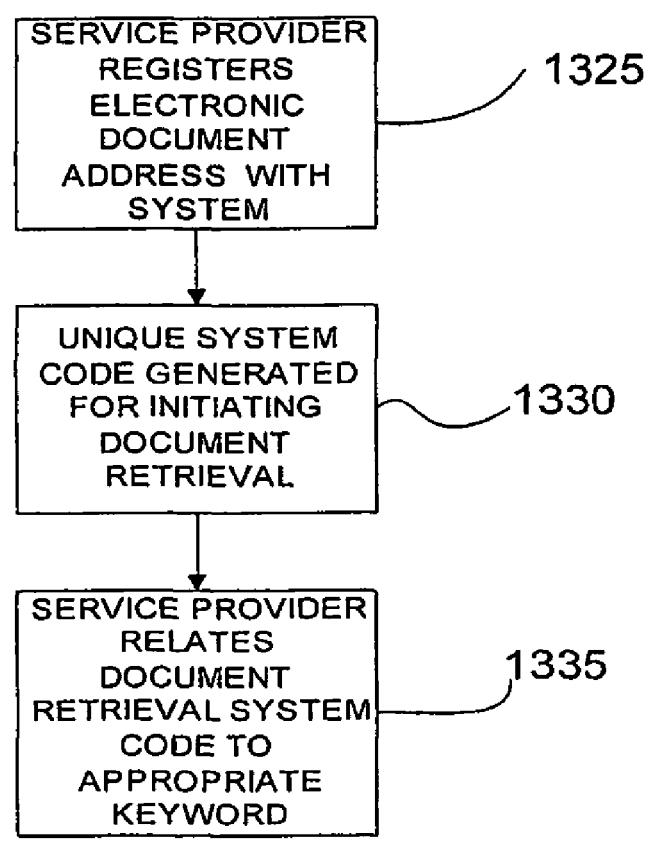
FIG. 41 is a flow chart of the process to relate electronic document addresses and electronic document retrieval codes to keywords in an exemplary embodiment of the present invention.

FIG. 41 is a flowchart of the process in the exemplary embodiment of the invention for applications that support keyword searches to relate electronic document download initiation codes, or URLs, generated by the invention to keywords. As depicted in FIG. 41, a provider of a keyword-supporting application would register 1325 electronic document addresses with the system of the invention through a user interface or automated data interface with the application. The system would generate a system code 1330 or system code embedded URL which provides a mechanism to initiate electronic document retrieval and return it to the user or application interface. System codes may be utilized as stand alone codes or embedded into an Internet URL as below:

http://jules.dafoink.com/talkRules/
callLink.asp?trID=5631EDC86148489C9BFA904CA
D80D4AA In the example above, each code is a GUID. The system code could be utilized without the URL, or other forms of a unique identifier could be used as an alternative.

The separate keyword-supporting application service provider will then relate 1335 the system code or URL to an appropriate keyword—the system would, for example, provide a selection mechanism or would, alternatively provide for user entry of the relationship into a user interface; the system would then record the relationship in a database.

Once the relationship between the system code and keyword is established 1335, the invention can be utilized by the invention-enabled separate keyword-supporting application to initiate electronic document download in response to a user entering the specific keyword to which the document is related, and as is described below in connection with FIG. 61. This feature of the invention provides a way for users to conveniently initiate electronic document downloads by simply enter a known keyword into the URL enabled input box of the application to initiate the download. For example, typing "windowsproductinfo" or "productinfo windows" could initiate a document download to the user's browser according to the electronic document address which was registered with the system of the invention and related to the separate application's keywords contained in the quotes.

Figure 61:
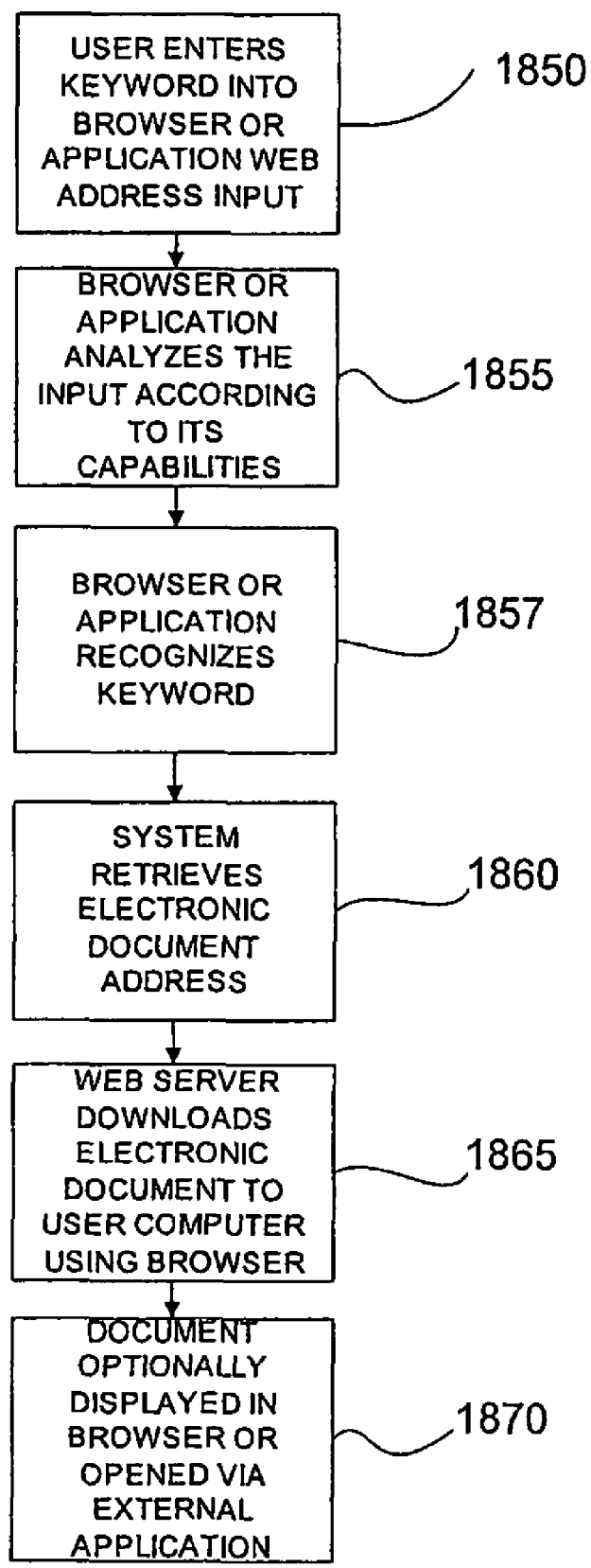
FIG. 61 is a flow chart of the process in the exemplary embodiment of the invention to provide web browsers, search engines, and other keyword-supporting applications with a mechanism to initiate electronic document downloads in response to specific user-input keywords entered by users in the application input box.

FIG. 61 is a flowchart of the process in the exemplary embodiment of the invention to provide web browsers, search engines, and other keyword-supporting applications with a mechanism to initiate electronic document downloads in response to specific user-input keywords entered by users in the application input box. As depicted in FIG. 61, a user of an invention-enabled keyword-supporting application would enter a keyword into an input area of the keyword-supporting application 1850. The application would analyze the words or characters 1855 according to the application's analysis capabilities in order to determine if keywords or standard user input were entered.

Upon identifying a designated keyword sequence 1857 as related within the application (as registered as was described above in connection with FIG. 41) to a system code or system code embedded URL, the system of the invention would retrieve the electronic document address 1860, and would initiate a download session 1865 using the web server of the invention and standard web mechanisms. One such mechanism in the exemplary embodiment of the invention would be to issue at meta tag refresh, commonly referred to as a "redirect" in the resulting page displayed when the system code embedded URL is utilized by the application. A sample of a meta tag redirect is:

<META HTTP-EQUIV="refresh" CONTENT="1;URL=http://www.docserver.com/docs/productinformation.doc">

Other methods exist to initiate a download, which are not an object of the invention but which could be employed along with the invention to deliver electronic documents. Depending on the capabilities and settings of the user's web browser or application, and at the user's elections, the electronic document may be optionally 1870 downloaded and saved to their computer, displayed within the browser or application, or browsed via launching a separate application to interact with the electronic document.

It will be understood by someone with ordinary skill in the art that the descriptions herein of individual features of the present invention are not limited to separate implementation. Rather, features of the present invention can be combined in numerous ways. For example, in one exemplary embodiment, the invention could be implemented such that in a single keyword-supporting application, a keyword could be related to any of a telephone number, a communications address, and/or an electronic document address, and could initiate communication or online interaction based on the keyword relationship(s). In such an embodiment, a single keyword could be related to a plurality of communication and online interaction addresses; in response to a user entering a keyword, the system would present for the user's selection the communication and/or interactions related to the keyword.

In addition to relating keywords with telephone numbers, communication addresses, and the like, the invention further relates Internet Domain Name System (DNS) to telephone numbers, communication addresses and the like, and provides activation of communications and interaction based on such relationships. DNS is the standard mechanism for translating host domain names into the Internet Protocol (IP) addresses required for computer applications to communicate over the Internet. As will be understood by those skilled in the art, a DNS can be configured, with appropriate entries, to provide navigation to web servers, email servers, ftp servers, or other applications on the Internet or on private networks with private DNS implementations.

Figure 44:
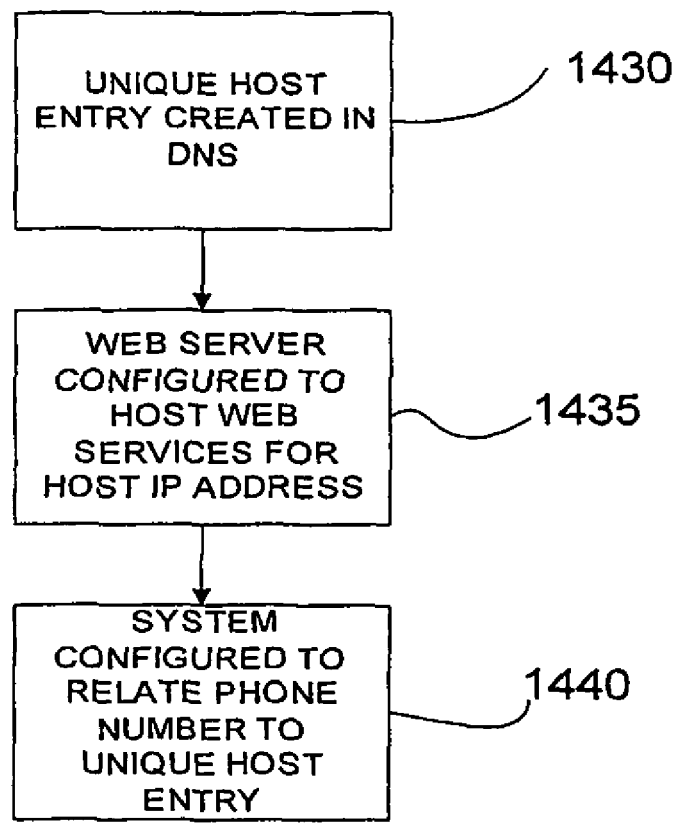
FIG. 44 is a flow chart of the process in an exemplary embodiment of the present invention to relate telephone numbers and call initiation codes to Domain Name Service (DNS) host entries.

FIG. 44 is a flowchart of the process in the exemplary embodiment of the invention to configure a host entry within the Internet Domain Name System (DNS) which the system of the invention will relate to a particular telephone number. As depicted in FIG. 44, a unique host entry can be created 1430 within a DNS domain record. For example, in the domain mycompany.com, a host called "call" could be configured as follows:

call A 66.130.20.182

This host record entry within an authoritative DNS server for the mycompany.com domain, will direct all DNS lookup requests for call.mycompany.com to the host located at IP address 66.130.20.182.

In the current embodiment of the invention, host entries can be configured in DNS 1430 to point to a web server of the invention's IP address or to a separate web server. Continuing with FIG. 44, the web server would be configured 1435 to host the appropriate IP address and the web server application configured to host web services on that IP address, each according to the administrative facilities of the computer operating system and web server software.

As depicted in FIG. 44, the system of the present invention would then be configured to relate 1440 the unique URL of the hosted web site with a system code embedded URL generated by the system of the invention which would be related to a specific telephone number.

As will be understood by those skilled in the art, there are a variety of ways to accomplish the navigation of a web browser session initiated with a specific host URL to result in the browser navigating to a page of a system code embedded URL. The invention can support any method of configuration which results in the system code embedded URL being executed by the web browser. One method is to define a meta refresh tag, typically called a "redirect" on a page hosted by the server of the invention or an independent web server configured to host a specific domain host, for example:

<META HTTP-EQUIV="refresh" CONTENT="1; URL=http://jules.dafoink.com/talkRules/callLink.asp?trID=5631EDC86148489C9BFA904CAD80D4AA">

Another method would be to define the system encoded URL as the base page for a web site within the web server of the invention's configuration facilities. Another method would be to use Javascript code in a page delivered by the web server of the invention or separate web server that would navigate the user's web browser to the system encoded URL.

The exemplary system of the invention also includes a custom created ISAPI (Microsoft's Internet Information Server Application Programming Interface) filter, which, in the exemplary embodiment, functions exclusively with Microsoft's Internet Information Server web server. This filter is installed into the web server of the invention to evaluate incoming web page delivery requests and to redirect certain page requests to desired system encoded URLs according to the system of the invention's instructions.

Figure 45:
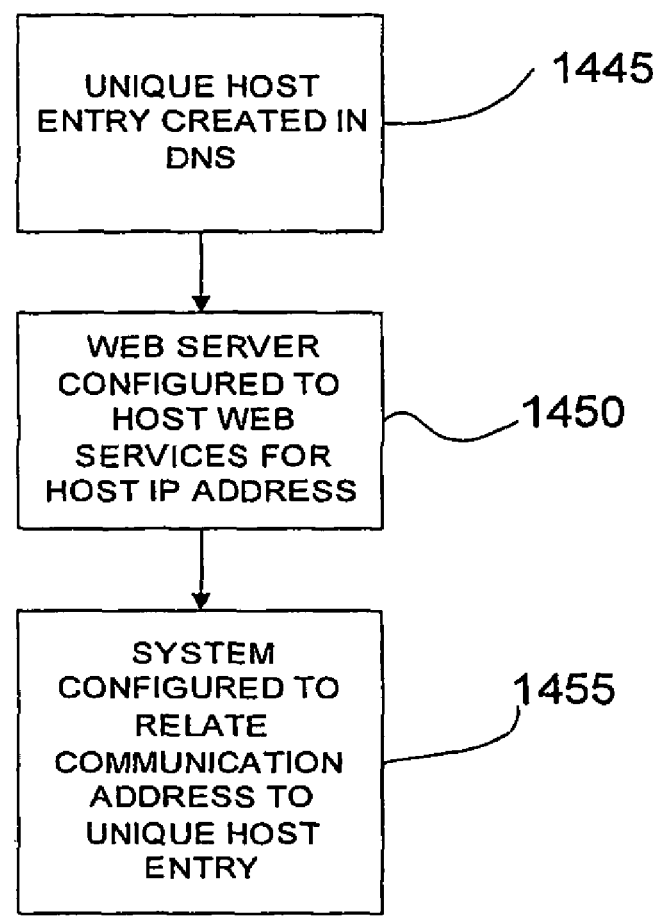
FIG. 45 is a flow chart of the process in an exemplary embodiment of the present invention to relate communication addresses and communication initiation codes to Domain Name Service (DNS) host entries.

FIG. 45 is a flowchart of the process in the exemplary embodiment of the invention to configure a host entry within the Internet Domain Name System (DNS) which the system of the invention will relate to a communication address. A unique host entry will be created 1445 within a DNS domain record. For example, in the domain mycompany.com, a host called "call" could be configured as such:

call A 66.130.20.182

This host record entry within an authoritative DNS server for the mycompany.com domain, will direct all DNS lookup requests for call.mycompany.com to the host located at IP address 66.130.20.182.

In the current embodiment of the invention, host entries can be configured in DNS 1445 to point to a web server of the invention's IP address or to a separate web server. The web server is configured 1450 to host the appropriate IP address and the web server application configured to host web services on that IP address, each according to the administrative facilities of the computer operating system and web server software.

The system of the invention would then be configured to relate 1455 the unique URL of the hosted web site with a system code embedded URL generated by the system of the invention which would be related to a specific communication address.

It will be understood by someone with ordinary skill in the art that there are a variety of ways available to accomplish the navigation of a web browser session initiated with a specific host URL to result in the browser navigating to a page of a system code embedded URL.

The invention can support any method of configuration which results in the system code embedded URL being executed by the web browser. One method would be to define a meta refresh tag, typically called a "redirect" on a page hosted by the server of the invention or an independent web server configured to host a specific domain host:
<META HTTP-EQUIV="refresh" CONTENT="1; URL=http://jules.dafoink.com/talkRules/callLink.asp?trID=5631EDC86148489C9BFA904CAD80D4AA">

Another method would be to define the system encoded URL as the base page for a web site within the web server of the invention's configuration facilities. Another method would be to use Javascript code in a page delivered by the web server of the invention or separate web server that would navigate the user's web browser to the system encoded URL.

The system of the invention would also include a custom created ISAPI filter, which would function exclusively with Microsoft's Internet Information Server web server. This filter would be installed into the web server of the invention to evaluate incoming web page delivery requests and to redirect certain page requests to desired system encoded URLs according to the system of the invention's instructions.

Figure 46:
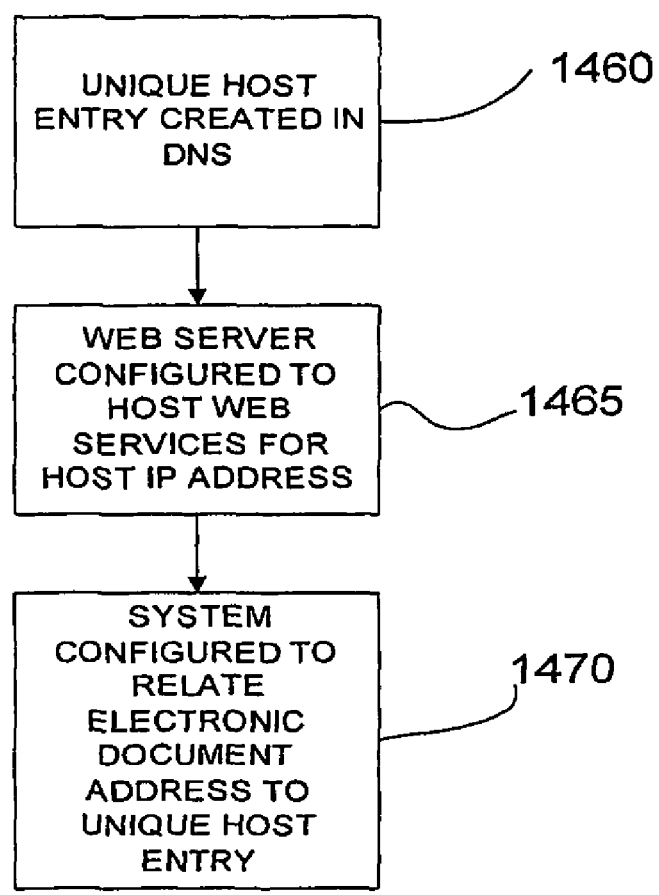
FIG. 46 is a flow chart of the process in an exemplary embodiment of the present invention to relate electronic document addresses and download initiation codes to Domain Name Service (DNS) host entries.

FIG. 46 is a flowchart of the process in the exemplary embodiment of the invention to configure a host entry within the Internet Domain Name System (DNS) which the system of the invention will relate to a particular electronic document address. A unique host entry will be created 1460 within a DNS domain record. For example, in the domain mycompany.com, a host called "call" could be configured as such:
call A 66.130.20.182

This host record entry within an authoritative DNS server for the mycompany.com domain, will direct all DNS lookup request for call.mycompany.com to the host located at IP address 66.130.20.182.

In the exemplary embodiment of the invention, host entries can be configured in DNS 1460 to point to a web server of the invention's IP address or to a separate web server. The web server would be configured 1465 to host the appropriate IP address and the web server application configured to host web services on that IP address, each according to the administrative facilities of the computer operating system and web server software.

The system of the invention would then be configured to relate 1470 the unique URL of the hosted web site with a system code embedded URL generated by the system of the invention which would be related to a specific telephone number.

It will be understood by someone with ordinary skill in the art that there are a variety of ways available to accomplish the navigation of a web browser session initiated with a specific host URL to result in the browser navigating to a page of a system code embedded URL. The invention can support any method of configuration which results in the system code embedded URL being executed by the web browser. One method would be to define a meta refresh tag, typically called a "redirect" on a page hosted by the server of the invention or an independent web server configured to host a specific domain host:
<META HTTP-EQUIV="refresh" CONTENT="1; URL=http://jules.dafoink.com/talkRules/callLink.asp?trID=5631EDC86148489C9BFA904CAD80D4AA">

Another method would be to define the system encoded URL as the base page for a web site within the web server of the invention's configuration facilities. Another method would be to use Javascript code in a page delivered by the web server of the invention or separate web server that would navigate the user's web browser to the system encoded URL.

The system of the invention would also include a custom created ISAPI filter, which would function exclusively with Microsoft's Internet Information Server web server. This filter would be installed into the web server of the invention to evaluate incoming web page delivery requests and to redirect certain page requests to desired system encoded URLs according to the system of the invention's instructions.

Figure 47:
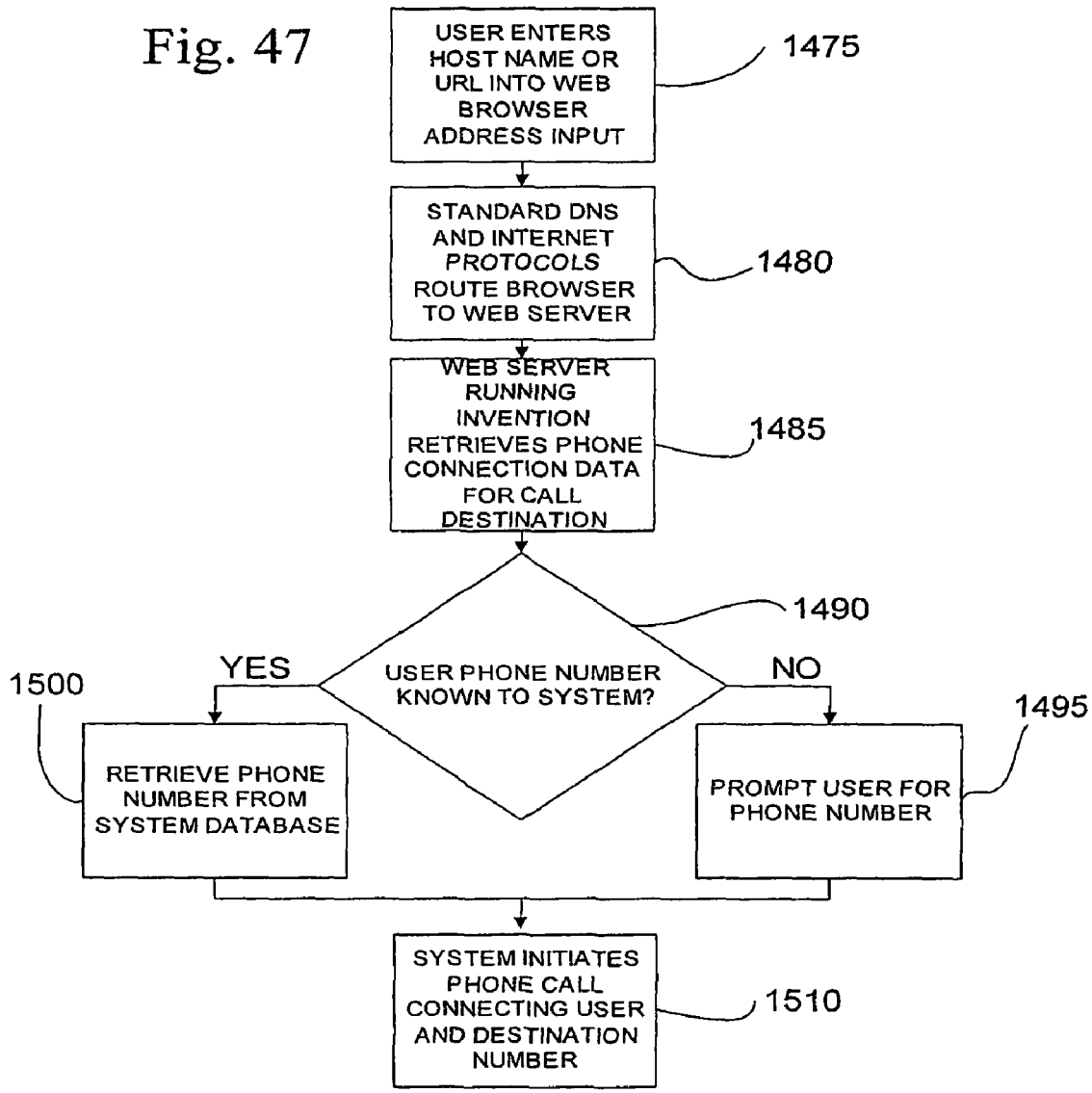
FIG. 47 is a flow chart of the process to initiate telephone calls when a user enters a host name or host URL into a web browser input box in an exemplary embodiment of the present invention.

FIG. 47 is a flowchart of the process in the exemplary embodiment of the invention to provide users of web browsers and other applications supporting web URL navigation a mechanism with which to initiate telephone calls when specific Internet host names are entered by users in the application web address input box. Examples of publicly available applications supporting web browsing include: AOL browser, Internet Explorer, Netscape, and Mosaic. Many other Internet web enabled public applications and private applications or applications on private networks support web browsing. These applications use their standard web protocols and capabilities, including DNS as discussed in FIG. 44, to navigate to web pages related to domain host names.

As depicted in FIG. 47, a user of an invention-enabled web browser or application enters a host name or URL into the web address input area of the web browser or application 1475 (the input area is often labeled "address"). The browser or application analyzes the words or characters 1480 according to standard web browser capabilities in order to connect with the appropriate web server host and request a page. Standard web site addresses take the form of a Uniform Resource Locator ("URL") "http://www.domain.com/" without a specific page requested after the final "/" or the shorthand version supported by most contemporary applications "www.domain.com".

Continuing with FIG. 47, the invention-enabled web server or separate web server receives the page request from the browser or application and routes the web browser to the system code URL according to relationships defined to the system as described in connection with FIG. 44.

As depicted in FIG. 47, the system of the invention will retrieve connection data related to the system code 1485. If the connection data does not include a phone number of the user 1490, the system of the invention prompts the user for a phone number 1495 via standard web browser interface. Otherwise the user phone number is retrieved from the system database 1500. The system then initiates a phone call connecting the user and the destination phone number 1510.

Figure 48:
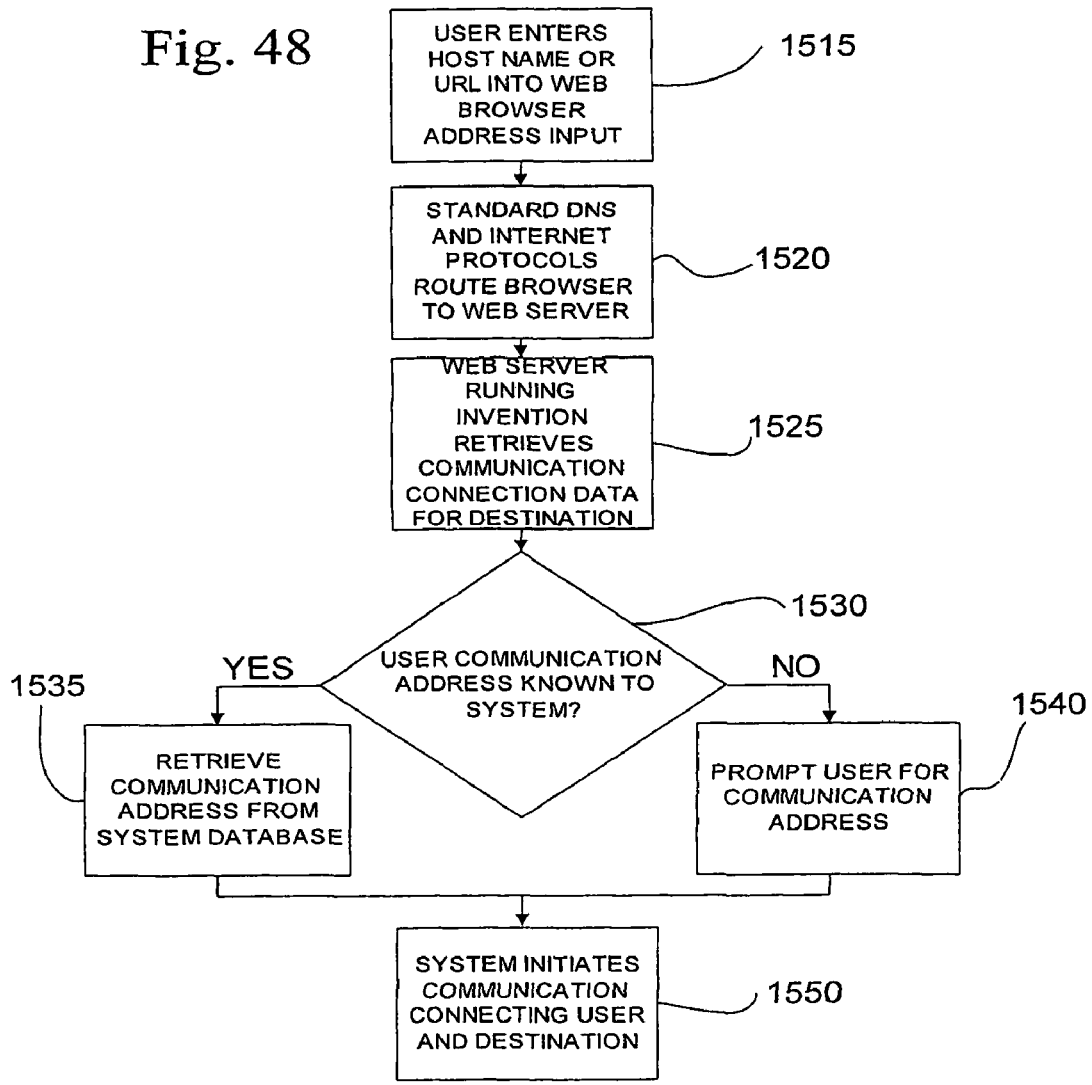
FIG. 48 is a flow chart of the process to initiate various communications when a user enters a host name or host URL into a web browser input box in an exemplary embodiment of the present invention.

FIG. 48 is a flowchart of the process in the exemplary embodiment of the invention to provide users of web browsers and other applications supporting web URL navigation a mechanism with which to initiate communication sessions when specific Internet host names are entered by users in the application web address input box. The invention can interface with a wide variety of systems as demonstrated herein and could interface with any conceivable communication method provided the communication method offers interface capabilities. Examples of publicly available applications supporting web browsing include: AOL browser, Internet Explorer, Netscape, and Mosaic. Many other Internet web enabled public applications and private applications or applications on private networks support the web browsing. These applications use their standard web protocols and capabilities, including DNS as discussed in connection with the description above of FIG. 45, to navigate to web pages related to domain host names.

As depicted in FIG. 48, a user of a web browser or application enabled to run the system of the present invention, or otherwise integrated with the system of the present invention, would enter a host name or URL into the web address input area of their application 1515 (the input area is commonly labeled "address"). The browser or application would analyze the words or characters 1520 according to standard web browser capabilities in order to connect with the appropriate web server host and request a page. Standard web site addresses take the form of a Uniform Resource Locator ("URL") "http://www.domain.com/" without a specific page requested after the final "/" or the shorthand version supported by most contemporary applications "www.domain.com".

As depicted in FIG. 48, the invention-enabled web server (including a web server integrated with a separate system of the invention) would receive the page request from the browser or application and would route and relate the request to the system code URL according to relationships established as described above in connection with FIG. 45.

The system of the invention would retrieve connection data related to the system code 1525. If the connection data does not include phone number of the user 1530, the system of the invention could prompt the user for a phone number 1540 via standard web browser interface. Otherwise the user phone number would be retrieved from the system database 1535. The system would then initiate a phone call connecting the user and the destination phone number 1550.

Figure 49:
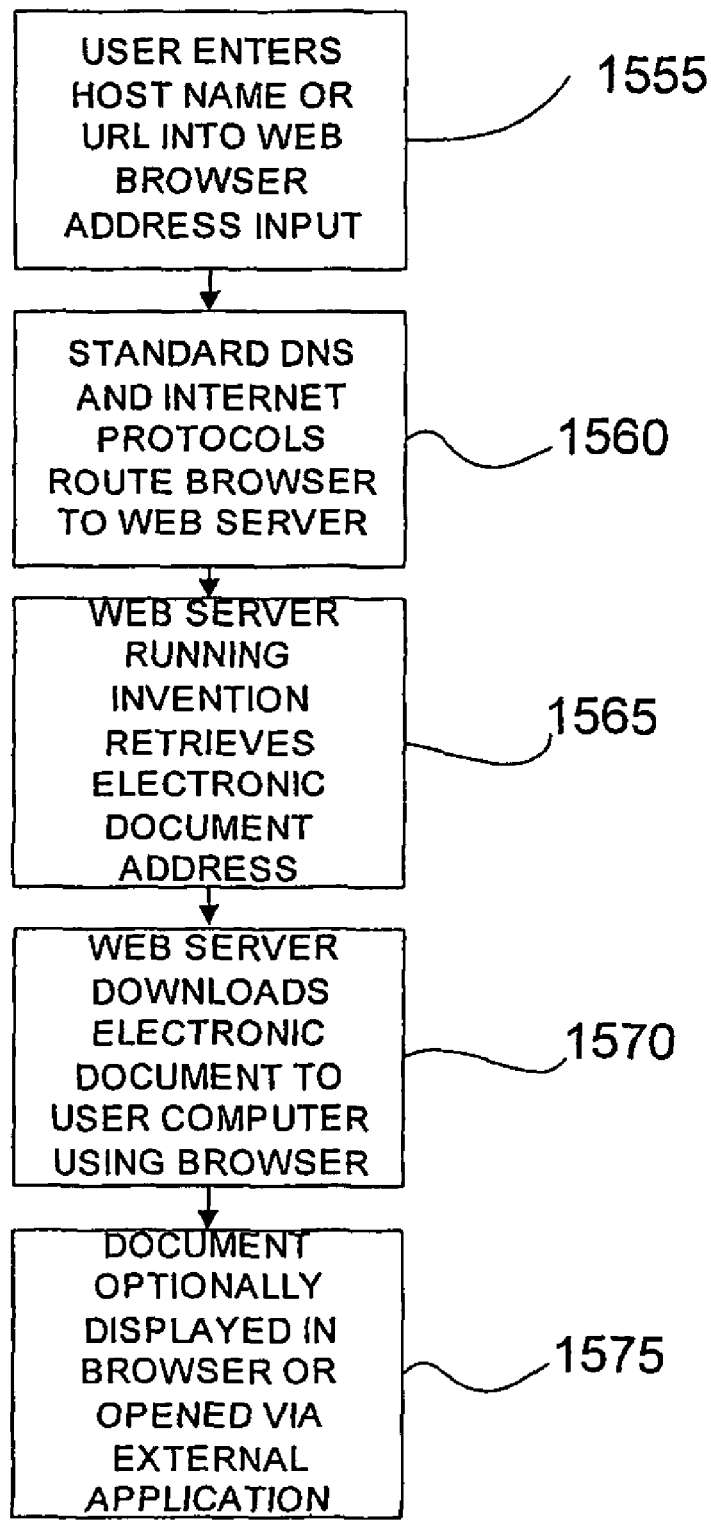
FIG. 49 is a flow chart of the process to initiate electronic document download when a user enters a host name or host URL into a web browser input box in an exemplary embodiment of the present invention.

FIG. 49 is a flowchart of the process in the exemplary embodiment of the invention to provide users of web browsers and other applications supporting web URL navigation and electronic file downloads a mechanism with which to initiate electronic file downloads in response to entry by a user of one of specific Internet host names in the application web address input box. Examples of publicly available applications supporting web browsing include: AOL browser, Internet Explorer, Netscape, and Mosaic. Many other Internet web enabled public applications and private applications or applications on private networks support the web browsing. These applications use their standard web protocols and capabilities, including DNS as discussed in connection with the above description of FIG. 46, to navigate to web pages related to domain host names.

As depicted in FIG. 49, a user of the invention-enabled web browser or application would enter a host name or URL into the web address input area of the invention—enabled web browser or application 1555 (the input area is commonly labeled "address"). The browser or application would analyze the entered words or characters 1560 according to standard web browser capabilities in order to connect with the appropriate web server host and request a page. Standard web site addresses take the form of a Uniform Resource Locator ("URL") "http://www.domain.com/" without a specific page requested after the final "/" or the shorthand version supported by most contemporary applications "www.domain.com".

The web server of the invention or separate web server would receive the page request from the browser or application and would route and relate the request to the system code URL according to FIG. 46.

The system of the invention would retrieve the electronic document address related to the system code 1565. The system of the invention would initiate a download session 1570 using the web server of the invention and standard web mechanisms. One such mechanism in the exemplary embodiment of the invention would be to issue a meta tag refresh, commonly referred to as a "redirect", in the resulting page displayed when the system code embedded URL is utilized by the application. A sample of the meta tag is as follows:
<META HTTP-EQUIV="refresh" CONTENT="1;URL=http://www.docserver.com/docs/productinformation.doc">

Other methods exist to initiate a download, which are not an object of the invention but which could be employed along with the invention to deliver electronic documents.

Depending on the capabilities and settings of the user's web browser or application, and at the user's elections, the electronic document may be optionally 1575 downloaded and saved to their computer, displayed within the browser or application, or launch a separate application to interact with the electronic document.

It will be understood by someone with ordinary skill in the art that the descriptions herein of individual features of the present invention are not limited to separate implementation. Rather, features of the present invention can be combined in numerous ways. For example, in one exemplary embodiment, the invention could be implemented such that in a single search engine application, a DNS could be related to any of a telephone number, a communications address, and/or an electronic document address, and could initiate communication or online interaction based on the DNS relationship(s). In such an embodiment, a single DNS could be related to a plurality of communication and online interaction addresses; in response to a user entering a DNS, the system would present for the user's selection the communication and/or interactions related to the DNS.

Figure 50:
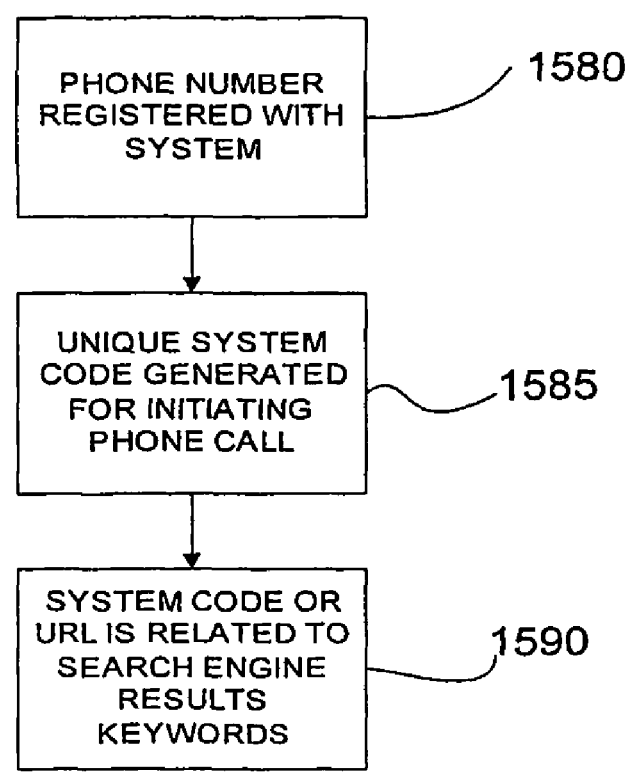
FIG. 50 is a flow chart of the process in an exemplary embodiment of the present invention to relate phone call initiation codes generated by the invention to search engine result set keywords.

FIG. 50 is a flowchart of the process in the exemplary embodiment of the invention for search engine applications to relate phone call initiation codes or URLs generated by the invention to keywords located in search results. Many search engines support the use of "keywords". In the context of search engines, a keyword can be related to specific content delivery or action. Examples of publicly available search engines supporting keywords include: Yahoo!, Altavista, Google, Go.com, and Lycos. Many other Internet enabled public applications and private applications or applications on private networks support the concept of keywords. These applications use their own capabilities, either proprietary or publicly known, to store keywords and related content or actions. In order to provide this capability, the search results and keyword processing systems of the search engines must be enhanced to provide a method of analyzing search results for keywords and inserting specific call initiation links as described below in connection with FIG. 53.

As depicted in FIG. 50, utilizing the invention, a provider of a search engine would register 1580 phone numbers with the system of the invention through a user interface or automated data interface with the application. The system would generate a system code 1585 or system code embedded URL which provides a mechanism to initiate calls and would return it to the user or application interface. System codes may be utilized as stand alone codes or embedded into an Internet URL as below:

http://jules.dafoink.com/talkRules/callLink.asp?trID=5631EDC86148489C9BFA904CAD80D4AA In the example above, each code is a GUID. The system code could be utilized without the URL, or other forms of a unique identifier could be used as an alternative. For example, a 10 digit numeric string similar to a traditional telephone number could be assigned to a user and this system code could be used as the identifier which references the user's actual SMS system number and call management rules associated with it.

The invention-enabled search engine would then relate 1590 the system code or URL to an appropriate keyword either automatically or by a user entering the relationship into a user interface; the relationship is stored in a database.

Once the relationship between the system code and keyword is established 1590, the invention would be utilized by the search engine to initiate telephone calls in response to a user entering the specific keyword as discussed in connection with the descriptions of FIGS. 38 and 53.

Figure 51:
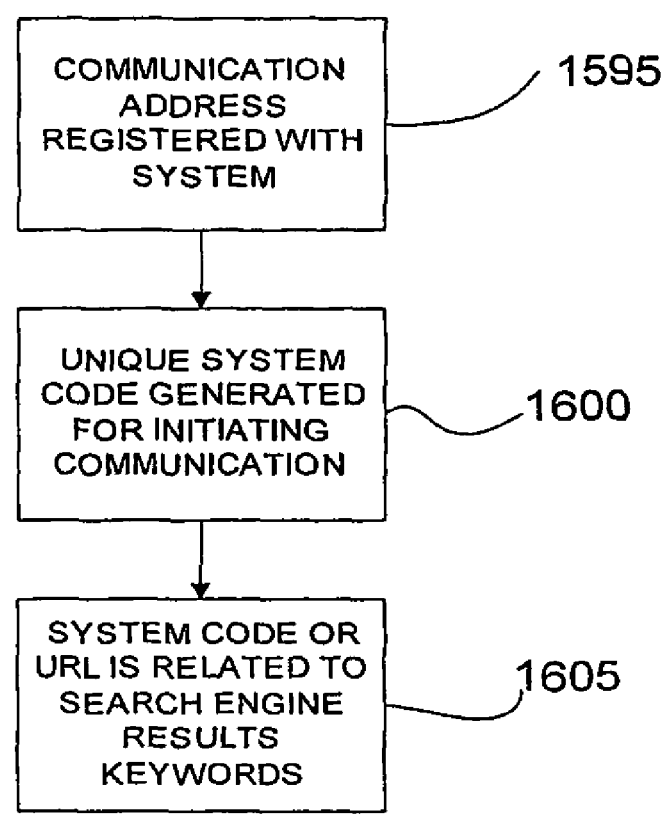
FIG. 51 is a flow chart of the process in an exemplary embodiment of the present invention to relate communication initiation codes generated by the invention to search engine result set keywords.

FIG. 51 is a flowchart of the process in the exemplary embodiment of the invention for search engine applications to relate communication initiation codes or URLs generated by the invention to keywords located in search results. In order to provide this capability, the search engine must support keywords, and the search results and keyword processing systems of the search engines must be enhanced to provide a method of analyzing search results for keywords and inserting specific communication initiation links as discussed in connection with the description of FIG. 54.

As depicted in FIG. 51, utilizing the invention, a provider of an invention-enabled search engine would register 1595 communication addresses with the system of the invention through a user interface or automated data interface with the application. The system would generate a system code 1600 or system code embedded URL which would provide a mechanism with which to initiate calls and would return the system code or system code embedded URL to the user or application interface. System codes may be utilized as stand alone codes or embedded into an Internet URL as below:

http://jules.dafoink.com/talkRules/callLink.asp?trID=5631EDC86148489C9BFA904CAD80D4AA In the example above, each code is a GUID. In the example above, the code is the string of alphanumeric characters appearing after the "=" in the URL. The system code could be utilized without the URL, or other forms of a unique identifier could be used as an alternative. For example, a 10 digit numeric string similar to a traditional telephone number could be assigned to a user and this system code could be used as the identifier which references the user's actual SMS system number and call management rules associated with it.

The invention-enabled search engine would then relate 1605 the system code or URL to an appropriate keyword either automatically or by a user entering the relationship into a user interface; the relationship would be stored in a database.

Once the relationship between the system code and keyword is established 1605, the invention would be utilized by the search engine to initiate various communications in response to a user entering the specific keyword as discussed in connection with the description of FIG. 54.

Figure 52:
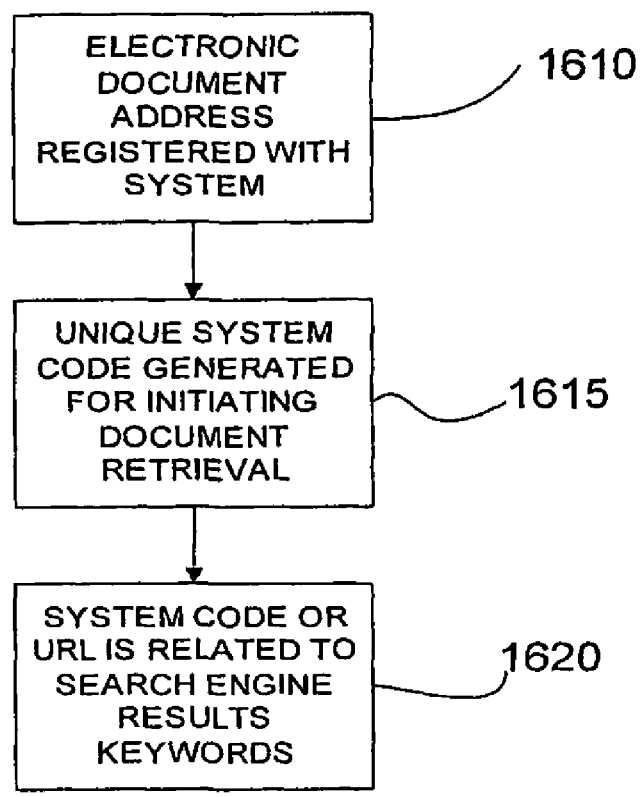
FIG. 52 is a flow chart of the process in an exemplary embodiment of the present invention to relate electronic document download initiation codes generated by the invention to search engine result set keywords.

FIG. 52 is a flowchart of the process in the exemplary embodiment of the invention for search engine applications to relate electronic document addresses or URLs generated by the invention to keywords located in search results. In order to provide this capability, search engine must support keywords, and the search results and keyword processing systems of the search engines must be enhanced to provide a method of analyzing search results for keywords and inserting specific electronic document download links as discussed in connection with the description of FIG. 55.

As depicted in FIG. 52, utilizing the invention, a provider of a search engine would register 1610 electronic document addresses with the system of the invention through a user interface or automated data interface with the application. The system would generate a system code 1615 or system code embedded URL which would provide a mechanism with which to initiate calls and would return the system code or system code embedded URL to the user or application interface, System codes may be utilized as stand alone codes or embedded into an Internet URL as below:

http://jules.dafoink.com/talkRules/callLink.asp?trID=5631EDC86148489C9BFA904CAD80D4AA In the example above, each code is a GUID. In the example above, the code is the string of alphanumeric characters appearing after the "=" in the URL. The system code could be utilized without the URL, or other forms of a unique identifier could be used as an alternative.

The search engine would then relate 1620 the system code or URL to an appropriate keyword either automatically or by a user entering the relationship into a user interface; the relationship would be recorded on a database.

Once the relationship between the system code and keyword is established 1620, the invention can be utilized by the search engine to initiate various communications in response to a user entering the specific keyword as discussed in connection with the description of FIG. 55.

Figure 53:
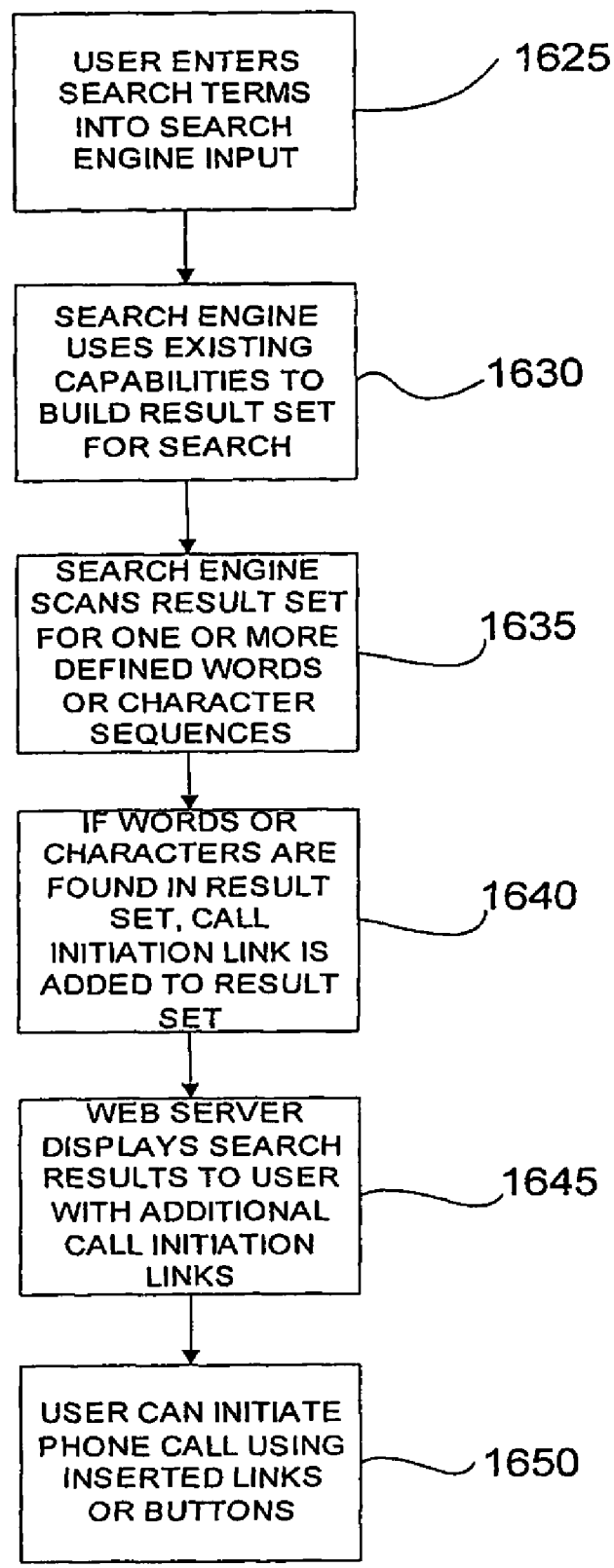
FIG. 53 is a flow chart of the process for search engines to evaluate search result sets for the presence of keywords and to insert phone call initiation links or buttons into the search results in an exemplary embodiment of the present invention.

FIG. 53 is a flowchart of the process in the exemplary embodiment of the invention to provide search engines a mechanism with which to evaluate search results for keywords and to insert phone call initiation URLs into the search results based on specific keyword relationships to telephone numbers as discussed in connection with the description of FIG. 50. To provide this capability, such search engines must support the use of "keywords". These search engines use their own capabilities, either proprietary or publicly known, to store keywords and related content or actions as is discussed in connection with the description of FIG. 50.

A user of a web browser or application would enter a search term into the search input area of an invention-enabled search engine interface 1625; a search input area commonly has an associated search activation online button labeled "Search" or "Go". The search engine would use its own proprietary or publicly known methods to generate a search results set 1630 containing web page links, content excerpts, and other information.

The search engine would then analyze the result set 1635 for keywords defined as result set keywords as related to system codes or system code embedded URLs discussed in connection with the description of FIG. 50. This analysis would be done before the results are provided to the web server for presentation to the user's web browser.

Upon finding one or more keyword matches in the result set, the search engine would insert a phone call initiation URL 1640 generated by the system and related to the keyword into the search results in the form of a hypertext link or button. An example of a call initiation text link as defined in HTML is below:

<a href="http://jules.dafoink.com/talkRules/callLink.asp?trID=5631EDC86148489C9BFA904CAD80D4AA"> http://jules.dafoink.com/talkRules/callLink.asp?trID=5631EDC86148489C9BFA904CAD80D4AA</a>

As will be understood by someone with ordinary skill in the art, standard HTML can be used to embed call initiation links, graphic links, or form buttons into individual web pages or create code in applications which will generate the same.

The search engine would then employ the web server to display the search results to the user, including any embedded call initiation links or buttons 1645. If the user desires, a phone call could be initiated by clicking on a link 1650 embedded by the invention into the displayed search results.

Figure 54:
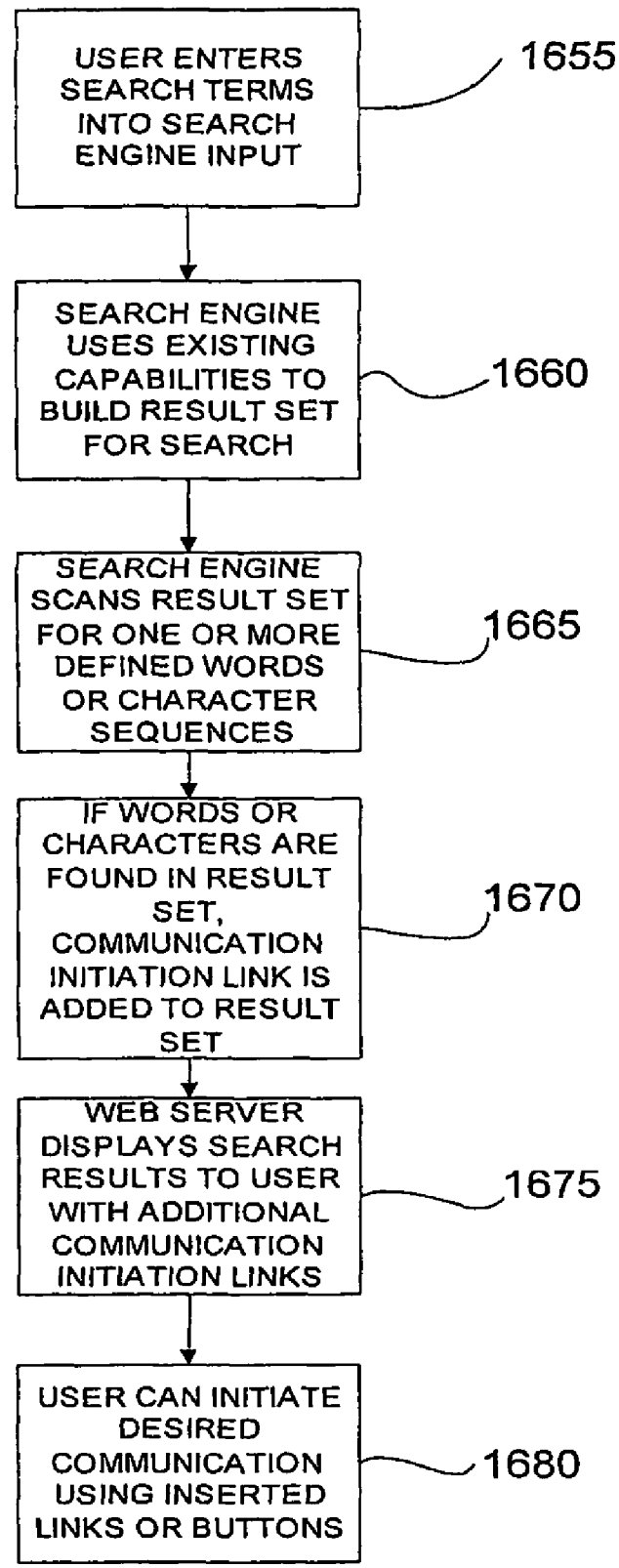
FIG. 54 is a flow chart of the process for search engines to evaluate search result sets for the presence of keywords and to insert communication initiation links or buttons into the search results in an exemplary embodiment of the present invention.

FIG. 54 is a flowchart of the process in the exemplary embodiment of the invention to provide search engines a mechanism with which to evaluate search results for keywords and to insert communication initiation URLs into the search results based on specific keyword relationships to communication addresses as discussed in FIG. 51. Such applications must support the use of "keywords. These search engines use their own capabilities, either proprietary or publicly known, to store keywords and related content or actions is discussed in connection with the description of FIG. 51.

A user of an invention-enabled web browser or application would enter a search term into the search input area of the invention-enabled search engine interface 1655; a search input area commonly has an associated search activation online button labeled "Search" or "Go". The search engine would use its own proprietary or publicly known methods to generate a search results set 1660 containing web page links, content excerpts, and other information.

The invention-enabled search engine would then analyze the result set 1665 for keywords defined as result set keywords as related to system codes or system code embedded URLs as discussed in connection with the description of FIG. 51. This analysis would be done before the results are given to the web server for presentation to the user's web browser.

Upon finding one or more keyword matches in the result set, the invention-enabled search engine would insert a communication initiation URL 1670 generated by the system and related to the keyword into the search results in the form of a hypertext link or button. An example of a communication initiation text link as defined in HTML is below:

<a href="http://jules.dafoink.com/talkRules/callLink.asp?trID=5631EDC86148489C9BFA904CAD80D4AA"> http://jules.dafoink.com/talkRules/callLink.asp?trID=5631EDC86148489C9BFA904CAD80D4AA<a>

It will be understood by someone with ordinary skill in the art that standard HTML can be used to embed communication initiation links, graphic links, or form buttons into individual web pages or create code in applications which will generate the same.

The invention-enabled search engine would then employ the web server to display the search results to the user, including any communication initiation links or buttons 1675. If the user desires to initiate a communication session, the user would click on a link 1680 within the search results.

Figure 55:
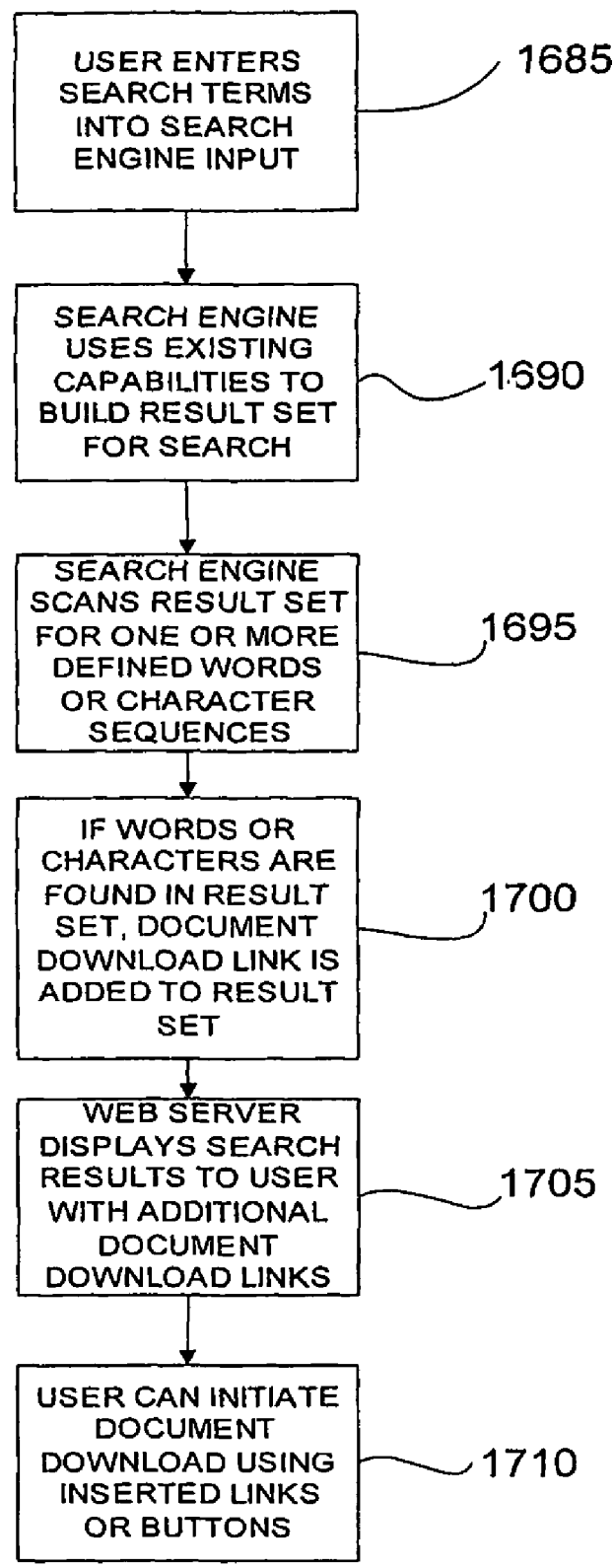
FIG. 55 is a flow chart of the process for search engines to evaluate search result sets for the presence of keywords and to insert document download initiation links or buttons into the search results in an exemplary embodiment of the present invention.

FIG. 55 is a flowchart of the process in the exemplary embodiment of the invention to provide search engines a mechanism with which to evaluate search results for keywords and to insert electronic document download URLs into the search results based on specific keyword relationships to electronic document addresses as discussed in connection with the description of FIG. 52. Such search engines must support the use of "keywords". These search engines use their own capabilities, either proprietary or publicly known, to store keywords and related content or actions as is discussed in connection with the description of FIG. 52.

As depicted in FIG. 55, a user of a web browser or application would enter a search term into the search input area of the invention-enabled search engine interface 1685; a search input area commonly has an associated search activation online button labeled "Search" or "Go". The search engine uses its own proprietary or publicly known methods to generate a search results set 1690 containing web page links, content excerpts, and other information.

The invention-enabled search engine would then analyze the result set 1695 for keywords defined as result set keywords as related to system codes or system code embedded URLs discussed in FIG. 52. This analysis would be done before the results are given to the web server for presentation to the user's web browser.

Upon finding one or more keyword matches in the result set, the search engine would insert an electronic document download initiation URL 1700 generated by the system and related to the keyword into the search results in the form of a hypertext link or button. An example of a electronic document download initiation text link as defined in HTML is below:

<a href="http://jules.dafoink.com/talkRules/callLink.asp?trID=5631EDC86148489C9BFA904CAD80D4AA"> http://jules.dafoink.com/talkRules/callLink.asp?trID=5631EDC86148489C9BFA904CAD80D4AA</a>

The electronic document download initiation URL could alternatively be the direct address of the electronic document on the Internet.

It will be understood by someone with ordinary skill in the art that standard HTML can be used to embed electronic document download initiation links, graphic links, or form buttons into individual web pages or create code in applications which will generate the same.

The invention-enabled search engine would then employ the web server to display the search results to the user, including any electronic document download initiation links or buttons 1705. If the user desires to initiate an electronic document download, the user would click on a link 1710 within the search results. The description of FIG. 49 refers to methods with which to initiate electronic document downloads from URLs which are not documents, such as the system code embedded URLs.

Figure 56:
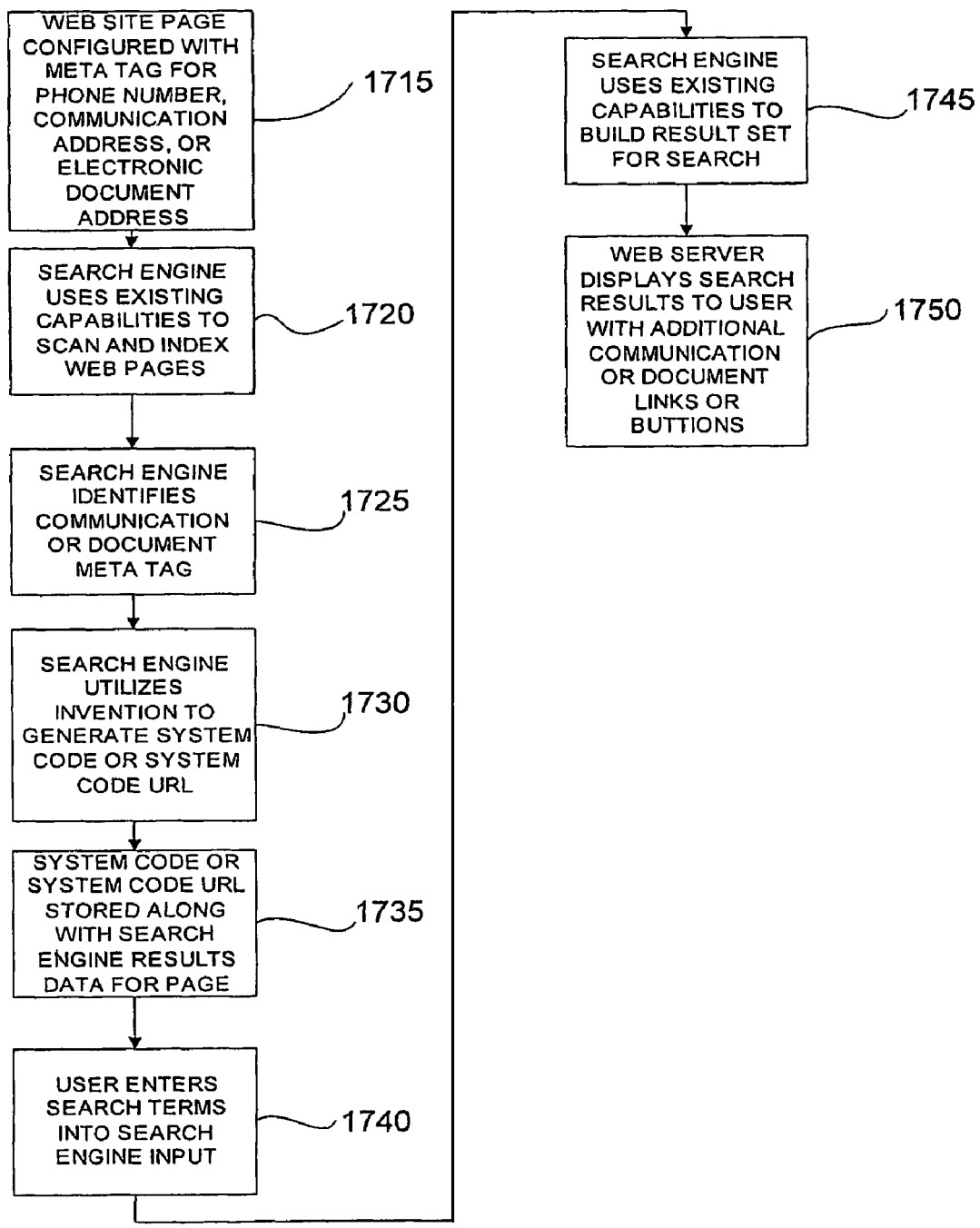
FIG. 56 is a flow chart of the process in an exemplary embodiment of the present invention for using unique HTML meta tags in web pages so that properly arranged search engines can automatically extract phone numbers, communication addresses, and electronic document addresses from the pages, generate system initiation codes using the invention, and present the initiation code links or buttons along with search results.

FIG. 56 is a flowchart of the process in the exemplary embodiment of the invention to provide a method of utilizing HTML meta tags in web pages in conjunction with search engine indexing processes to automatically collect phone number, communication addresses, and electronic document address information in stored search engine page information and display phone call, communication, or electronic document download initiation links along with search results.

As is well known in the art, meta tags are used for a variety of functions related to display of web pages and search engines or other application analysis and cataloging. Meta tags are not displayed by the browser, although they are part of the HTML that a web server delivers to a web browser. Using meta tags, the invention will provide an automated way for search engines to display communication and electronic document download links within search results.

Web pages can be created with meta tags representing phone numbers, communication addresses, or electronic document downloads by using HTML such as in the exemplary format below:

<META name="phonenumber" content="555-555-1234">

The meta tag field "name" acts as a variable name which must be standardized and expected by the search engine indexing process. The meta tag field "content" contains the value associated with the variable defined by "name". In the above example, the variable "phonenumber" would have a value of "555-555-1234". The specific variable name in the meta tag "name" field is important only in that it must be a name that the web server engine index process is programmed to find when scanning web pages. Ultimately a standard variable labeling mechanism adopted by an appropriate standards committee would be preferred.

As depicted in FIG. 56, a web site page can be configured 1715 with any combination of meta tags for telephone numbers, communication addresses, and electronic document addresses as follows:

<META name="phonenumber" content="555-555-1234">
<META name="videophone" content="124445556666">
<META name="documentdl" content="http://www.mysite.com/docs/product.doc">

The above example shows three meta tags with three different types of communication addresses. The tag with "phonenumber" contains a fictitious telephone number, the "videophone" tag a fictitious video phone number, and the "documentdl" tag the URL of a document which can be downloaded. These meta tags should be included within the <HEAD> section of an HTML document as is required for all meta tags. Content for each communication type should be appropriate for each type of communication method, and the search engine could be programmed to accept one or more formats for each content value. For example the search engine could accept either one of "5555551234", "(555) 555-1234", or "555-555-1234" for valid phonenumber tag content or all of those formats.

As depicted in FIG. 56, the search engine would analyze 1720 web sites and their associated pages in order to index their content for user searching, and in doing so, the invention-enabled indexing process would search each page for meta tags with variable names as defined for that search engine as standard, for example "phonenumber". Upon locating 1725 matching meta tags within a page, the search engine would utilize the system of the invention 1730 to generate system codes or code embedded URLs for each matching tag and would store 1735 the system codes or URLs along with the summary data the indexing engine generates for each page.

In response to a user entering a search term into the search engine input box 1740, the search engine would use its standard capabilities to build a result set for the search 1745, which will include system code embedded URLs generated by the system based on the above-described indexing process.

The search engine web server would then display the search results 1750 to the user including any communication or document download initiation URLs.

Figure 57:
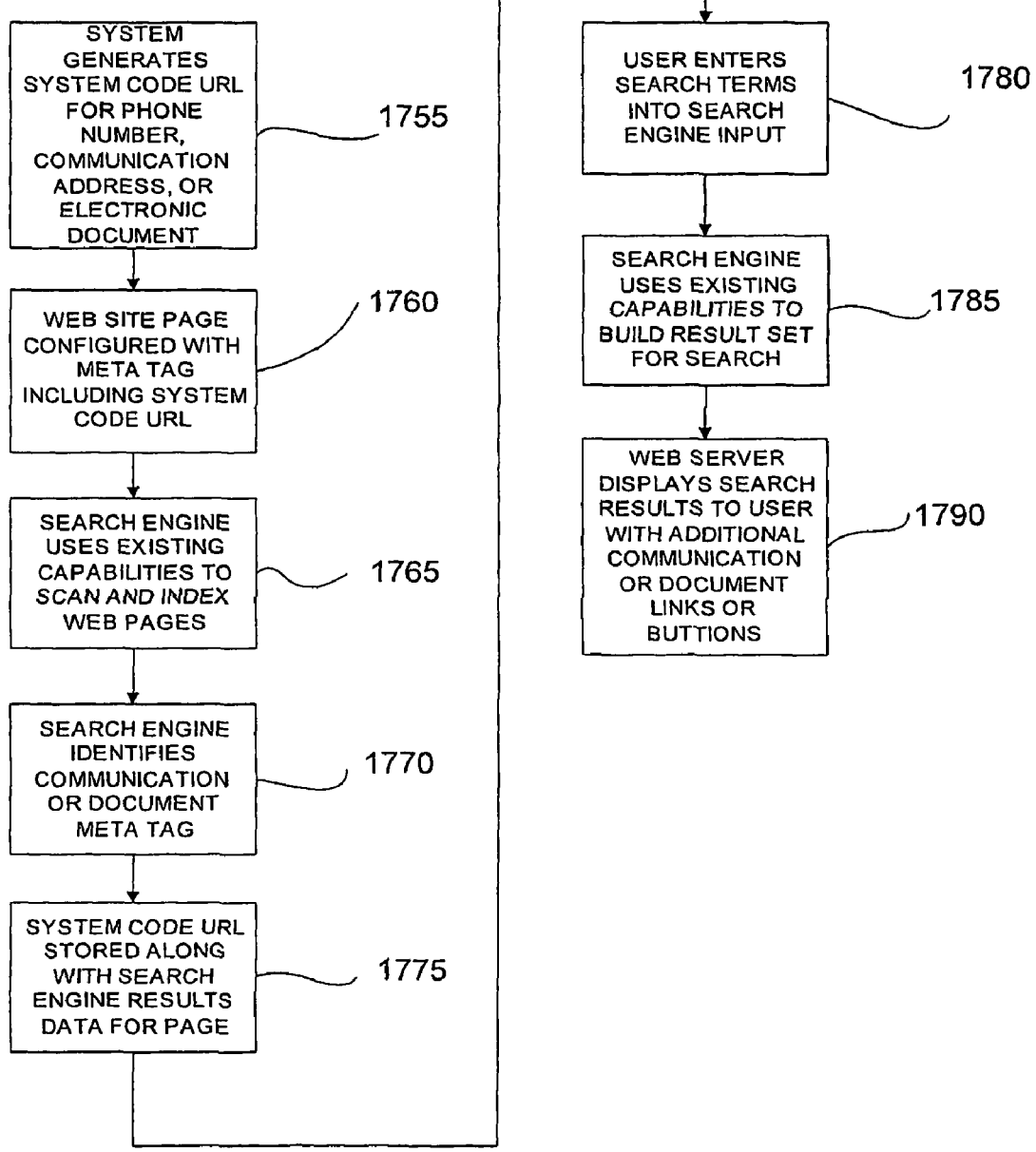
FIG. 57 is a flow chart of the process in an exemplary embodiment of the present invention for using unique HTML meta tags in web pages so that properly arranged search engines can automatically extract invention generated system codes or URLs from the pages such that phone calls, electronic document downloads, and other communications are able to be initiated via links or buttons along with search results.

FIG. 57 is a flowchart of the process in the exemplary embodiment of the invention to provide a method of utilizing HTML meta tags in web pages in conjunction with search engine indexing processes to automatically collect phone number, communication addresses, and electronic document system code embedded initiation URLs in stored search engine page information and display phone call, communication, or electronic document download initiation links along with search results.

Using meta tags, the invention would provide an automated way for search engines to display communication and electronic document download links within search results.

Web pages can be created with meta tags representing phone numbers, communication addresses, or electronic document downloads by using HTML in an exemplary format such as below:

<META name="displaylink" content="http://jules.dafoink.com/talkRules/callLink.asp?trID=5631EDC86148489C9BFA904CAD80D4AA">

In the above example, a system code embedded URL is related to the meta variable "displaylink" so that a search engine indexing process can include the link in its saved summary data to be displayed with search results. Another example below shows how a similar meta tag can also include link text for display:

<META name="displaylink" content="Click to call my company; http://jules.dafoink.com/talkRules/callLink.asp?trID=5631EDC86148489C9BFA904CAD80D4AA">

In the above example, link text is embedded in the content, before the ";" separation character, of the variable "displaylink" so that when the search engine displays the link it would offer the user some explanation as to what the link does. The resulting link would appear to the user as "Click to call my company" and the URL would be activated in the user's web browser if they were to click the link. In the example below, the same link text result is achieved using a meta tag pair, one to include the link text meta variable "displaylinkname", and another to contain the URL, meta variable "displaylinkURL":

<META name="displaylinkname" content="Click to call my company">
<META name="displaylinkURL" content="http://jules.dafoink.com/talkRules/callLink.asp?trID=5631EDC86148489C9BFA904CAD80D4AA">

The meta tag fields "displaylink", "displaylinkname", and "displaylinkURL" act as variable names which must be standardized and expected by the search engine indexing process. The meta tag field "content" contains the value associated with the variable defined by preceding variable name field. The specific variable name in the meta tag "name" field is important only in that is must be a name that the web server engine index process is programmed to find when scanning web pages. Ultimately a standard variable labeling mechanism adopted by an appropriate standards committee would be preferred.

The system of the invention would generate system code embedded URLs 1755 for phone numbers, communication addresses, and electronic document addresses through a user interface or an automated method. A web site page could be configured 1760 with any combination of meta tags for telephone numbers, communication addresses, and electronic document addresses as follows:

<META name="displaylink" content="http://jules.dafoink.com/talkRules/callLink.asp?trID=5631EDC86148489C9BFA904CAD80D4AA">

As the search engine analyses 1765 web sites and their associated pages in order to index their content for user searching, the invention-enabled indexing process would search each page for meta tags with variable names as defined for that search engine as standard, for example "phonenumber". Upon locating 1770 matching meta tags within a page, the search engine would store 1775 the system code embedded URLs along with the summary data the indexing engine generates for each page.

In response to a user entering search terms into the search engine input box 1780, the search engine would use its standard capabilities to build a result set for the search 1785, which will include system code embedded URLs based on the indexing process.

The search engine web server would then display the search results 1790 to the user including any communication or document download initiation URLs.

Figure 62:
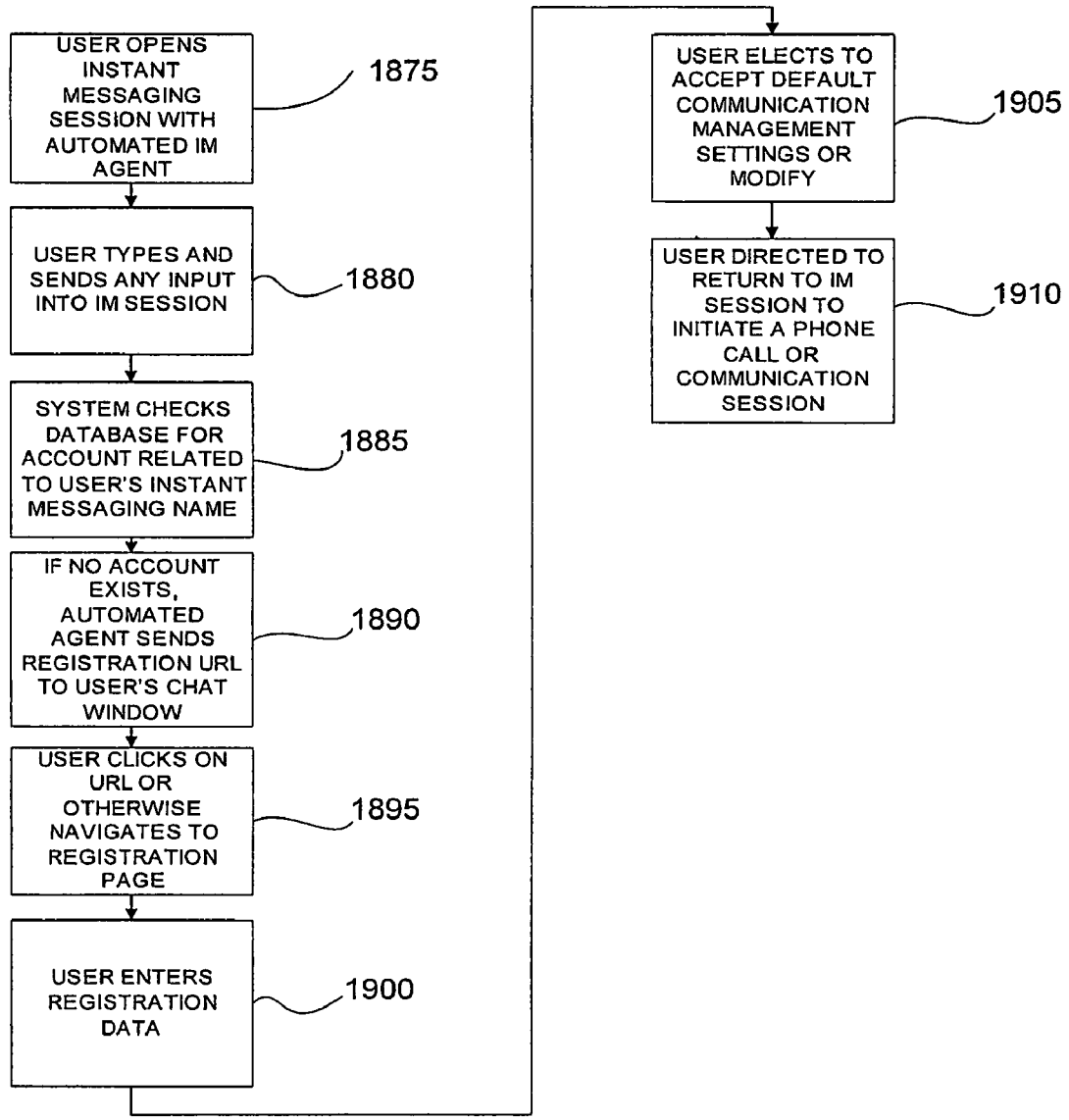
FIG. 62 is a flow chart of the process in the exemplary embodiment of the invention to provide a method of utilizing instant messaging ("IM") software and services to automate detection and creation of user accounts within the system of the invention in preparation to initiate telephone calls or other communication sessions.

FIG. 62 is a flowchart of the process in the exemplary embodiment of the invention to provide a method of utilizing instant messaging ("IM") software and services to automate detection and creation of user accounts within the system of the invention in preparation to initiate telephone calls or other communication sessions. Instant messaging systems provide the capability for users to send text messages between each other with near real time delivery into a software interface that typically displays the results of the user's typing in a scrolling fashion, labeling each user's text. Examples of instant messaging software and services include: AOL Instant messenger, MSN Messenger, Yahoo! Messenger, and ICQ.

Within this exemplary embodiment, the invention is integrated with an IM service without modification of the software used by the IM service—to do this, the system of the invention will emulate a user of the IM service. As will be understood by someone with ordinary skill in the art, such user emulation, which is not an object of the invention, can be accomplished using a variety of methods, including a custom engineered solution or use of a third party software development kit.

Once user emulation has been configured, the invention will interact with one or more IM systems as an automated agent. The automated agent will have one or more specific IM accounts it will use to communicate with users wishing to communicate via phone or other communications method. One example of such an account and emulation would be use of "callmybuddy" as an IM message address. Any IM messages directed to "callmybuddy" would be intercepted by the emulation and directed to the system of the invention which would prompt and receive input from the user via the IM service.

As depicted in FIG. 62, a first time user of the IM communication system provided by the invention opens an IM session with the automated IM agent of the system of the invention 1875. The user types in any input into the IM interface and sends it to the automated agent 1880. The system receives the user IM system type (AOL, MSN, Yahoo!, ICQ, etc.) name, the user IM name and the transmitted text via the emulation component. The system then searches the user database 1885 for accounts matching the IM system and IM name combination. If an existing account is found, the system of the invention continues the process of initiating a phone call or other communication as discussed in below with respect to the description of FIG. 63.

If no account exists, the automated agent sends a registration URL 1890 and brief text instructing the user to click on the link or use it to navigate their web browser to a registration page of the service. Alternative embodiments of the service could automatically generate an account on the user's behalf with default settings or alternately use the IM interface to register the user through various prompt/response cycles. The user utilizes the registration URL 1895 to navigate to a registration page of the system. The navigation page 1900 collects information from the user including: name, address, default telephone number or communication address to relate to the user's account, and payment information. Other embodiments of the invention may collect more or less registration information, and could optionally not require a default phone number or communication address and instead prompt for that at the time of a call or communication session initiation request.

Continuing with FIG. 62, the user is prompted 1905 by the system to accept the default communications settings or to modify the settings to suit their needs. The basic communication settings would consist of inbound call management rules supported by the system of the current invention: 1) allow all communications from anyone; 2) deny all communications from anyone; 3) allow those who user authorizes to communicate; 4) deny calls from those on a specific list; 5) ask user at time of communication initiation. Secondary communications settings would define the date, day, and time ranges the user will accept communications from others according to communications from those in separate categorizations of communication initiators: 1) not specifically on a list of authorized communication initiators; 2) on the user's general list of authorized initiators; 3) individually authorized initiators with specific communication limits separate than the general list. The combination of primary and secondary inbound communications settings establishes a flexible rule set for user to control inbound communications. For example, if the system default for the primary setting is to accept communications from all initiators and the secondary setting for the general list of authorized users is 9:00 am-5:00 pm, Monday through Friday, May 1, 2001 until May 1, 2005 and an initiator on the user's list attempts to communicate at 10:00 am on Saturday, the system will deny the communication. The communication initiation process is further discussed below with respect to the description of FIG. 63.

Upon completing the registration 1900 and communication management rules definition, the user is directed by the system to return to their IM client 1910 to interact with the automated agent and initiate a phone call or other communication session with another IM user. The system of the invention supports a variety of communication management rule capabilities which are discussed herein and could be utilized within the context of this embodiment. Other embodiments could also use keyword enabled IM systems to launch communications as discussed above in connection with the descriptions of FIGS. 39, 40, and 42 utilizing the IM user text input area for accepting and processing of keywords.

Figure 63:
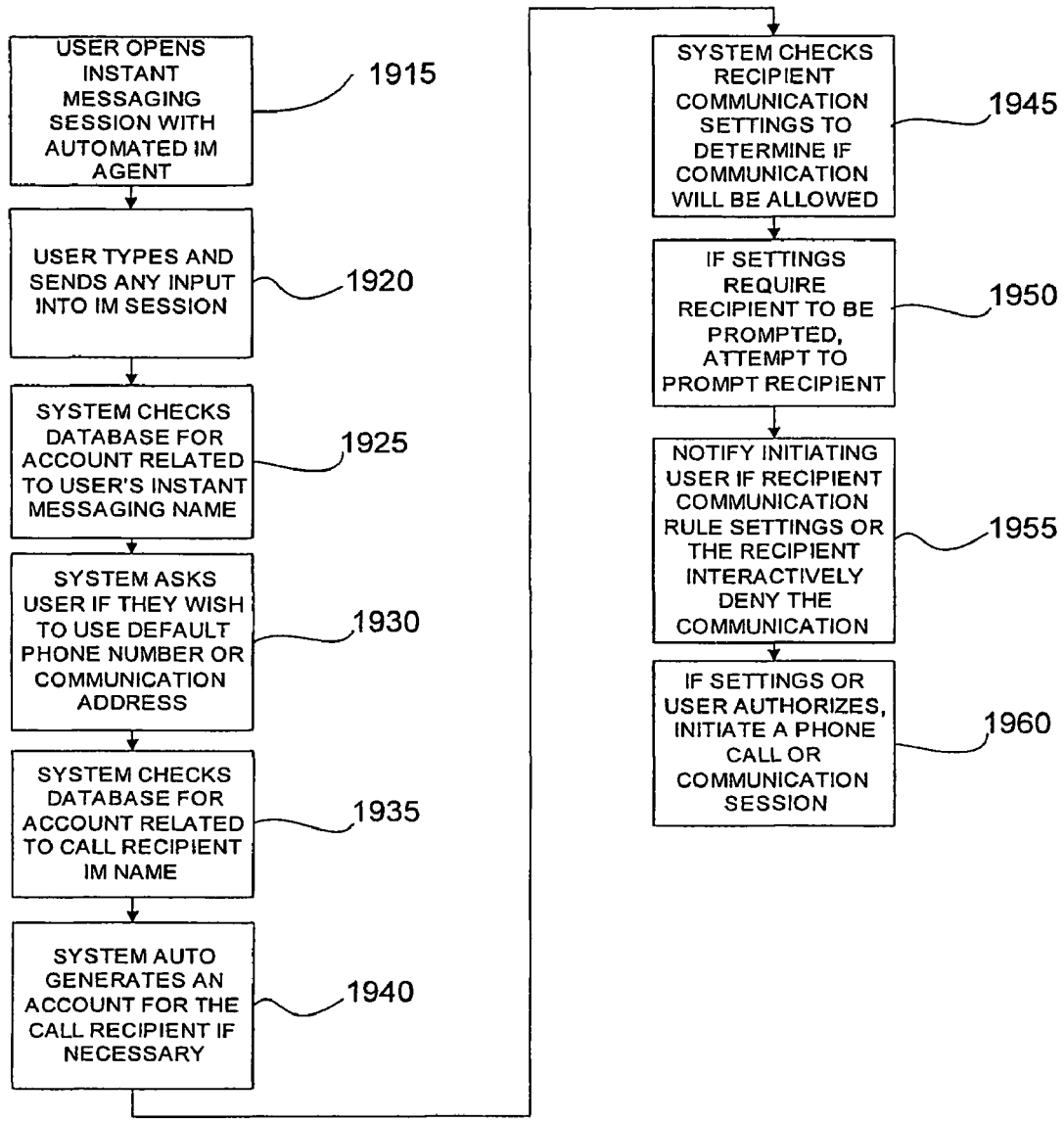
FIG. 63 is a flow chart of the process in the exemplary embodiment of the invention to provide a method of utilizing instant messaging ("IM") software and services to initiate telephone calls or other communication sessions.

FIG. 63 is a flowchart of the process in the exemplary embodiment of the invention to provide a method of utilizing instant messaging ("IM") software and services to initiate telephone calls or other communication sessions. The process also keeps the phone numbers and communication addresses of the participants private and allows for incoming communication management.

Within this embodiment, the invention is integrated with an IM service without modification of the software used by the service, as described above such that the system of the invention will emulate a user of the IM service.

As depicted in FIG. 63, an IM user opens an IM session with the automated IM agent of the system of the invention 1915. The user types in any input into the IM interface and sends it to the automated agent 1920. The system receives the user IM system type (AOL, MSN, Yahoo!, ICQ, etc.) name, the user IM name and the transmitted text via the emulation component, then searches the user database 1925 for accounts matching the IM system and IM name combination. If an existing account is not found, the system of the invention continues the process of registering and defining communications settings as discussed above in connection with the description of FIG. 62.

Continuing with FIG. 63, if an account exists, the automated agent prompts the user if they wish to use the default phone number or communication address 1930 for this communication session which is registered defined in their account or to use another phone number or address. The user responds by typing "Y" to use their default phone number or communication address, or types an alternate phone number or address and sends the response. Other embodiments may use other prompting scenarios without impacting the end result of obtaining the required phone number or communication address of the user. Other embodiments may also only allow the default phone number or communication address to be used.

The system of the invention will then evaluate 1935 the user IM system type (AOL, MSN, Yahoo!, ICQ, etc.) name, the user IM name and the transmitted text via the emulation component initially collected 1920 from the user IM session via the emulation component, to determine if an account exists in the user database related to the communication recipient's IM system and IM name combination.

If an account for the communication recipient does not exist, the system of the invention will automatically generate 1940 an account with default communication management rules applied to all such automatically generated recipient accounts. This automatically generated account will require a default setting of "ask user at time of communication initiation" because the system will not have stored a phone number or communication address for the recipient. If the recipient later becomes a user of the system, this account can be converted to a regular account and the communication settings can be managed by the user.

The system of the invention then checks the recipient communication settings 1945 as related to their account in the system database to determine if communication is possible between the initiating user and the recipient. Communication is only possible if both the initiator and recipient have registered compatible communication devices. For example the system could deny communication between a video conferencing address and a standard telephone. In the case of incompatibility, the system will notify the initiating user by sending a message to the user's IM session with the automated agent.

The system then determines if communication will be allowed according to the communication rules defined either automatically via automatic account generation 1940, or as defined during user registration as discussed above in connection with the description of FIG. 62. If the settings 1950 require the recipient to be prompted to authorize the incoming communication, the system will attempt to prompt the recipient using the IM service through the emulated automated agent. If the IM system, though the emulation, reports the recipient is not available, or if the recipient denies the incoming communication, the calling user will be notified 1955 that the communication will not be initiated by sending a text message to the user's IM session with the automated agent including the appropriate reason for not completing it, e.g.: recipient was not available to authorize the communication; recipient is not accepting communication at this time; or the recipient will not accept communication from the initiating user.

Upon verifying the communication authorization for the recipient, the system of the invention will initiate 1960 a telephone call or other communication using the phone number or communication address of the initiating user and the recipient.

The system of the invention supports a variety of communication management rule and communication initiation capabilities which are discussed herein and which could be utilized within the context of this embodiment. Other embodiments could also use keyword enabled IM systems to launch communications as discussed in connection the description of FIGS. 39, 40, and 42 utilizing the IM user text input area for accepting and processing of keywords.

Exemplary Embodiment Stored Procedure Summary

In the exemplary embodiment of the present invention, a number of stored procedures are provided to perform functions, some of which are described in summary below:

SpGetDeployItemHistory—used to return all deployment history for a particular data item in the system.

SpGetDeploymentItems—returns all open deployment items. These are items that have not been deployed or canceled from the deployment queue.

SpGetDeploymentItemsByStatus—returns all deployment items of a particular status.

SpGetEmailTemplate—returns all email template information given the email template name and htmlEmail flag (htmlEmail flag is a tiny int. If it is a 1, the system should return the email HTML version of the template information.

SpGetFormItems—returns all form fields for a particular formID

SpGetFormScript returns all the formItems given a registrationSourceID and a form name. This is used to populate a collection of structures which is used for the validation, and display of form items (fields).

SpGetForms—returns all forms for a particular registrationSourceID

SpGetHelp—returns a help item assigned to a helpID. This is used for administration and deployment purposes.

SpGetHelpByCategory—used in the help module to return all help items for a particular category.

SpGetItemCatsAsStringOUT—returns a delimited string containing all categoryID's to which an item may be assigned.

SpGetLOVList—returns all LOV items for a particular lovTypeID. If an orderIndex is passed with a value of 1, the procedure will order the items by an index in the lov table.

SpGetLinkCount—returns the number of links available to a user.

SpGetLinkCounts returns both the number of links left for the user and the number of links used by the user. This procedure will also deactivate any old links that have expired.

SpGetLinkRule—returns a ruleID given the linkURL. This will only pass back the ruleID for a link that exists and the ruleID will be the ruleID that is currently valid for the url. In other words, the system will check to see which rule matches the current time/date/etc and will return that ruleID. It will return a null if no valid rule is found for the URL.

SpGetLinkSchedule—returns all rules for a particular linkURL

SpGetLinksByUserID—returns all links for a particular userID. NOTE: this only passback the link level. No rule information is passed back.

SpGetLoginByEmail—given an email address, the system will pass back user information.

SpGetOverrideRule—not used in exemplary embodiment.

SpGetPageText—given a registrationSourceID and pageName, the system will pass back the custom content that matches.

SpGetPages—returns all custom content items for a particular registrationSourceID.

SpGetPaymentReport—a detailed report which shows all calls, minutes spent, who spent them, minutes paid, and other information linked to calls and the payment for minutes.

SpGetProductBundle—returns a bundle information given a bundleID.

SpGetReferralUserIDLinks—given a registrationSourceID and a referringUserID, this procedure retrieves all link URL's that match that criteria. This is used for a quick lookup for users who would only have one link in the system. It makes an easy way for external sites to integrate with our system without passing much data back and forth.

SpGetRegBundles—this is not used in the exemplary embodiment.

SpGetRegistrationAnonymousBundle—finds the bundle used for anonymous users for a registrationSourceID. If no bundles are found for that registrationSourceID, the system will return the global anonymous user bundle.

SpGetRegistrationBundles—get all product bundles assigned to a registrationSourceID.

SpGetRegistrationMonthCount—this is a report which shows the number of new users, calls, and minutes spent for this month, last month, and year to date.

SpGetRegistrationReport—a report showing registration for a particular date range.

SpGetRegistrationSource—returns all registrationSource information given the registrationSourceID.

spGetRegistrationSourceForRule—given a ruleID, the system will determine the registrationSourceID of the user owning that rule.

spGetRegistrationSourceSessions—returns all sessions for a particular month for a registrationSourceID.

spGetRegistrationSourcesForBundle—returns all registrationSourceID's that are linked to a particular bundle.

SpGetReoccurringPayments—used for monthly rebill. This will return all payments that are due for the month.

SpGetRuleInfo—returns the rule information for a ruleID. It will also cross check to make sure that only the valid user will be able to retrieve the rule.

SpGetRuleRegistrationSourceID—gets the registrationSourceID for the user of a link (given the link URL).

SpGetRuleURLForUser—given the ruleID and the sessionID of a user, it will return the URL for the link attached to that rule and user.

SpGetRules—returns all links and their rules for a particular user. This procedure will also filter out any links which don't have any valid rules attached to them (ie. if the rule dates are older than the current date or if there is no rules at all).

SpGetScheduledCalls—this will return any calls a user has queued up for future connection (ie. the talkrules user wants to schedule a call for a future date and time. This procedure will display any future call that hasnt been placed).

SpGetScriptTextByName—by passing the registrationSourceID and the scriptName, a script, used for integration, will be passed back to the API.

SpGetSessionReferralVars—returns all referral variables (referringUserID, referralVar1, referralVar2, referralVar3, referralVar4, and referringReturnURL) for a sessionID.

SpGetSessionReport—returns all records for the session report.

SpGetUserAddress—returns an address for a user. If a addressType is passed, it will only return the addresses that match that type for the userID. If no addressType is passed, all addresses will be returned, regardless of type.

SpGetUserGroups—returns all userGroups for a userID.

SpGetUserID—returns a userID for a particular sessionID.

SpGetUserIDForLogin—by passing a username and password, the procedure will return a userID.

SpGetUserLinkSummary—returns all links for a user (by finding out the userID from the sessionID).

SpGetUserPermissions—returns all the user permissions for a userID.

SpGetUserRegistrationAccess—this is used in referral admin. If a user is tagged to a particular registrationSourceID, they will have access to a special referral admin for that registrationSourceID. This is used for affiliates who would need access to reports or other administration functionality for their referralID.

SpGetUserSeconds—this returns the difference between the number of seconds the user has paid for and the number of minutes they have used. The return is the number of seconds they have left in their account.

SpLogCallEvent—This is used to log a call. When a call is placed, information is stored in the callsLog table to track the call.

SpLogOff—this deactivates a session by its sessionID.

SpPerformUserLogin—this will validate and login a user to the system. This is accomplished by passing a username and password. The system will validate that username and password. If they are valid, the system will set the userID of the session to the actual userID, and turn the is Guest flag to 0. NOTE: the userID is the return recordset.

SpPerformUserLoginOUT—this works the same way as spPerformUserLogin except it passes back the sessionID as an OUT variable of the stored procedure. NOTE: the userID is the return recordset.

spPerformUserLoginReUseSession—this will login a user the same way as spPerformUserLogin but it will maintain the existing session even if it is a voided session.

SpQueueAffiliateRequest—this is used for the affiliate signup function. When an affiliate wants to become an affiliate, they fill out a registration form. The data from that form is pushed into this function and then put into a queue for processing.

SpReloadSessionPermissions—This will force a reload of the permissions of a user into the permissionCache. This is done on login (since the user is changing from guest to an actual user) or when the user's permissions are changed.

SpRollbackDeployItem—This is part of the soft deploy module. It will take an already deployed item or an item that has been canceled, and requeue it to be rolled out on the next soft rollout.

SpSaveCategory—inserts or updates a category.

SpSaveHelp—inserts or updates a help item.

SpSaveRegistrationSource—inserts or updates a registrationSource.

SpSetAnonymousUser—this is used to create an anonymous user. Anonymous users are used in the system to accept credit cards without the user having to become an actual user in the system.

SpSetUser—inserts or updates a user record.

SpUpdateBundleItem—inserts or updates a bundleItem.

SpUpdateCallStatus—changes the status of the call stored in the callsLog.

SpUpdateCallsLog—stores additional information in the callsLog. This is primarily used when the system communicates with the outside telco system. Additional information is returned from that outside system and needs to be stored for the called.

SpUpdateCard—inserts or updates a credit card for a user.

SpUpdateDeployItem—part of the deployment module. updates the status for the deployment item. If the status is DON (Done), then the deployDate is set to the current date/time.

SpUpdateDeploymentItem—part of the deployment module. updates a deployment item. This is different than the spUpdateDeployItem since spUpdateDeployItem only updates status and deployDate.

SpUpdateForm—part of the form engine. updates or inserts a form.

SpUpdateFormItem—part of the form engine. updates or inserts a form item (field).

SpUpdatePage—part of the custom content engine. updates or inserts a custom content page.

SpUpdateScript—part of the scripting engine. updates or inserts a script.

SpUpdateUserGroups—by passing a userID and a comma delimited string of the groups to attach to that user, the procedure will first delete the user from its existing groups and then reassign to the groups in the comma delimited string.

SpUpdateUserRegistrationAccess—this will attach a user to a registrationSource. This is used for referral admin where users are assigned to a registrationSource which gives them the ability to perform affiliate administration tasks.

SpUseOverrideRule—this will allow the system to override all links with a "special" rule. All normal links/rules that are attached to the user will not be used. A special Override link/rule will be used instead.

SpUseSchedule—not used in exemplary embodiment.

SpValidateRule—will make sure that the current rule won't conflict with other rules for the link to which it is attached.

SpSaveRule—inserts or updates a rule. This is used by a user when they change or add rules to a link.

GetCurrentBundleItem—bundles have a hierarchy where it can be set so that a user can only upgrade their bundle and not be able to downgrade. If the bundles are assigned index, this procedure will pass back the index of the bundle currently assigned to the user.

SpSaveLink—inserts or updates a link. A user uses this when they add or modify a link to their account.

GetScriptLocationByName—integration scripts in registrationScripts can not only have scripting tied to them but they can also call an external URL. This procedure passes back the proper URL given the registrationSourceID and scriptName. NOTE: If a registrationScript is not found for the passed registrationSourceID, it will look for a default registrationScript and pass that back. This allows a global/override capability. If the default script isn't suitable for the registrationSource, that default script can be overridden specifically for the registrationSource.

SpSaveUser—part of the deployment module. This will insert or update a user into the system.

SpAddBasketItem—this is part of the ecommerce module. It is used to temporarily store the productBundle the user is purchasing.

SpSaveAddress—inserts or updates a user's address.

SpAddBundle—inserts or updates a product bundle.

SpSavePayMethod—inserts or updates a credit card (or other payment method) for a user.

SpAddCard—same as spSavePayMethod.

SpSaveItemCounter—itemCounters are used to track the maximum number of links, the maximum number of minutes, and minute thresholds that are available to the user. This procedure saves an itemCounter.

SpAddLinkMessage—if an inbound caller is attempting to call a user who doesnt have any valid rules for a link, the inbound caller can send the user a message. This procedure saves the message for future retrieval.

SpDeleteItemsCountersForUser—removes all itemCounters for a particular userID.

SpAddLoginLog—each login is tracked on its status. These logins are stored in the loginLog. This procedure sends the login attempt and the outcome of that attempt to this loginLog.

SpSaveOrder—part of the ecommerce engine. When a user has completed their purchase of productBundles, this procedure stores the data into an order record.

SpAddPayment—whenever a card is charged, this procedure stores the transaction into a payment record.

SpSaveOrderItems—part of the ecommerce engine. stores an orderItem into the orderItem record. Each orderItem represents a productBundle that the user has purchased.

SpAddQuestionValue—part of the custom form engine. This stores the values captured on a custom form for the user.

SpDeleteAllOrderInfo—deletes all orderItems and order records for a particular ordered.

SpAddRule—updates or inserts a rule for a link.

SpAddSession—part of session management. This will add a new session to the system. This will be passed from page to page as the user navigates throughout the system.

SpAddSessionPermissions—part of session management. This will load all permissions for the user into the permissionCache. it will pass back a 0 or a 1 (fail or success) into a @result OUT variable.

SpAddSurveyItem—part of the custom form engine. This will add a survey item captured from a custom form for the user.

SpAddSessionVariable—part of session management. Variables and their values can be stored for a session. This procedure will store a variable and their value into the sessionVariable table. If the variable already exists for the session, the system will ovewrite that variable's value with the new value.

SpGetSurveyForReferralID—part of the custom form engine. This returns a all survey items captured for a particular referralID.

SpAddUserToGroup—attaches a userID to a particular permission group.

SpBundleData—part of the deployment engine. This will save an item to the deployment queue.

SpGetCallsForUserID—Returns all calls for a userID that are between a beginDate and endDate.

SpCancelCall—cancels a call given the callID spGetCallsForRegistrationSourceED—returns all calls for a registrationSourceID that are between a beginDate and endDate.

spChangeRegistrationQueueStatus—used in conjunction with the affiliate signup form. An administrator can approval a registration to become an affiliate. This procedure will change the status of the registrationSource to either Queued or to Active (depending on what is passed to the procedure).

SpGetSimpleScript—returns all scripts from the scripts table which matches the scriptName.

SpCheckAdminSession—will return a 1 if the sessionID passed is attached to an administration user. It will return a 0 if it is not an administration user.

SpCheckLinkOrder—checks to make sure that the link actually was created properly through the ecommerce engine. If an order was not attached to the link, a 0 will be returned. If an order was attached to a link, then a 1 will be returned.

SpCheckPassword—this returns a 1 if the sessionID and password are found in the session and user joined tables. It will pass a 0 if it is not found.

SpCheckReferralID—this checks and updates the referral variables for a session.

SpCheckSession—part of the session management. this makes sure that a session is a valid session and updates it if it is.

SpCheckSiteAccessOUT—returns whether a user has permissions to a particular siteLOV. the results are passed back in an OUT parameter as @hasAccess. 0=no access, 1=has access.

SpCheckUsername—returns the userID if the userID exists. Will return a null if the userID doesnt exist.

SpClonePermissions—this will take a fromUserID and copy the permissions from that userID to a toUserID.

SpCloneUser—this will take a sessionID and userID parameters and copy the userID to the session if that userID exists in the users table.

SpCopyFormItems—part of the forms engine. this will duplicate all formItems from one form to another.

SpCreateOrder—this will create an order record and all the appropriate orderItems from the basket of the session represented by the sessionID parameter. After the order and orderItems records are created, the basket will be cleaned out.

SpDecrementLinkCount—decrements the number of links the user can have in their itemCounter record for links. The lowest value can be 0.

SpDeleteAllFormsForRegSrc—part of the forms engine. Will delete all forms and formItems attached to a particular registrationSource.

SpDeleteLinkRules—deletes all rules for a given linkID. This will also delete the link. (NOTE: the procedure only deactivates the rules and link. Nothing is actually deleted).

SpDeleteRule—deactivates a particular rule given a ruleID. The procedure also checks the linkID of the rule. If this rule was the last rule attached to the link (ie. if the link no longer has any more rules, that are active, attached to it) it will also deactivate the link.

SpEditAddress—inserts or edits an address.

SpGenerateRandomSession—part of session management. returns a GUID used for a sessionID.

SpGetAddress—returns an address for a user. An addressType is also passed as a parameter. This procedure will only return the address for the user of that particular addressType.

SpGetAllCalls—returns all calls for a particular user.

SpGetAllCategories—returns all active categories.

SpGetAllHelp—returns all help.

SpGetAllLinkInfo—returns all link and rule information for a particular linked.

SpGetAllRegistrationSources—returns all registrationSources. An additional parameter @active is passed. It will return only active registrationSources if a 1 is passed. It will return only inactive registrationSources if a 0 is passed.

SpGetAllRules—will return all links and rules for a user. An additional parameter @ruleType is passed. If an empty string is passed, it will pass back all links and rules for that user. If a type is passed, it will only return rules and links that match that type.

SpGetAllSystemValues—returns all systemConfigVariables names and values.

SpGetAllUsers—returns a recordSet of user information for a user summary listing. Parameters are passed to filter the return.

SpGetBasket—returns the current basket of a user.

SpGetBasketTotals—returns the price value sums of the current basket for a user.

SpGetBundleItems returns all bundleItems given the bundleID.

SpGetBundles—returns all productBundles that are available to purchase for the user. This depends on which registrationSource (referralID) the user has stored in their session.

SpGetCCardInfo—returns all credit card information for a particular user.

SpGetCallHistory—returns the call history for a particular user.

SpGetCallMinuteStatus—returns a summary of minutes for the user. Items returned: the total number of minutes in the user's package, the price per minute, a sum of all minutes paid for, a sum of all minutes called, and secondsThreshold.

SpGetCategories—returns all categories of a specific type. Also filters by an parameter @active (0 returns inactive categories, 1 returns active categories).

SpGetCategory—returns a specific category by categoryID.

SpGetCurrentBundleLevel returns the current bundleLevel of a user.

SpGetCurrentPackage—returns the current package the user has in their order history.

SpGetCurrentPaymentMethod—returns the current credit card that is active in the user's payMethods.

SpGetCurrentRules—returns ruleInformation for a user.

Exemplary Embodiment Application Programming Interface

In the exemplary embodiment, an Application Programming Interface (API) is provided with which service providers of applications, search engines, and the like can invoke certain functions of the exemplary system of the exemplary embodiment of the present invention. A number of API instruction components in the exemplary API are summarized below.

1. API Instruction: trLink

Links are analogous to a phone number. Users create links in the system which they can then give to other people so that those other people can place a phone call to the user by accessing the link.

Links have rules assigned to them (through trRules). These rules will define when a link is usable as well as assign routing features to that link. Depending on which rule is triggered for the link, the caller could be routed to a number defined in the rule. The trLink instruction component can be used with the functions described below.

Function getUnusedLinkCount( ) determines how many links a user has available and uses Parameters: ruleTypeLOV; availableLinks.

Function getUsersLinks( ) returns all links for the current session.

Function getLinksByUserID( ) returns all links given a userID and uses Parameters: inUserID.

Function saveLink( ) saves a link to the database and uses Parameters: linked; userID; linkTypeLOV; URL; active; beginDate; endDate; linkName; linkNote; callOrder.

Function getLinkInfoForTRID( ) takes the link URL and passes back the linked and uses Parameters: trID.

Function getLinkNameForTRID( ) takes the link URL and passes back the linkName of the link and uses Parameters: trID.

2. API Instruction: trRules

The trRules instruction manages rules, which are tied to links. Rules are what defines when a link is accessible as well as where a call is routed. Each rule has its own routing properties. The trRules instruction component can be used with the functions described below.

Function getStandardLink( ) provides access to all global asp values in the web app.

Function getCurrentRules( ) gets all rules for the current day (including day and special dates).

Function getRules( ) gets a specific listing of rules for type and day and uses Parameters: dayLOV. Function getOverrideRule( )—if an override rule is in place, this function will return it; this function uses no Parameters.

Function useOverrideRule( ) will create an override rule which will be used for the user instead of scheduled rules; this function uses no Parameters.

Function useSchedule( ) stops using an override rule and allows the user to utilize their scheduled rules; this function uses no Parameters.

Function addRule( ) adds a rule to the database and uses Parameters: linked; ruleID; ruleTypeLOV; ruleName; beginDate; beginTime; endDate; endTime; ruleURL; takingCallsBool; toNumber; fromNumber; dayLOV; dayListing; overrideCustomLinks; weekdays; whoPays; ruleNote; overrideUserID; callOrder.

Function aveRule( ) provides a simple method for saving rules that deals with ruleDays and other linked tables; this method deals with the rules table and uses Parameters: ruleID; userID; ruleTypeLOV; ruleName; beginDate; URL;

endDate; takingCallsBool; toNumber; beginTime; endTime; dayLOV; active; overrideCustomLinks; fromNumber, ruleNote; whoPays; linked; createdDate; lastUpdatedDate; callOrder.

Function validateRule( ) will validate a rule to make sure it doesn't conflict with another rule for the user; this function uses Parameters: ruleID; ruleTypeLOV; inBeginDate; inEndDate; inBeginTime; inEndTime; dayLOV; weekdays.

Function deleteRule( ) will de-activate the rule given the ruleID parameter for the user; this function uses Parameters: ruleID.

Function deleteLinkRules( ) deletes all rules attached to a link and uses Parameters: linked.

Function getLinkRule( ) will return the current rule for a given link; this function uses Parameters: ruleURL; ruleName; toNumber; fromNumber; errorOut; whoPays; callOrder.

Function getRuleURLForUser( ) gets the URL for the rule of the current user and passed ruleID; this function uses Parameters: ruleID.

Function getLinkSchedule( ) returns all rules attached to a link's URL; this function uses Parameters: URL.

Function getRuleInfo( ) returns all rule information for the current user and the passed ruleID; this function uses Parameters: ruleID.

Function getRuleUserID( )—given a ruleID, this function will pass back the userID of the rule's owner; this function uses Parameters: ruleID.

Function getAllRules( ) will return all rules of a given ruleType for the current user. If the ruleType is an empty string, it will pass back all rules for the user, regardless of the rule type. This function uses Parameters: ruleType.

Function getRulesForLink( ) returns all rules given a linked and uses Parameters: linked.

Function getLinkCountScenerio( ) returns the number of links the user currently has, the number of links they are allowed in their package. An overrideUserID can be passed (GUID) if a different userID than the current session's userID is to be used. This function uses Parameters: linked; ruleTypeLOV; linkCount; linksAllowed; overrideUserID.

Function getRegistrationSourceTD( )—given a linkURL, this returns the registrationSource of the link's owner. This function uses Parameters: trID.

Function getAllRuleInfoForLink( )—given a linkID, this returns all rule information. This function uses Parameters: linked.

Function getRuleDaysForRule( )—a single rule can be spanned across different week days; this function will pass back all the rule days for a rule. This function uses Parameters: ruleID.

3. API Instruction: trCalls

The trCalls instruction manages all calls both inbound and outbound. This instruction also handles call status, call termination, call minutes tracking, user minutes tracking, and paying for calls. The trCalls instruction component can be used with the functions described below.

Function placeCall( ) will perform a call for a particular rule. This function uses Parameters: ruleID: (QUID) (to identify the rule to be used); toNumber: (string) (to identify the number being called); fromNumber: (String) (to identify the number from which the call is to be made); pageText: (string) (A byVar parameter which returns information from the telephone company server (In one embodiment, this parameter is not used—rather the trScript instruction would be used to perform the work for communicating with the telephone company)); outURL: (string) (A byVar parameter which returns the output returned from the script execution of the integration script postToTelco); userID: (QUID) (the userID of the caller); callersEmail: (String) (The email address of the caller); whoPays: (tinyInt) (in one embodiment, this parameter is no longer used). This function Returns: GUID (The callID of the call placed).

Function processCallPayment( ) checks the current payment situation of the userID passed in the callUserID parameter. If that user doesn't have enough money in their account to meet the secondsThreshold, that user current credit card will be charged. This function uses Parameters: callUserID (GUID) (The userID of the user to be processed). This function Returns: Boolean (True if everything goes ok or False if the user doesn't have enough money in their account and the charge to their card failed).

Function postToTelco( )—In the exemplary embodiment, this function has been replaced by the trScript API instruction.

Function logCallEvent( ) logs a call to the callsLog table. This function uses Parameters: ruleID (GUID) (the rule that was used to make the call); ruleURL (String) (the link URL that was used by the call page to determine which link to be used); toNumber (String) (the phone number called); fromNumber (String) (the phone number that was called from); eventText (String) (in the exemplary embodiment, this parameter is not used); callType (char(3)) (the typeLOV for the call—either an INB (inbound) or a CAL (outbound) call); delaySeconds (int) (the number of seconds to delay the call); userID (GUID) (the userID of the person placing the call); callersEmail (GUID) (the email address of the person placing the call). This function Returns: The callID of the call.

Function updateCallStatus( ) updates the status of the callsLog for a called. This function uses Parameters: callID (GUID) (the callID of the call); extSessionID (GUID) (the sessionID of the user placing the call); callDuration (int) (the amount of time spent on the call); callStart (date/time) (the time the call started); callEnd (date/time) (the time the call ended); callNotes (String) (any notes to be stored with the call log); callStatus (char(3)) (updates the callStatusLOV of the callsLog). This function does not return anything.

Function cancelCall( ) calls the disconnect URL of the call identified by the callID. This disconnect URL will notify the telco (the telephone company) to stop the call. This function uses the Parameters: call D (GUID) (the callID of the call to be canceled). This function does not return anything.

Function getTodaysCallCount( ) will return an integer containing a summarized count of calls made for a user on the current day. This count is returned from the call history. This function does not use any Parameters. This function Returns: Integer (the number of calls made on the current day).

Function getTodaysCalls( ) will return a recordset of all calls made today for the user. These calls are returned from the call history. This function does not use any Parameters. This function Returns: recordSet object (all the calls the user has made for the current day).

Function getCallHistory( ) will return all calls for a user for a given date range and call type from the call history. This function uses Parameters: beginDate (date) (the first day to search for call history); endDate (date) (the last day to search for call history); ruleTypeLOV ((char(3)) (the callTypeLOV to search for call history. NOTE: if a null or an empty string is passed, all call types will be returned for the date range). This function Returns: recordSet object (containing all calls for a user with matching the criteria passed in the parameters).

Function getCallLink( ) returns the linkID of for the call indicated by that call's called. This function uses Parameters:

callID (GUID) (the callID for which to be searched). This function Returns: GUID (the linkID that was used to place the call).

Function getCallRule( ) returns the ruleID of for the call indicated by that call's called. This function uses Parameters: callID (GUID) (the called for which to be searched). This function Teturns: GUID (The ruleID that was used to place the call).

Function getCallStatus( ) returns a status from the telco for a particular call. This function uses Parameters: callID (GUID) (the callID to be searched for). This function Returns: String (this is the actual text that is returned from an HTTP post to the telco).

Function getDisconnectURL (callID) returns the disconnectURL from the callsLog. This disconnectURL is initially placed in the callsLog when the telco is first notified about a call (the telco returns this URL for the API to use if the call is to be terminated unnaturally). This function uses Parameters: callID (GUID) (the callID to be searched for). This function Returns: String (a URL pointing back to the telco. This URL can be called to terminate a call in progress).

Function disconnectCall( ) posts to the telco's disconnectURL to terminate a call in progress. This function uses Parameters: called (GUID) (the callID to be searched for). This function Returns: String (the text that is returned from a call from trApplication.trCalls.getCallStatus( ).

Sub cancelAllCalls( ) cancels all calls in the queue for the current user of the session. This subfunction does not use any Parameters and does not Return any values.

Function checkMinuteLimits( ) determines the number of minutes needed for a call, minutes threshold, the price per minute, and the number of minutes in the bundle purchased. All of these items are returned in byRef parameters. This function uses Parameters: userID (GUID) (the userID of the user to be checked for minute limits); minutesNeeded (integer) (a byRef variable that returns the number of minutes the user needs to place a call); minThreshold (integer) (a byref variable that returns the number of minutes in the user's minutes threshold); minprice (money) (a byref variable that returns the cost per minute); itemBundleQuantity (integer) (a byRef variable that looks at the productBundle item and returns the number of minutes there). This function Returns: Boolean (true if the number of minutes needed is greater than 0 (ie. The user needs more minutes); false if the user doesn't need any more minutes to place a call).

Function getUserSeconds( ) returns the difference between the number of seconds the user has paid for and the number of seconds they have used. This function uses Parameters: userID (GUID) (the userID to check for the number of seconds they have left). This function Returns: Integer (the number of seconds the user has (number of seconds paid minus the number of seconds used)).

Function getCallsForUserID( ) returns all the calls for a particular userID. This function uses Parameters: userID; beginDate; endDate. This function Returns: recordSet object (returns all the calls for a particular userID).

Function getCallsForRegistrationSourceID( ) returns all calls for a particular registrationSourceID. This function uses Parameters: registrationSourceID (GUID) (the registrationSourceID to return the records for); beginDate (Date) (the beginning date for the search (NOTE: if nothing is passed, then the beginDate will be set for Jan. 1, 1900); endDate (Date) (the ending date for the search criteria (NOTE: if nothing is passed, then the endDate will be set for Dec. 31, 3000). This function Returns: recordSet object (containing all the calls for the registrationSourceID).

Function is CallDone( ) is a simple method to check to see if a call is still in progress or if it is complete. This function uses Parameters: callID (GUID) (the callID of the call to track). This function Returns: Boolean (True if the call has been completed and False if the call is either in progress or if it has not yet been made).

4. API Instruction: trScript

The trScript instruction component is used for 3 functions. First, trScript is used for integration scripts. Integration scripts are scripts that are tied to the registrationSourceID. These are complicated scripts which have 3 scripts to execute for every integrationScript: a.) pre-script: This is a script that the first script executed. It's output is passed to the next step. b.) HTTP post URL. This is a URL that receives the output from the pre-script step and then posts it to an external script via an HTTP post. It's output is passed to the next step. c.) post-script: This is a script that is called after the HTTP post URL. The output of this script is passed back to the calling function.

Integration scripts can be inserted throughout the system at various points. An example of an integration point would be when a call is required to be placed. Since integration with external systems is required, the integration scripts are a good choice to customize different interaction, with external systems, tied to a registrationSourceID.

There is a default hierarchy so that if there is no integration script for a particular registrationSourceID, a default integration script will be used in it's place.

Second, trScript is used for Custom Content. Custom content is a group of content elements tied to a registrationSourceID. These elements are HTML and VBScript combinations that look very similar to ASP pages. These elements are inserted at key points of various pages throughout the system to allow custom content to appear. There is a default hierarchy so that if there is no custom content for a particular registrationSourceID, a default content element will be used in its place.

Third, trScript is used as a simple script engine. The simple script engine is an independent scripting system which does not depend on registrationSourceID. Scripts are identified by a script name and a script type. These scripts are used in various parts of the system like: field validation scripts and soft deployment scripts.

The trScript instruction component can be used with the functions described below.

Function getScriptLocationByName( )—Integration scripts (registrationScripts) returns the URL that of the script record which matches the scriptName parameter and the registrationSourceID of the current users session. This function is used with Parameters: scriptName (string) (the script to search for). This function Returns: the URL as a string (If no script record is found, an empty string is returned).

Function getScriptRecordByName( )—Integration scripts (registrationScripts)—returns the entire script record which matches the scriptName parameter and the registrationSourceID of the current users session. This function uses Parameters: scriptName (string) (the script to search for). This function Returns: a recordset object containing all the scripts matching the criteria.

Function executeScript( )—Integration scripts (registrationScripts)—looks up a script for the current users registrationSourceID, attached to their session, and executes it; passes back the results. NOTE: This function deals with the entire integration script. An integration script includes a pre-script, URL post, and post-script execution. The pre-script is script text that executes and passes its output to the URL post. The URL post then performs an HTTP post and returns its results to the post-script text. The post-script text then executes and passes its output to the output of the function. This function uses Parameters: scriptName (string) (script to lookup); postData (string) (URL encoded query string that is passed to all scripts and URL posts); allowDefaultOverride (tinyInt) (not used in exemplary embodiment); overrideRegistrationID (tinyInt) (not used in exemplary embodiment). This function Returns: String (the results from the post-script execution).

Function executeSimpleScript( )—Integration scripts (registrationScripts)—executes an HTTP post to the script location of the scriptName for the current users registrationSourceID of their session the function returns the text returned from the HTTP post. This function uses Parameters: scriptName (string) (the script to lookup); postData (string) (a URL encoded queryString which is used as the data posted to the script location). This function Returns: String (the output of the HTTP post).

Function getScripts( )—Integration scripts (registrationScripts)—used in administration to list all scripts for a particular registrationSourceID. This function uses Parameters: registrationSourceID (GUID) (the registrationSourceID to be searched). This function Returns: recordSet object (all of the script records matching the registrationSourceID).

Function getScriptDetail( )—Integration scripts (registrationScripts) used in administration to return the script detail information when given a scripted. This function uses Parameters: scripted (GUID) (the scriptID to be searched for). This function Returns: recordSet object (containing all fields for the particular script).

Function saveScript( )—Integration scripts (registrationScripts)—an administration function which inserts or updates a script if the scriptID is not a valid GUID; the function method will assume that the script is a new one and will generate a new scriptID and insert the script. If the scriptID is a valid GUID then the function method will assume that the script is an existing one and perform an update of the script. This function uses Parameters: scriptID (GUID) (the scriptID of the script being saved. If it is null or an empty string, the method assumes that this is a new script); regSourceID (GUID) (the registrationSourceID to be tied to the script); scriptName (GUID) (a unique name for the registrationSourceID so that this script can searched); scriptLocation (String) (a URL which points to an external script to be executed via an HTTP post); scriptTextParameters (String) (not used in the exemplary embodiment); scriptText (Text) (the actual script for the pre-script code which is executed prior to the scriptLocation HTTP post); postScriptText (Text) (the actual script for the post-script code which is executed after the scriptLocation HTTP post); executionOrder (not used in the exemplary embodiment). This function Returns: String (the output of the postScriptText script execution).

Function deleteAllScripts( )—Integration scripts (registrationScripts)—used in administration to delete all scripts for a particular registrationSourceID. This function uses Parameters: registrationSourceID (GUID) (the registrationSourceID to delete scripts from). This function does not return anything.

Function runScript( )—Integration scripts (registrationScripts)—executes a script contained in the codeToRun. This function uses Parameters: codeToRun (text) (the script code to execute); parameterString (String) (a URL encoded queryString which is passed to the script code as parameters); pageReturnText (text) (a text field which contains text that could of been executed by a previous script). This function Returns: String (the output from the script run).

Function deleteScript( )—Integration scripts (registrationScripts)—an administrative function which will delete a particular script by using the passed scripted. This function uses Parameters: scriptID (GUID) (the scriptID to delete). This function does not return anything.

Function parseAspPageForRegID( )—Custom Content (pageText)—looks up the proper pageText by using the pageName and the registrationSourceID and then executes it. NOTE: If the page is not found for the registrationSourceID, the page with the same name, for the default registrationSource will be used instead. This function uses Parameters: regID (GUID) (the registrationSourceID to lookup); pageName (String) (the pageName to lookup); queryString (String) (a URL encoded query string which should be passed to the script). This function Returns: String (the output of the page that was parsed).

Function parseAspPage( )—Custom Content (pageText)—uses the pageName and the current registrationSourceID of the session of the currently logged in user to find the proper page to parse. It then parses it. NOTE: If the page is not found for the registrationSourceID, the page with the same name, for the default registrationSource will be used instead. This function uses Parameters: pageName (String) (the name of the page to search for); queryString (String) (a URL encoded query string which should be passed to the script). This function Returns: String (the output of the page that was parsed).

Function parseAspString( )—Custom Content (pageText)—takes a passed string and parses it as if it were an ASP page. This function uses Parameters: aspString (Text) (the string that should be parsed like an ASP page); queryString (String) (a URL encoded query string which should be passed to the script to be parsed). This function Returns: String (the output of the string that was parsed).

Function getCachedAspPage( )—Custom Content (pageText)—allows pages to be stored in memory cache instead of querying from the database. By searching for the pageName and the registrationSourceID of the current session of the user the page will be found. NOTE: If the page is not found for the registrationSourceID, the page with the same name, for the default registrationSource will be used instead. This function uses Parameters: pageName (String) (the name of the page to be found); queryString (String) (a URL encoded query string which should be passed to the script to be parsed). This function Returns: String (the output of the string that was parsed).

Function getPageText( )—Custom Content (pageText)—pulls the page from the database by using the pageName and a passed registrationSourceID. The page text is passed back. NOTE: No parsing is done. Only the un-processed code is returned. NOTE: If the page is not found for the registrationSourceID, the page with the same name, for the default registrationSource will be used instead. This function uses Parameters: pageName (String) (the page to be found); regID (GUID) (the registrationSourceID to be found). This function Returns: String (the text to parse).

Function doParsing( )—Custom Content (pageText)—does the actual parsing of the aspText. By passing a string, containing the equivalent of an ASP file, this method will parse it as an ASP file and return the results. This function uses Parameters: aspText (Text) (the string to parse); queryString (String) (a URL encoded query string which should be passed to the script to be parsed). This function Returns: String (the output of the string that was parsed).

Function getPages( )—Custom Content (pageText)—an administration function which returns all pages for a registrationSourceID. This function uses Parameters: registration- SourceID (GUID) (the registrationSourceID to be searched). This function Returns: recordSet object containing all the page records for the provided registrationSourceID.

Function deleteAllPages( )—Custom Content (pageText)—an administration function that will delete all pages for a given registrationSourceID. This function uses Parameters: regSrcID (GUID) (the registrationSourceID for the pages to delete). This function Returns: nothing.

Function getPageDetail( )—Custom Content (pageText)—an administration function that teturns a recordset with all the fields for a particular page record. This function uses Parameters: pageID (GUID) (the pageID to search for). This function Returns: recordSet object containing the record that was found.

Function savePage( )—Custom Content (pageText)—an administration function that will save a page into the pageText table. If the pageID is null or an empty string, the page will be assumed to be a new one and a new pageID will be generated and the page will be saved. If the pageID is a valid GUID, then the page will be assumed an existing page and the page will be updated. This function uses Parameters: pageID (GUID) (the unique identifier of the page); regSourceID (GUID) (the registrationSourceID for the page); pageName (string) (the name used to identify the page); pageText (Text) (the actual code to be parsed when executed). This function Returns: the pageID (QUID) if the page is saved successfully or a NULL if not.

Function deletePage( )—Custom Content (pageText)—an administration function used to delete a particular page using a passed pageID. This function uses Parameters: pageID (QUID) (the pageID of the page to be deleted). This function Returns: nothing.

Function getDefaultPages( )—Custom Content (pageText)—returns all pages for the default registrationSource. This function uses no Parameters. This function Returns: recordSet object—all of the pageIDs and pageNames of the default registrationSource.

Function getSimpleScripts( )—Simple Scripting Engine (scripts)—returns all scripts for a particular script type. This function uses Parameters: scriptType (char(3)) (the scriptTypeLOV to search for). This function Returns: recordSet object that contains all scripts matching the scriptType.

Function getScriptByNameType( )—Simple Scripting Engine (scripts)—returns the script which matches a particular name and particular script type. This function uses Parameters: scriptName (String) (the name of the script to search for); scriptType (char(3)) (the scriptTypeLOV to search for). This function Returns: String (the script code found).

Function executeScriptType( )—Simple Scripting Engine (scripts)—finds the proper script by the scriptName and scriptType and executes it. This function uses Parameters: scriptName (string) (the name of the script to execute); scriptType (char(3)) (the scriptTypeLOV of the script to execute); paramsDict (dictionaryObject) (a dictionary object with the name/value pairs of all parameters to pass to the script). This function Returns: the output of the script.

5. API Instruction: trCCard

Credit cards are one of the internal payment methods of the system. trCCard allows users to manage their credit cards and also is used by the system to charge users for product bundles, monthly rebilling, and minutes. The trCCard instruction component can be used with the functions described below.

Function addCard( ) saves a credit card to the database and passes back the payMethodID to the function. This function is used with Parameters: ccardFName; ccardFName; ccardType; ccardNumber; ccardExpDate; active.

FunctionupdateCard( ) inserts or updates a creditcard to payMethods for a user. This function uses Parameters: ccardID; ccardFName; ccardLName; ccardType; ccardNumber; ccardExpDate; active.

FunctiongetCCardInfo( ) returns all creditcards for the current user of the session; This function does not use any Parameters.

FunctiongetCardsLastDigits( ) returns the last n digits of a credit card. This function uses Parameters: cardNumber; noDigits.

FunctionchargeCard( ) attempts a charge against a credit card. If the charge succeeds, a true is passed back to the function. If it fails, a false is passed back. This function uses Parameters: ccardFName; ccardLName; ccardType; ccardNumber; ccardMonth; ccardYear; addr1; addr2; city; state; zip; country; email; phone1; dollarAmt; comment.

FunctionaddPayment( ) adds a payment to the user's account. This function also calls the chargeCard function to charge the card. This function uses Parameters: dollarAmt; quantity; userID; statusLOV.

FunctiongetPayProcessors( ) will provide a select form field which will display all payprocessors. It will name the select field with the selectName parameter. It will default select an option if it matches the in Processor parameter. NOTE: in the exemplary embodiment, this is a hardcoded function. This function uses Parameters: selectName; in Processor.

FunctiongetUsersPayMethods( ) returns all the payMethods for a passed userID. This function uses Parameters: inUserID.

FunctionsaveCard( ) saves a credit card to the payMethod table. This is an independent function and is used for soft-deploy. This function uses Parameters: payMethodID; userID; firstName; lastName; payMethodName; payMethodTypeLOV; payMethodNumber; payMethodExpireDate; createDateTime; active.

FunctionaddItemCounter( ) will insert an itemCounter into the itemCounter table. NOTE: in the exemplary embodiment, this is a stand alone function and is used for soft-deploy. This function uses Parameters: itemCounterID; userID; bundleItemID; countValue; bundleQuantity; lastPayment; statusLOV.

FunctiondeleteItemCountersForUser( ) deletes all itemCounters for a given userID. This function uses Parameters: userID.

6. API Instruction: trRegistrationSource

Registration sources are the way the system can custom brand itself. There is an entity called a registrationSource (known also as a referralID). trRegistrationSource has a variety of methods which manage registrationSources. It also tracks registrationSources for users as well as other information needing to be connected to a registration source. The trRegistrationSource instruction component can be used with the functions described below.

Function getUserRegistrationField( ) returns a user registration field. These are values stored at the user level when the user registered in the system. The parameter regField is the name of the field to return. The value of the field is returned to the function. This function uses Parameters: regField.

Function getSessionRegistrationField( ) returns a session registration field. These are values stored at the session level when the user initiated their session with the system. The parameter regField is the name of the field to return. The value of the field is returned to the function. This function uses Parameters: regField.

Function getAllRegistrationSources( ) returns a recordset of all registrationSources in the system. the parameter active will limit the returnset by whether the registrationSource is active or not. If a 1 is passed, only active registrationSources will be returned. If a 0 is passed, only inactive registrationSources will be returned. This function uses Parameters: active.

Function getRegistrationSource( ) returns a recordset of all fields for a particular registrationSource that matches the parameter registrationSourceID. This function uses Parameters: registrationSourceID.

Function saveRegistrationSource( ) inserts or updates a registrationSource to the database. This function uses Parameters: registrationSourceID; registrationName; registrationTitle; registrationDescription; infoPageOverride; referralID; logoImage; packageImage; defaultFlag; active.

Function queueAffiliateRequest( ) is used on the affiliate registration page. When someone wants to request to become an affiliate, they fill out a form. The information of that form is pushed to this function and then stored in the database. This function uses Parameters: registrationName; websiteURL; siteDescription; siteCategory; contactFirstName; contactLastName; contactPhoneNumber; contactEmailAddress; contactPassword; confirmPassword; companyName; companyAddr1; companyAddr2; companyCity; companyStateLOV; companyZip; companyCountryLOV; companyPhoneNumber; companyEmailAddress; organizationPhone; organizationFax; organizationSSN; checksPayableTo.

Function getAnonymousBundle( ) returns the anonymous productBundle for a registrationSource. This is used for people who pay for something but arent registered users in the system. This function uses Parameters: registrationSourceID.

Function changeRegistrationQueueStatus( ) changes the status of a registrationSource. This is used when an affiliate is queued in the system waiting for approval. An administrator can change the status from queued to active or from active back to queued. This function uses Parameters: registrationSourceID; statusLOV.

Function getRegistrationSourceForRule( ) returns the registrationSourceID for a rule. This is accomplished by looking up who owns the rule and then returning the registrationSourceID of that user. This function uses Parameters: ruleID.

Function getRegistrationBundles( ) returns all bundles for a particular registrationSource. This function uses Parameters: registrationSourceID.

7. API Instruction: trOrder

When a user purchases a package in the system, that purchase is recorded as an order. trOrder is used primarily for the ecommerce engine of the system which will manage a session's shopping basket as well as a user's order. The trOrder instruction component can be used with the functions described below.

Function addBasketItem( ) adds an item (productBundle) to the session's basket. This is a temporary storage area to hold items until they are purchased (the order is processed). This function uses Parameters: productID.

Function processOrder( ) processes all items in a session's basket and creates an order. If a payment needs to be made against a credit card, the method will charge the card. This function uses no Parameters.

Function getBasket( ) returns a recordSet containing the user's basket items. This function uses no Parameters.

Function getCurrentPackage( ) gets the user's current package (bundle). This function uses no Parameters.

Function getLinkCount( ) counts the number of links the current user of the session has in their account. This function uses no Parameters.

Function getOrderTotals( ) returns the sum of all items in the user's basket as well as paymethod information. This function uses Parameters: callUserID.

Function getAllUserOrders( ) returns a recordset of all orders that the user has processed. This function uses Parameters: callUserID.

Function getAllOrderItems( ) returns all items in a particular order. This function uses Parameters: ordered.

Function getUsersItemCounter( ) returns all itemCounters for a particular user. This function uses Parameters: inUserID.

Function saveOrder( ) is a method used by soft deploy to insert an entire order record. This function uses Parameters: ordered; payMethodID; sessionID; userID; orderDate; statusLOV; processedDate; active.

Function saveOrderItems( ) is a method used by soft deploy to insert an entire orderItem record. This function uses Parameters: orderItemsID; ordered; bundleID; statusLOV; ruleID. Function deleteAllOrderItems( ) deletes all orderItems and the order that matches the ordered (used by soft deployment). This function uses Parameters: ordered.

8. API Instruction: trBundle

The API instruction component trBundle manages product bundles in the system. Bundles are the product entity which users purchase to be able to gain access to the system and to be charged for minutes. The trBundle instruction component can be used with the functions described below.

Function getBundles( ) returns all bundles (only returns active bundles) If the user is a guest, it will return active bundles for the registrationSourceID of their session. If the user is not a guest, it will return active bundles for the registrationSourceID of their user. This function uses no Parameters.

Function getAllBundles( ) returns all bundles (returns all bundles regardless of the active flag). This function uses no Parameters.

Function getBundle( ) returns a bundle given the bundleID parameter. This function uses Parameters: bundleID.

Function addBundle( ) is an administrative function which will add a bundle to the database. This function uses Parameters: bundleID; bundleName; price; description; orderindex; registrationSourceID; active.

Function saveBundle( ) is an administrative function which will add a bundle to the database (NOTE: this is different from addBundle because it doesnt add a bundleToRegistration record). This function uses Parameters: bundleID; bundleName; price; description; orderindex; active.

Function getBundleItems( ) returns all bundleItems for a given bundleID. This function uses Parameters: bundleID.

Function getBundleRegistrationSources( ) returns all registrationSources attached to a bundle. This function uses Parameters: bundleID.

Function addBundleItem( ) adds a bundleItem to a bundle. This function uses Parameters: bundleItemID; bundleID; bundleItemType; amount; price; pricePeriod; description; bundleQuantity; roundRobinProduct; revShareItem; autoRebillLOV; deactivationDays; reminderEmailDays; secondsThreshold.

Function addBundleToRegistration( ) attaches a bundle to a registrationSource. This function uses Parameters: registrationSourceID; bundleID.

Function removeBundleFromRegistration( ) removes a bundle from a registrationSource. This function uses Parameters: registrationSourceID; bundleID.

Function removeAllBundlesFromRegistration( ) removes all bundles from a given registrationSource. This function uses Parameters: registrationSourceID.

9. API Instruction: trUser

Users are entities who gain access to the system. A user can either be a person or a software process. Everyone who uses the system is a user (even if they are not logged in). Non-logged-in users have their current session assigned to a default guest user. All users, including guest users, are then tied to groups. Groups are assigned permissions. Depending on the permissions the user has, through their groups, they will be able to gain access to different areas of the system. The trUser instruction component can be used with the functions described below.

Function setUser( ) creates or updates basic user information. This function uses Parameters: userID; username; password; firstName; lastName; emailAddress; companyName; phone; fax; timeZoneLOV; autoRegistered; active; htmlEmail; allowCallRequests. Function saveUser( ) saves a user to the database. This is normally used by the soft-deploy engine. This function uses Parameters: userStruct.

Function getNewPassword( ) gets called everytime a user requests a password returns new unencrypted password. This function uses Parameters: username.

Function getAllUserInfo( ) returns a disconnected ADO recordset containing user info for the specified users. This function uses no Parameters.

Function getAllUserInfoByUserID( ) returns a disconnected ADO recordset containing user info for the specified users. This function uses Parameters: userID.

Function getUserValueByUsernameORExternalUserID( ) simply returns the column requested for a username+siteID combination in the users table. This function returns Parameters: username; columnName.

Function getLoginByEmail( ) gets a username and password matching an emailaddress. This function uses Parameters: userAddress; username; password.

Function getUserInfo( ) gets the basic user information. This function uses Parameters: ssNum; firstName; lastName; companyName; phone; fax; loginName.

Function getUserName( ) gets the users first name and last name. This function uses Parameters: username.

Function getUserValue( ) gets a specific columns value for the user. This function uses Parameters: columnName.

Function checkUsername( ) checks to see if a username is already in use by another user. If it is, then returns false, otherwise returns true. This function uses Parameters: username.

Function clonePermissions( ) clones all the permissions from one user to the next. All original permissions for the recipient are deleted in the process. When completed they are identical. This function uses Parameters: fromUsername; toUsername.

Function getUserEmailByUserID( ) returns the email address of designated user. This function uses Parameters: userID.

Function setSessionUserID( ) clones all the permissions from one user to the next. All original permissions for the recipient are deleted in the process. When completed they are identical. This function uses Parameters: userID.

Function getTimeZone( ) returns the timezone of the user. This function uses no Parameters.

Function getTimeZoneDifference( ) returns the difference between the user's timezone and the server's timezone (ie. it will return the offset, in hours, of the user's timezone compared to the systems). This function uses no Parameters.

Function addUserToGroup( ) assigns a user to a particular group. This function uses Parameters: userID; groupID; admin.

Function addSurveyQuestions( ) stores a listing of survey questions captured from an online survey. This function uses Parameters: nameListing; valueListing.

Function getUsers( ) returns a recordset of users. if the activeFlag is set to 1, then only active user's will be returned. If set to 0, then only inactive users will be returned. If a typeLOV is passed, then the users will be filtered by the userType. If an empty string is passed, then the userType will not be considered in the filter. If a registrationSourceID is passed, then the users will be filtered by registrationSourceID. If nothing is passed, then registrationSourceID will not be considered in the filter. This function uses Parameters: activeFlag; typeLOV; registrationSourceID.

Function getUserRegistrationSourceAccess( ) returns the registrationSources that a user can administer in affiliate administration. This function uses Parameters: inUserID. Function updateUserRegistrationSourceAccess( ) gives a user access to a particular registrationSource for affiliate administration. This function uses Parameters: inUserID; registrationSourceID.

Function setAnonymousUser( ) adds an anonymous user to the system by passing all the user information in the userStruct. This is used primarily when a user needs to make a payment without becoming a registered user. This function uses Parameters: userStruct.

Function getUserGroups( ) returns all groups of which a user is a member. This function uses Parameters: inUserID.

Function checkUserPermission( ) checks to see if a user has access to a particular permission. This function uses Parameters: inUserID; permissionLOV.

Function updateUserGroups( ) takes a comma delimited string of groupID's and a userID and gives the user access to all groups in the groupString. It will first remove the user from their existing groups and reassign with the groupString. This function uses Parameters: inUserID; groupString.

Function deactivateUserByUserID( ) sets the user's active flag to 0. This function uses Parameters:inUserID.

10. API Instruction: trSession

Each time a user goes to the site, they are assigned a sessionID which is passed from page to page to track the user throughout their session. The trSession component manages sessions. The trSession instruction component has the Properties described below.

CookieExpiration—The time the current session's cookie will expire.

CheckCookies—a Boolean on whether the system should check for cookies when checking the user's sessionID.

GiveCookies—a Boolean on whether to drop cookies on the user's browser.

PermissionDict—a dictionary object containing all permissions for the user of the current session.

UserID—the userID of the current session.

Admin—a Boolean. If true, the user has administration access.

IsGuest—a Boolean. If true, then the user is a guest user and is not officially logged in.

FirstName—the firstName for the user of the current session.

LastName—the lastName for the user of the current session.

EmailAddress—the email address for the user of the current session.

HtmlEmail—whether the user of the current session allows htmlEmail to be sent to them.

SessionRegistrationSourceID—the registrationSourceID of the current session (is set if the session is created with a referralID passed to it).

SessionRegistrationSourceName—the registrationSourceName of the current session (is set if the session is created with a referralID passed to it).

userRegistrationSourceName—the registrationSourceName of the user (not the session. This is set if the user registers from a session that had the referralID passed to it. NOTE: this is user specific and if the user returns to the system, in a different session, with a different referralID passed to it, the userRegistrationSourceName will always be set to the registrationSourceID of the first session's referralID.

userRegistrationSourceID—the registrationSourceID of the user (not the session. This is set if the user registers from a session that had the referralID passed to it. NOTE: this is user specific and if the user returns to the system, in a different session, with a different referralID passed to it, the userRegistrationSourceName will always be set to the registrationSourceID of the first session's referralID.

SessionID—a GUID which uniquely identifies the current session. This sessionID is passed to all pages the user uses throughout their session.

The trSession instruction component can be used with the functions described below.

Function getGuidComponent( ) checks and sets the sessionID for a user if affiliatedSessionID then also tracks the affiliates sessionID. This function uses no Parameters.

Function getRandomGUID( ) checks and sets the sessionID for a user if affiliatedSessionID then also tracks the affiliates sessionID. This function uses no Parameters.

Function checkSession( ) checks and sets the sessionID for a user if affiliatedSessionID then also tracks the affiliates sessionID. This function uses Parameters: tmpSessionID; tmpUserID; referralID; referralVar1; referralVar2; referralVar3; referralVar4; referringUserID; referringReturnURL.

Function checkAdminSession( ) verifies session for access to admin checks and makes sure that it is not a user side sessionID. This function uses Parameters: tmpSessionID; tmpUserID.

Function initPermissions( ) pulls back all permisionLOV's in the system. This function uses Parameters: sessionID.

Function checkPermission( ) performs the security check for users accessibility to each asp page. This function uses Parameters: permissionLOV.

Function mungeURL( ) includes the sessionID in the queryString. This function uses Parameters: URL.

Function mungeHiddenInput( ) is used to pass the sessionID along in forms. This function uses no Parameters.

Function getQueryString( ) returns a query string of all the main global values Starts the string with no & or ?, so you need to add that to your asp file yourself. This function uses no Parameters.

Function destroy( )—When this is called, it cleans up after itself and destroys all components, connections, etc. This function uses no Parameters.

Function sendNextPage( ) sends the user to the next page. This function uses Parameters: newURL.

Function resetSessionCache( ) reloads the permissionCache for a session. This function uses no Parameters.

Function getSessionReferralVars( ) returns all referral variables passed to the session. This function uses Parameters: referringUserID; referralVar1; referralVar2; referralVar3; referralVar4; referringReturnURL.

Function setRegistrationSourceID( ) sets the registrationSourceID for the current session. This function uses Parameters: registrationSourceID.

11. API Instruction: trSurvey

The API Instruction component trSurvey handles freeform user entry into the system. In the exemplary embodiment, there are occasions when a non-hardcoded form needs to be inserted somewhere in the system. All data entered into a non-hardcoded form is then processed through the trSurvey component and saved to the database. trSurvey also has reporting methods to display results. The trSurvey instruction component can be used with the functions described below.

Function saveForm( ) saves all survey objects into the surveyItems. A dictionary object is a parameter that contains all the names and values of the items. This function uses Parameters: dictObj.

Function setTRApplication( ) assigns a property to be able to reference the trApplication object model. This function uses Parameters: objIn.

Function getSurveyForReferralID retrieves all surveys saved for a particular referralID. If a beginDate and endDate is passed to the function, then the surveys are further filtered by that date range. This function uses Parameters: referralID; beginDate; endDate.

Function convertRequestToDict( ) converts an ASP request object to a dictionary object. This function uses Parameters: requestObj.

12. API Instruction: trAddress

The API instruction component trAddress manages addresses for a user. The trAddress instruction component can be used with the functions described below.

Function getStates( ) returns all states in the LOV listing table as a recordset. This function uses no Parameters.

Function editAddress( ) either updates an existing address or inserts a new address. This function uses Parameters: addressed; addressTypeLOV; address1; address2; address3; city; state; zip; zipExt.

Function saveAddress( ) saves an address to the database. This is primarily used for the soft deploy engine. This function uses Parameters: addressed; inUserID; addressTypeLOV; address1; address2; address3; city; state; zip; zipext.

Function getAddress( ) returns an address of a particular address type (BUS/HOM/etc.)—for the user of the current session. This function uses Parameters: addressType.

Function getAddressForUser( ) returns an address of a particular address type (BUS/HOM/etc.) for a user. This function uses Parameters: userID; addressType.

13. API Instruction: trFormMgr

The API instruction component trFormMgr is a component that manages custom forms. It allows administration to define custom forms for registrationSource's. The component also handles form and field validation and formatting for the user. The trFormMgr instruction component has the Properties described below.

FormName—the name of the form

The trFormMgr instruction component can be used with the functions described below.

Function setRequest( ) sets a component property to be a dictionary object equivalent of the request object. This function uses Parameters: in RequestObj.

Function validateForm( ) is called by the form page to go through each form item stored in the form structure and then validate each field against what was passed by the form. The function will also replace the field in the form structure with the output of the field script. This function uses no Parameters.

Function validateField( ) will be used to validate a particular field. This function uses no Parameters.

Function initForm( ) grabs all the data from the database for the form/registrationSourceID pair and populates a structure with the information. This function uses Parameters: regID.

Function field( ) will return the value of a field. This function uses Parameters: fieldname.

Function getForms( ) is used in administration to return a listing of all the forms in the system. This function uses Parameters: registrationSourceID.

Function deleteAllForms( ) deletes all forms attached to a registrationSourceID. This function uses Parameters: regSrcID.

Function getFormDetail( ) is used in administration to return detailed data for a particular form. This function uses Parameters: formID.

Function getFormItems( ) is used in admin to return all the form elements for a given form. This function uses Parameters: formID.

Function addFormItem( ) is used in administration to store either an existing form element or adding a new form element. This function uses Parameters: itemFormItemID; itemformID; itemFormName; itemdateTypeLOV; itemScriptID; itemRequiredFlag; itemItemSize; itemMaxLength; itemFormItemDescription; hideFlag.

Function deleteFormItem( ) is used in administration to delete a form item. This function uses Parameters: formItemID.

Function saveForm( ) is used in administration to save a form. This function uses Parameters: formID; formName; regSourceID; formDescription.

Function deleteForm( ) is used in administration to delete a form item. This function uses Parameters: formID.

Function fieldSize( ) returns the field size of a particular field. This function uses Parameters: fieldname.

Function fieldMaxLength( ) returns the maximum character length of a particular field. This function uses Parameters: fieldname.

Function fieldDescription( ) returns the field description of a particular field. This function uses Parameters: fieldname.

Function copyFormItems( ) copies a form from one registrationSourceID to another. This function uses Parameters: toRegistrationSourceID; fromRegistrationSourceID; formName.

Function hideField( ) returns the hide flag for a particular field. This function uses Parameters: fieldname.

Function createField( ) returns back an HTML formatted field for a particular field. This function uses Parameters: fieldname; fieldType; functionName.

Function createFieldHeader( ) properly formats a field header for output to an HTML page. This function uses Parameters: fieldname.

Function addObject( ) allows a programmer to add an additional object to be accessible by the validation script. This function uses Parameters: objectName; objectVar.

Function getDefaultFormNames( ) returns a list of all forms that have been saved for the default registrationSource. This function uses no Parameters.

Function getDefaultFormItemNames( ) returns a list of all formItems for a particular form for the default registrationSource. This function uses Parameters: formName.

Function createGenericForm( ) will create an HTML form for a particular custom form. This function will just draw each form field/item on the page. This function uses no Parameters.

Facsimile Reproduction of Copyright Material

A portion of the disclosure of this patent document contains material which is subject to copyright protection by the copyright owner, RampQuick, Inc. RampQuick, Inc. has no objection to the facsimile reproduction by anyone of the patent document or the patent disclosure, as it appears in the Patent and Trademark Office patent file or records, but otherwise reserves all copyright rights whatsoever.

Trademarks

"TalkRules" and associated logos are trademarks of RampQuick, Inc. The names of actual companies and products mentioned herein may be the trademarks of their respective owners.

Illustrative Embodiments

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. A method comprising:
   presenting a user interface to a recipient;
   receiving input from the recipient via the user interface;
   storing the input in a database, the input including a set of rules associated with a caller based on an identifier specific to the caller;
   receiving a communication from the caller, the communication being initiated using the identifier and the identifier being assigned to the caller by the recipient;
   retrieving the rules associated with the identifier; and
   routing the communication in response to the rules established by the recipient.

2. The method as set forth in claim 1, further comprising:
   creating a record of the communication by storing communication attributes associated with the communication in the database; and
   creating a set of statistics from the record of communication attributes.

3. The method as set forth in claim 2, wherein the communication attributes include at least one of the length of communication, the date of the communication, and the time of the communication.

4. The method as set forth in claim 1, further comprising:
   establishing a set of default rules; and
   routing the communication according to the default rules in response to the identifier not being recognized by the database.

5. The method as set forth in claim 1, wherein the identifier is a URL used to initiate the communication, the URL including an embedded system code associated with the caller.

6. The method as set forth in claim 1, further comprising modifying the rules associated with the caller via the user interface.

7. The method as set forth in claim 1, wherein the identifier includes at least one of an email address, an instance messenger ID, or a phone number.

8. The method as set forth in claim 1, further comprising:
   storing incoming communications in the database; and
   creating a record of callers that initiate the incoming communications in the database.

9. The method as set forth in claim 1, wherein the identifier is a plurality of numeric digits assigned to the caller, the digits being separate from a telephone number associated with a telephone from which the caller initiated the communication.

10. The method as set forth in claim 1, wherein the identifier is a routing number associated with the caller, the routing number being used to initiate the communication.

11. A method comprising:
receiving a telephone call, the call being initiated using an identifier specific to a caller and the identifier being assigned to the caller by a recipient;
identifying the caller based on the identifier;
retrieving a predefined preference associated with the identifier from a database, the predefined preference being created by the recipient; and
routing the telephone call in response to the predefined preference.

12. A method as set forth in claim 11, further comprising:
storing the incoming telephone call in the database;
creating a record of the incoming call and the caller associated with the incoming call;
generating statistics for each incoming call and caller; and
storing the statistics in the database.

13. The method as set forth in claim 11, wherein the identifier is not an automatic number identifier of the caller.

14. The method as set forth in claim 11, wherein the identifier is a plurality of numeric digits assigned to the caller, the digits being separate from a telephone number associated with a telephone from which the caller initiated the call.

15. The method as set forth in claim 11, wherein the predefined preference includes routing calls based on at least one of a time range or a date range.

16. The method as set forth in claim 11, further comprising routing the call to a conference call based on the identifier.

17. A method comprising:
receiving a telephone call, the call being initiated using an identifier specific to a caller and the identifier being assigned to the caller by a recipient;
identifying the caller based on the identifier, the identifier being a plurality of numeric digits assigned to the caller, the digits being separate from a telephone number associated with a telephone from which the caller initiated the call;
retrieving a predefined preference associated with the identifier from a database, the predefined preference being created by the recipient and including routing calls based on at least one of a time range or a date range;
routing the telephone call in response to the predefined preference;
storing the incoming telephone call in the database;
creating a record of the incoming call and the caller associated with the incoming call;
generating statistics for each call and caller; and
storing the statistics in the database.

* * * * *